US012803042B2

(12) United States Patent
Masada et al.

(10) Patent No.: US 12,803,042 B2
(45) Date of Patent: Nov. 17, 2026

(54) LAMINATED ELECTRODE ASSEMBLY MANUFACTURING DEVICE AND METHOD

(71) Applicants: Panasonic Corporation, Kadoma (JP); SANYO Electric Co., Ltd., Daito (JP)

(72) Inventors: Tatsuya Masada, Hyogo (JP); Kenji Inagaki, Hyogo (JP); Masahide Maruyama, Nara (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 800 days.

(21) Appl. No.: 17/442,832

(22) PCT Filed: Mar. 11, 2020

(86) PCT No.: PCT/JP2020/010497
§ 371 (c)(1),
(2) Date: Sep. 24, 2021

(87) PCT Pub. No.: WO2020/203116
PCT Pub. Date: Oct. 8, 2020

(65) Prior Publication Data

US 2022/0181673 A1 Jun. 9, 2022

(30) Foreign Application Priority Data

Mar. 29, 2019 (JP) ................................ 2019-067843

(51) Int. Cl.
*B29C 65/00* (2006.01)
*H01M 10/04* (2006.01)
(Continued)

(52) U.S. Cl.
CPC ... *H01M 10/0468* (2013.01); *H01M 10/0585* (2013.01); *B29C 65/74* (2013.01);
(Continued)

(58) Field of Classification Search
CPC . B29C 65/74; B29C 65/7435; B29C 65/7888; B29C 65/7894; B29C 65/80;
(Continued)

(56) References Cited

U.S. PATENT DOCUMENTS

2019/0036149 A1 1/2019 Sakurai et al.

FOREIGN PATENT DOCUMENTS

JP 2011-86507 A 4/2011
JP 2011-86508 A 4/2011
(Continued)

OTHER PUBLICATIONS

English Translation of Chinese Search Report dated Mar. 19, 2024, issued in counterpart CN application No. 202080024626.X. (2 pages).
(Continued)

*Primary Examiner* — Philip C Tucker
*Assistant Examiner* — Nickolas R Harm
(74) *Attorney, Agent, or Firm* — WHDA, LLP

(57) ABSTRACT

This layered electrode body production device is provided with: a first layering drum for layering, on a first layering stage, a layered body obtained by layering a separator single sheet and an electrode and then cutting the separator single sheet of the resulting layered body to a specific width; and a second layering drum, which is different from the first layering drum, that is for layering the cut layered body on a second layering stage, which is different from the first layering stage.

16 Claims, 35 Drawing Sheets

(51) Int. Cl.
*H01M 10/0585* (2010.01)
*B29C 65/74* (2006.01)
*B29C 65/78* (2006.01)
*B29C 65/80* (2006.01)

(52) U.S. Cl.
CPC ...... *B29C 65/7435* (2013.01); *B29C 65/7888* (2013.01); *B29C 65/7894* (2013.01); *B29C 65/80* (2013.01); *B29C 66/472* (2013.01); *B29C 66/8341* (2013.01); *B29C 66/83413* (2013.01)

(58) Field of Classification Search
CPC .............. B29C 66/472; B29C 66/8341; B29C 66/83413; H01M 10/0468
See application file for complete search history.

(56) References Cited

FOREIGN PATENT DOCUMENTS

| | | | |
|---|---|---|---|
| JP | 2012-199211 | A | 10/2012 |
| JP | 2016-169097 | A | 9/2016 |
| JP | 2017-004615 | A | 1/2017 |
| JP | 2019-21607 | A | 2/2019 |
| JP | 2020-013744 | A | 1/2020 |
| WO | 2017/131027 | A1 | 8/2017 |

OTHER PUBLICATIONS

International Search Report dated Jun. 9, 2020, issued in counterpart International Application No. PCT/JP2020/010497 (2 pages).

LAMINATED ELECTRODE ASSEMBLY MANUFACTURING DEVICE AND METHOD

TECHNICAL FIELD

The present disclosure relates to a laminated electrode assembly manufacturing device and manufacturing method.

BACKGROUND ART

Since a large capacity, low internal resistance and a high heat radiation performance are requested in an in-vehicle lithium ion secondary battery or the like for example, a laminate type battery which can satisfy the requests has been developed. The battery is in a form that a positive electrode, a separator and a negative electrode are alternately laminated, the respective electrodes are connected to a metal terminal called a tab and put in a container configured by an aluminum laminate film, an electrolyte is injected and sealing is performed.

Patent Literature 1 describes that there are: an electrode support section that receives an electrode supplied by a conveying device and supports the electrode; a circulation member which has a loop shape extending in a vertical direction, and on the outer peripheral surface of which the electrode support section is attached; a lamination unit that is disposed on a side opposite to the conveying device with the circulation member interposed therebetween, and includes a plurality of stages of lamination sections where the electrode is laminated; an extrusion section that simultaneously extrudes the electrodes supported by the plurality of electrode support sections toward the plurality of stages of lamination sections; and a control section that controls circulation and elevation of the circulation member and an operation of the extrusion section, and the control section controls the operation of the extrusion section so as to extrude the electrodes toward the lamination sections at a speed lower than a conveying speed of the electrodes by the conveying device.

Patent Literature 2 describes that a device which manufactures a laminated electrode assembly for which a positive electrode and a negative electrode are alternately laminated holding a separator therebetween comprises: a winding drum having an outer peripheral surface around which a continuously delivered separator sheet can be wound; and an electrode supply unit which supplies the electrode successively at intervals such that the positive electrode and the negative electrode can be switched, to a valley formed between a separator sheet SS wound around the outer peripheral surface and a separator sheet to be wound around the outer peripheral surface.

Patent Literature 3 describes that raw materials are a continuous positive electrode material, a continuous negative electrode material and a continuous separator material for which positive electrodes, negative electrodes and separators are continuously formed via easy-to-cut breaking lines respectively, there are roughly cylindrical winding means that wind a continuous battery material formed by piling up the respective raw materials in the order of the continuous separator material, the continuous positive electrode material, the continuous separator material and the continuous negative electrode material or in the order of the continuous separator material, the continuous negative electrode material, the continuous separator material and the continuous positive electrode material while the respective breaking lines are made to coincide with one another, pressing means that press the wound continuous battery material to a side peripheral surface of the winding means, and cutting means that cut the continuous battery material at each breaking line after the continuous battery material is wound around the winding means for a required number of laminations, and for the cutting means, a part of the side peripheral surface of the winding means in a circumferential direction is projected in a radial direction.

CITATION LIST

Patent Literature

PATENT LITERATURE 1: International Publication No. WO 2017/131027

PATENT LITERATURE 2: Japanese Unexamined Patent Application Publication No. 2012-199211

PATENT LITERATURE 3: Japanese Unexamined Patent Application Publication No. 2011-86508

SUMMARY

In order to efficiently manufacture a laminated electrode assembly formed by alternately laminating a positive electrode, a separator and a negative electrode, it is needed to supply a belt-like positive electrode body and a belt-like negative electrode body to a drum, obtain a positive electrode plate and a negative electrode plate by cutting the belt-like positive electrode body and negative electrode body into desired sizes respectively, and successively laminate them at desired positions.

It is an object of the present disclosure to provide a technology capable of manufacturing a laminated electrode assembly formed by laminating a separator single plate and an electrode at a high speed.

One aspect of the present disclosure comprises: a first laminating drum configured to laminate a laminated body for which a separator single plate of the laminated body formed by laminating the separator single plate and an electrode is cut in a predetermined width on a first laminating stage; and a second laminating drum which is different from the first laminating drum and configured to laminate the cut laminated body on a second laminating stage different from the first laminating stage.

In another aspect of the present disclosure, the first laminating drum and the second laminating drum are arranged so as to be rotated in a mutually same direction as a conveyance direction of the cut laminated body.

In a further aspect of the present disclosure, the first laminating drum and the second laminating drum are arranged so as to be rotated in mutually different directions.

In a still further aspect of the present disclosure, the cut laminated body is carried into the second laminating drum via the first laminating drum.

A yet further aspect of the present disclosure further comprises cutting means configured to cut the separator single plate of the laminated body in the predetermined width, the laminated body is a 4-layer laminated body formed by arranging a first electrode plate on a first separator single plate, arranging a second separator single plate thereon and arranging a second electrode plate thereon, and the cutting means cut the first separator single plate and the second separator single plate of the 4-layer laminated body in the predetermined width.

A yet still further aspect of the present disclosure further comprises cutting means configured to cut the separator single plate of the laminated body in the predetermined width, the laminated body is a 3-layer laminated body formed by arranging a first electrode plate on a first separator single plate and arranging a second separator single plate thereon, and the cutting means cut the first separator single plate and the second separator single plate of the 3-layer laminated body in the predetermined width.

A yet still further aspect of the present disclosure further comprises cutting means configured to cut the separator single plate of the laminated body in the predetermined width, the laminated body is a 4-layer laminated body formed by arranging a first electrode plate on a first separator single plate, arranging a second separator single plate thereon and arranging a second electrode plate thereon and a 3-layer laminated body formed by arranging the first electrode plate on the first separator single plate and arranging the second separator single plate thereon, and the cutting means cut the first separator single plate and the second separator single plate of the 4-layer laminated body and the 3-layer laminated body in the predetermined width.

In a yet still further aspect of the present disclosure, the first laminating drum laminates one 3-layer laminated body on the first laminating stage and laminates a predetermined number of the 4-layer laminated bodies on the first laminating stage, and the second laminating drum laminates one 3-layer laminated body on the second laminating stage and laminates the predetermined number of the 4-layer laminated bodies on the second laminating stage.

In a yet still further aspect of the present disclosure, the first laminating drum laminates one 3-layer laminated body on the first laminating stage, and in a case where the 3-layer laminated body is supplied from the cutting means before laminating the predetermined number of the 4-layer laminated bodies on the first laminating stage, does not laminate the supplied 3-layer laminated body on the first laminating stage, and the second laminating drum laminates the supplied 3-layer laminated body on the second laminating stage.

In a yet still further aspect of the present disclosure, the first laminating drum comprises a plurality of first laminating heads configured to hold the laminated body on an outer peripheral surface, the plurality of first laminating heads are rotated in a drum circumferential direction and laminate the laminated body on the first laminating stage, the second laminating drum comprises a plurality of second laminating heads configured to hold the laminated body on the outer peripheral surface, and the plurality of second laminating heads are rotated in the drum circumferential direction and laminates the laminated body on the second laminating stage.

A yet still further aspect of the present disclosure comprises: a step of conveying a laminated body for which a separator single plate of the laminated body formed by laminating the separator single plate and an electrode is cut in a predetermined width to a first laminating drum or a second laminating drum; a step of laminating the cut laminated body on the first laminating stage by the first laminating drum; and a step of laminating the cut laminated body on a second laminating stage different from the first laminating stage by the second laminating drum different from the first laminating drum.

In a yet still further aspect of the present disclosure, the first laminating drum and the second laminating drum are rotated in a mutually same direction to perform lamination.

In a yet still further aspect of the present disclosure, the first laminating drum and the second laminating drum are rotated in mutually different directions to perform lamination.

One aspect of the present disclosure makes it possible to manufacture a laminated electrode assembly formed by laminating a separator single plate and an electrode at a high speed.

DESCRIPTION OF EMBODIMENTS

Hereinafter, a laminated electrode assembly manufacturing device and manufacturing method relating to one aspect of the present disclosure will be described. However, the embodiment described hereinafter is an example and the present disclosure is not limited thereto.

Figure 1:
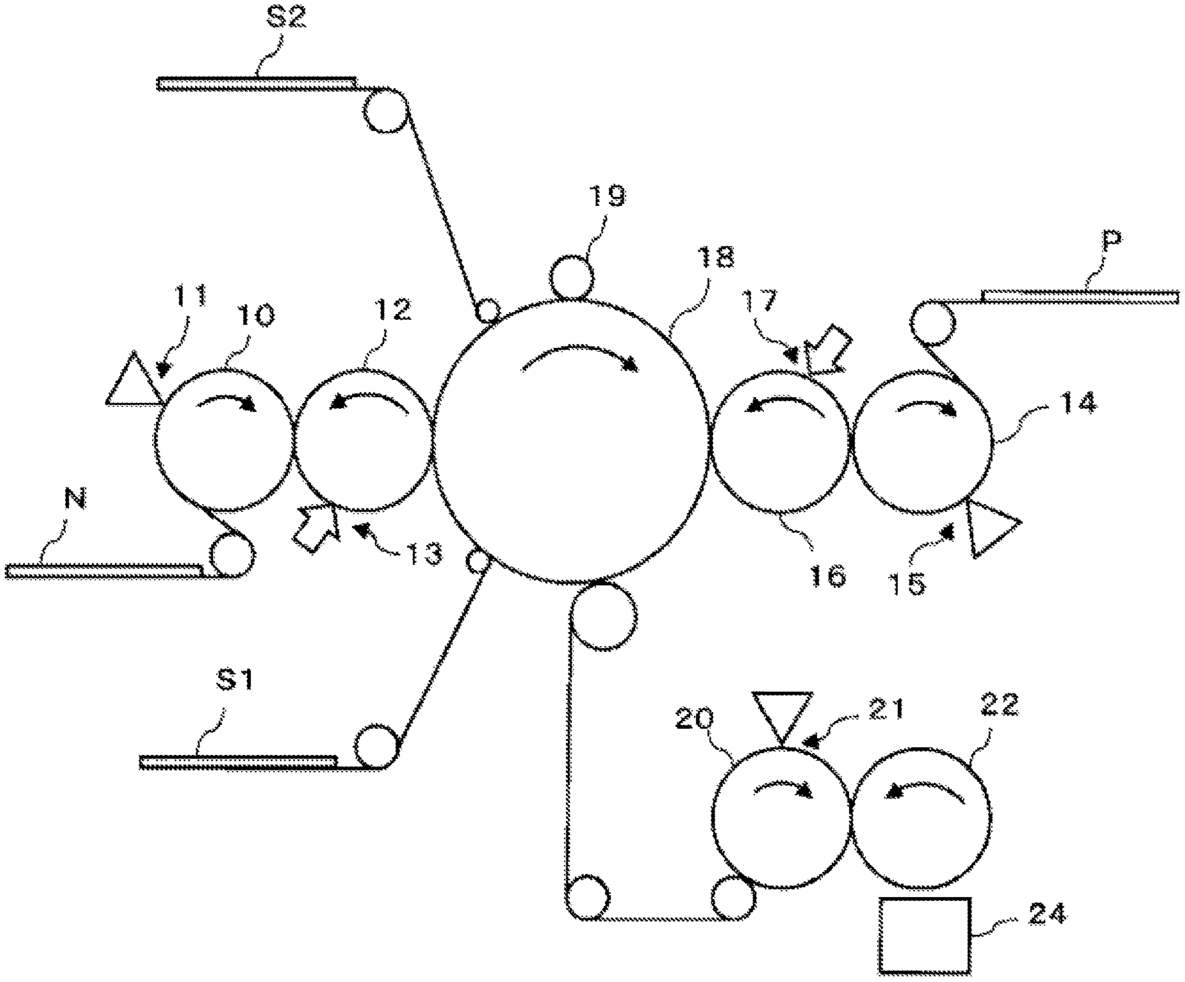
FIG. 1 is a conceptual configuration diagram of a manufacturing device of an embodiment.

FIG. 1 illustrates a conceptual diagram of a laminated electrode assembly manufacturing device in the present embodiment. The manufacturing device of the embodiment is a continuous drum type manufacturing device for which a plurality of drums are combined, and comprises a negative electrode cutting drum 10, a negative electrode heating drum 12, a positive electrode cutting drum 14, a positive electrode heating drum 16, a bonding drum 18, a separator cutting drum 20 and a laminating drum 22.

The negative electrode cutting drum 10 is a first electrode cutting drum, has a first radius, and is rotated around a central axis at a first angular velocity. To the negative electrode cutting drum 10, a belt-like negative electrode single plate N is supplied as a first electrode single plate. The negative electrode single plate N is a negative electrode. The negative electrode single plate N is configured by a negative electrode current collector, and a negative electrode active material layer formed on the negative electrode current collector. The negative electrode active material layer may be formed on one surface of the negative electrode current collector, or may be formed on both surfaces. In the description below, it is assumed that the negative electrode active material layer is formed on both surfaces of the negative electrode current collector. The negative electrode active material layer includes a negative electrode active material and a binding material.

For both of the negative electrode current collector and the negative electrode active material layer, known materials can be used, and are exemplified as follows for a lithium ion secondary battery.

As the negative electrode current collector, foil of a metal which is stable in a potential range of the negative electrode, and a film for which the metal is arranged on a surface layer or the like can be used. As the negative electrode current collector, a porous body such as a mesh body, a punching sheet or an expand metal of the metal may be used. As the material of the negative electrode current collector, copper, copper alloy, aluminum, aluminum alloy, stainless steel, nickel or the like can be used. A thickness of the negative electrode current collector is preferably 3 μm or more and 50 μm or less for example, from viewpoints of a current collection property, mechanical strength or the like. The negative electrode single plate N can be manufactured by applying negative electrode mixture slurry including the negative electrode active material, the binding material and a dispersion medium onto the negative electrode current collector, drying a coating film, then performing rolling and forming the negative electrode active material layer on one surface or both surfaces of the negative electrode current collector for example. The negative electrode active material layer may include an arbitrary component such as a conductive agent as needed. The thickness of the negative electrode active material layer is not limited in particular, and is 10 μm or more and 100 μm or less for example.

In the case of the lithium ion secondary battery, the negative electrode active material is not limited in particular as long as it is a material capable of occluding/releasing lithium ions. The material configuring the negative electrode active material may be a non-carbon-based material, may be a carbon material, or may be the combination thereof.

Examples of the non-carbon-based material are lithium metal, alloy including a lithium element and a metal compound such as metal oxide, metal sulfide or metal nitride containing lithium. Examples of the alloy containing the lithium element are lithium aluminum alloy, lithium tin alloy, lithium lead alloy and lithium silicon alloy. An example of the metal oxide containing the lithium is the metal oxide containing the lithium and titanium, tantalum, niobium or the like, and lithium titanate ($Li_4Ti_5O_{17}$ or the like) is preferable. Examples of the carbon material used as the negative electrode active material are graphite and hard carbon. Among them, the graphite is preferable since a capacity is high and an irreversible capacity is small. The graphite is a general term of the carbon material having a graphite structure, and includes natural graphite, artificial graphite, expanded graphite, graphitized mesophase carbon particles or the like. In the case of using the graphite as the negative electrode active material, it is preferable to coat the surface of the negative electrode active material layer with a coating film in order to lower activity to reductive decomposition of an aqueous electrolyte. For the negative electrode active materials, one kind may be used alone, or two or more kinds may be used together. As the binding material included in the negative electrode active material layer, a fluorine-based polymer, a rubber-based polymer or the like may be used, and a styrene-butadiene copolymer (SBR) or the modified product or the like may be used.

The negative electrode cutting drum 10 comprises a plurality of electrode cutting heads arranged in a circumferential direction of the drum. The plurality of electrode cutting heads comprise an outer peripheral surface for sucking and holding the negative electrode single plate N, and cutting means. The cutting means are, for example, a blade moved in a direction roughly orthogonal to the circumferential direction of the outer peripheral surface. The supplied negative electrode single plate N is sucked and held on the outer peripheral surface and rotated. The electrode cutting heads suck and hold the negative electrode single plate N so that they are also referred to as holding heads. A gap is formed between the plurality of electrode cutting heads, and by movement of the blade loaded on the electrode cutting head in the direction roughly orthogonal to the circumferential direction at the gap, the negative electrode single plate N sucked and held on the outer peripheral surface is cut to have a predetermined width (first width) by the blade.

The plurality of electrode cutting heads are each rotated around a common central axis of the negative electrode cutting drum 10, and the individual electrode cutting head is driven by a motor in the circumferential direction of the drum independent of the other electrode cutting heads. For example, when the two electrode cutting heads adjacent in the circumferential direction are an electrode cutting head 'a' and an electrode cutting head 'b', the electrode cutting head 'a' and the electrode cutting head 'b' are rotated around the common central axis of the drum at a fixed speed, and a mutual relative speed is changed for every predetermined section on a circumference of the negative electrode cutting drum 10. For example, the electrode cutting head 'a' and the electrode cutting head 'b' are both rotated at the fixed speed and the relative speed is 0 at a certain timing, but the electrode cutting head 'a' is accelerated in a direction of separating from the following electrode cutting head 'b' and the relative speed becomes finite at a different timing. By such independent drive of the electrode cutting head, a cutting position of the negative electrode single plate N by the blade loaded on the electrode cutting head can be adjusted, and a position of a negative electrode plate generated by cutting can be adjusted. A moving speed of the electrode cutting head can be achieved by using a motor or the like corresponding to each electrode cutting head.

The negative electrode cutting drum 10 may comprise various kinds of cameras, and the position of the negative electrode single plate N before cutting may be monitored and also the positions of the plurality of negative electrode plates generated by cutting may be monitored by the cameras. The negative electrode cutting drum 10 sucks, holds, rotationally conveys the supplied negative electrode single plate N, cuts the negative electrode single plate N at a position 11 in FIG. 1, and generates the negative electrode plate. The electrode cutting head rotated while sucking and holding the negative electrode single plate N is rotated while sucking and holding the negative electrode single plate N to the position 11, and cuts the negative electrode single plate N by the loaded blade at a point of time of reaching the position 11. The negative electrode plate of the first width generated by cutting is rotationally conveyed while being kept sucked and held on the outer peripheral surface of each electrode cutting head.

The negative electrode heating drum 12 is a first electrode heating drum, and is arranged adjacently to the negative electrode cutting drum 10 so as to be close to the negative electrode cutting drum 10. The negative electrode heating drum 12 has a second radius, and is rotated around the central axis at a second angular velocity. The second radius of the negative electrode heating drum 12 may be same as the first radius of the negative electrode cutting drum 10 or may be different. The second angular velocity of the negative electrode heating drum 12 is different from the first angular velocity of the negative electrode cutting drum 10. Specifically, the second angular velocity of the negative electrode heating drum 12 is set such that the linear velocity is roughly same as the linear velocity of the bonding drum 18 to be described later. As one example, the second radius and the first radius are the same, and setting is performed to be the second angular velocity>the first angular velocity. In this case, the linear velocities of the negative electrode cutting drum 10 and the negative electrode heating drum 12 are different, and are the linear velocity of the negative electrode heating drum 12>the linear velocity of the negative electrode cutting drum 10. Accordingly, the electrode cutting head of the negative electrode cutting drum 10 is temporarily accelerated to be roughly same as the linear velocity of the negative electrode heating drum 12 in front of a position close to the negative electrode heating drum 12, and turns the relative speed with the negative electrode heating drum 12 to roughly zero. The electrode cutting head of the negative electrode cutting drum 10 discharges the sucked and held negative electrode plate to a side of the negative electrode heating drum 12 at the timing when the relative speed becomes roughly zero. The electrode cutting head of the negative electrode cutting drum 10 is switched to the speed before acceleration after discharging the sucked and held negative electrode plate.

The negative electrode heating drum 12 sucks and holds the negative electrode plate discharged from the negative electrode cutting drum 10, and heats (preliminarily heats) the negative electrode plate by a built-in heater. The figure illustrates that the negative electrode plate is heated at a position 13. The heating (preliminary heating) process is for heat-bonding a separator and the negative electrode plate in a subsequent bonding process. A location of heating by the negative electrode heating drum 12 is not limited to a specific position (for example, the position 13). The negative electrode heating drum 12 may be in a heated state at all times while the drum is rotated.

The positive electrode cutting drum 14 is a second electrode cutting drum, has a third radius, and is rotated around the central axis at a third angular velocity. To the positive electrode cutting drum 14, a belt-like positive electrode single plate P is supplied as a second electrode single plate. The positive electrode single plate P is a rectangular electrode assembly. The positive electrode single plate P is configured by a positive electrode current collector, and a positive electrode active material layer formed on the positive electrode current collector. The positive electrode active material layer may be formed on one surface of the positive electrode current collector, or may be formed on both surfaces. In the description below, it is assumed that the positive electrode active material layer is formed on both surfaces of the positive electrode current collector. The positive electrode active material layer includes a positive electrode active material and a binding material.

For both of the positive electrode current collector and the positive electrode active material layer, known materials can be used, and are exemplified as follows.

As the positive electrode current collector, foil of a metal which is stable in a potential range of the positive electrode, and a film for which the metal is arranged on a surface layer or the like can be used. As the positive electrode current collector, a porous body such as a mesh body, a punching sheet or an expand metal of the metal may be used. As the material of the positive electrode current collector, the stainless steel, the aluminum, the aluminum alloy, titanium or the like can be used. A thickness of the positive electrode current collector is preferably 3 μm or more and 50 μm or less for example, from the viewpoints of the current collection property, the mechanical strength or the like. The positive electrode single plate can be obtained by forming the positive electrode active material layer on the positive electrode current collector by applying/drying positive electrode mixture slurry including the positive electrode active material, the conductive material, the binding material or the like on the positive electrode current collector, and rolling the positive electrode active material layer, for example. The thickness of the positive electrode active material layer is not limited in particular, and is 10 μm or more and 100 μm or less for example.

The positive electrode active material is lithium transition metal oxide containing lithium (Li) and a transition metal element such as cobalt (Co), manganese (Mn) and nickel (Ni). An example of the conductive material included in the positive electrode active material layer is carbon powder such as carbon black, acetylene black, Ketjen black, graphite or the like. For them, one kind may be used alone or two or more kinds may be combined and used. Examples of the binding material included in the positive electrode active material layer are the fluorine-based polymer, the rubber-based polymer and the like. Examples of the fluorine-based polymer are polytetrafluoroethylene (PTFE), polyvinylidene fluoride (PVDF) and the modified product or the like, and examples of the rubber-based polymer are an ethylene-propylene-isoprene copolymer and an ethylene-propylene-butadiene copolymer. For them, one kind may be used alone or two or more kinds may be combined and used.

The positive electrode cutting drum 14 comprises a plurality of electrode cutting heads arranged in the circumferential direction of the drum. The electrode cutting head comprises an outer peripheral surface for sucking and holding the positive electrode single plate P, and cutting means. The cutting means are, for example, a blade moved in the direction roughly orthogonal to the circumferential direction of the outer peripheral surface. The supplied positive electrode single plate P is sucked and held on the outer peripheral surface and rotated. The electrode cutting heads suck and hold the positive electrode single plate P so that they are also referred to as holding heads. A gap is formed in the circumferential direction between the plurality of electrode cutting heads, and by the movement of the blade loaded on the electrode cutting head in the direction roughly orthogonal to the circumferential direction at the gap, the positive electrode single plate P sucked and held on the outer peripheral surface is cut to have a predetermined width (second width) by the blade. Similarly to the electrode cutting heads of the negative electrode cutting drum 10, the plurality of electrode cutting heads are each rotated around the common central axis of the positive electrode cutting drum 14, and the individual electrode cutting head is driven by a motor in the circumferential direction of the drum independent of the other electrode cutting heads. For example, when the two electrode cutting heads adjacent in the circumferential direction are an electrode cutting head 'a' and an electrode cutting head 'b', the electrode cutting head 'a' and the electrode cutting head 'b' are rotated around the common central axis of the drum at the fixed speed, and the mutual relative speed is changed for every predetermined section on the circumference of the positive electrode cutting drum 14. For example, the electrode cutting head 'a' and the electrode cutting head 'b' are both rotated at the fixed speed and the relative speed is 0 at a certain timing, but the electrode cutting head 'a' is accelerated in the direction of separating from the following electrode cutting head 'b' and the relative speed becomes finite at a different timing. By such independent drive of the electrode cutting head, the cutting position of the positive electrode single plate P by a round blade loaded on the electrode cutting head can be adjusted, and the position of a positive electrode plate generated by cutting can be adjusted. The moving speed of the electrode cutting head can be achieved by using the motor or the like corresponding to each electrode cutting head.

The positive electrode cutting drum 14 may comprise various kinds of cameras, and the position of the positive electrode single plate P before cutting may be monitored and also the positions of the plurality of positive electrode plates generated by cutting may be monitored by the cameras. The positive electrode cutting drum 14 sucks, holds and rotationally conveys the supplied positive electrode single plate P, cuts the positive electrode single plate P at a position 15 in FIG. 1, and generates the positive electrode plate. The electrode cutting head rotated while sucking and holding the positive electrode single plate P is rotated while sucking and holding the positive electrode single plate P to the position 15, and cuts the positive electrode single plate P by the loaded blade at the point of time of reaching the position 15. The positive electrode plate generated by cutting is rotationally conveyed while being kept sucked and held on the outer peripheral surface of each electrode cutting head.

The positive electrode heating drum 16 is a second electrode heating drum, and is arranged adjacently to the positive electrode cutting drum 14 so as to be close to the positive electrode cutting drum 14. The positive electrode heating drum 16 has a fourth radius, and is rotated around the central axis at a fourth angular velocity. The fourth radius of the positive electrode heating drum 16 may be the same as the third radius of the positive electrode cutting drum 14 or may be different. The fourth angular velocity of the positive electrode heating drum 16 is different from the third angular velocity of the positive electrode cutting drum 14. Specifically, the fourth angular velocity of the positive electrode heating drum 16 is set such that the linear velocity is roughly the same as the linear velocity of the bonding drum 18 to be described later. As one example, the fourth radius and the third radius are the same, and setting is performed to be the fourth angular velocity>the third angular velocity. In this case, the linear velocities of the positive electrode cutting drum 14 and the positive electrode heating drum 16 are different, and are the linear velocity of the positive electrode heating drum 16>the linear velocity of the positive electrode cutting drum 14. Accordingly, the electrode cutting head of the positive electrode cutting drum 14 is temporarily accelerated to be roughly the same as the linear velocity of the positive electrode heating drum 16 in front of the position close to the positive electrode heating drum 16, and turns the relative speed with the positive electrode heating drum 16 to roughly zero. The electrode cutting head of the positive electrode cutting drum 14 discharges the sucked and held positive electrode plate to the side of the positive electrode heating drum 16 at the timing when the relative speed becomes roughly zero. The electrode cutting head of the positive electrode cutting drum 14 is switched to a rotating speed before the acceleration after discharging the sucked and held positive electrode plate.

The positive electrode heating drum 16 sucks and holds the positive electrode plate discharged from the positive electrode cutting drum 14, and heats (preliminarily heats) the positive electrode plate by a built-in heater. The figure illustrates that the positive electrode plate is heated at a position 17. The heating (preliminary heating) process is for heat-bonding a separator and the positive electrode plate in the subsequent bonding process. The location of heating by the positive electrode heating drum 16 is not limited to a specific position (for example, the position 17). The positive electrode heating drum 16 may be in the heated state at all times while the drum is rotated.

The bonding drum 18 is arranged between the negative electrode heating drum 12 and the positive electrode heating drum 16 so as to be close to both of the negative electrode heating drum 12 and the positive electrode heating drum 16. The bonding drum 18 has a fifth radius, and is rotated around the central axis at a fifth angular velocity. To the bonding drum 18, a belt-like separator S1 is supplied as a first separator single plate, and a belt-like separator S2 is supplied as a second separator single plate. Further, the negative electrode plate heated by the negative electrode heating drum 12 is supplied and the positive electrode plate heated by the positive electrode heating drum 16 is supplied.

For the negative electrode plate, the linear velocity of the negative electrode heating drum 12 and the linear velocity of the bonding drum 18 are roughly the same, and the heated negative electrode plate sucked and held by the negative electrode heating drum 12 is discharged to the side of the bonding drum 18 at the position close to the bonding drum 18. In addition, also for the positive electrode plate, the linear velocity of the positive electrode heating drum 16 and the linear velocity of the bonding drum 18 are roughly the same, and the heated positive electrode plate sucked and held by the positive electrode heating drum 16 is discharged to the side of the bonding drum 18 at the position close to the bonding drum 18.

Note that, since the linear velocity of the negative electrode heating drum 12 and the linear velocity of the bonding drum 18 are roughly the same, the linear velocity of the electrode cutting head of the negative electrode cutting drum 10 in front of the position close to the negative electrode heating drum 12 is roughly the same as the linear velocity of the bonding drum 18. In addition, since the linear velocity of the positive electrode heating drum 16 and the linear velocity of the bonding drum 18 are roughly the same, the linear velocity of the electrode cutting head of the positive electrode cutting drum 14 in front of the position close to the positive electrode heating drum 16 is roughly the same as the linear velocity of the bonding drum 18. Accordingly, the electrode cutting head discharges the sucked and held negative electrode plate or positive electrode plate at the timing when the linear velocity becomes roughly the same with the bonding drum 18.

By the bonding drum 18, the belt-like separator S1 is sucked and held at a predetermined position. Thereafter, at the position close to the negative electrode heating drum 12 positioned on a downstream side of a rotation direction, the heated negative electrode plate discharged from the negative electrode heating drum 12 is arranged on the separator S1. Then, the belt-like separator S2 is arranged on the negative electrode plate at a predetermined position on the further downstream side of the rotation direction. Thereafter, the separator S1, the negative electrode plate and the separator S2 are bonded by being pressurized by a thermocompression bonding roller 19, the heated positive electrode plate discharged from the positive electrode heating drum 16 is arranged in the separator S2 at the position near the positive electrode heating drum 16 positioned on the further downstream side of the rotation direction, and the positive electrode plate is bonded by pressing force of the positive electrode heating drum 16. On the surfaces of the separator S1 and the separator S2, a heat bonding layer where adhesiveness is not expressed at a room temperature but the adhesiveness is expressed by heating is formed.

The heat bonding layer is a thermoplastic layer containing a thermoplastic polymer for example, and bonds the belt-like separator S1 and the negative electrode plate, the negative electrode plate and the belt-like separator S2, and the belt-like separator S2 and the positive electrode plate by utilizing plastic deformation of the thermoplastic polymer by heating. In such a manner, a 4-layer laminated body of the belt-like separator S lithe negative electrode plate/the belt-like separator S2/the positive electrode plate is generated at the bonding drum 18. The 4-layer laminated body is conveyed from the bonding drum 18 to the separator cutting drum 20.

On the other hand, at an interval of every fixed number of pieces, the positive electrode plate is not supplied from the positive electrode cutting drum 14 and the positive electrode plate is not supplied from the positive electrode heating drum 16 either. Therefore, the positive electrode plate is not supplied to the bonding drum 18 at the interval of every fixed number of pieces, and a 3-layer laminated body of the belt-like separator S1/the negative electrode plate/the belt-like separator S2 is generated at the bonding drum 18. The 3-layer laminated body is conveyed from the bonding drum 18 to the separator cutting drum 20 similarly to the 4-layer laminated body.

The separator cutting drum 20 has a sixth radius, and is rotated around the central axis at a sixth angular velocity. The separator cutting drum 20 comprises a plurality of separator cutting heads arranged in the circumferential direction of the drum. The separator cutting head comprises an outer peripheral surface for sucking and holding the 4-layer laminated body and the 3-layer laminated body, and cutting means. The cutting means are, for example, a blade moved in the direction roughly orthogonal to the circumferential direction of the outer peripheral surface. The conveyed 4-layer laminated body and 3-layer laminated body are sucked and held on the outer peripheral surface and rotated. The separator cutting heads suck and hold the 4-layer laminated body and the 3-layer laminated body so that they are also referred to as holding heads. A gap is formed in the circumferential direction between the plurality of separator cutting heads, and by the movement of the blade loaded on the separator cutting head in the direction roughly orthogonal to the circumferential direction at the gap, the 4-layer laminated body and the 3-layer laminated body sucked and held on the outer peripheral surface are cut to have a predetermined width (third width) by the blade. Specifically, the belt-like separator S1 and the belt-like separator S2 are cut between the adjacent negative electrode plates arranged at a predetermined interval of the 4-layer laminated body of the belt-like separator S1/the negative electrode plate/the belt-like separator S2/the positive electrode plate, or between the adjacent negative electrode plates arranged at the predetermined interval of the 3-layer laminated body of the belt-like separator S lithe negative electrode plate/the belt-like separator S2, or between the adjacent negative electrode plates arranged at the predetermined interval of the 4-layer laminated body and the 3-layer laminated body. The figure illustrates that cutting is performed at a position 21.

The laminating drum 22 has a seventh radius, and is rotated around the central axis at a seventh angular velocity. The linear velocity of the laminating drum is adjusted to be roughly the same as the linear velocity of the separator cutting drum 20. The laminating drum 22 comprises a plurality of laminating heads arranged in the circumferential direction of the drum. The laminating head comprises an outer peripheral surface for sucking and holding the cut 4-layer laminated body and 3-layer laminated body. The plurality of laminating heads are each rotated around the common central axis of the laminating drum 22, and the individual laminating head is driven by a cam in the circumferential direction of the drum independent of the other laminating heads. For example, when the two laminating heads adjacent in the circumferential direction are a laminating head ‘a’ and a laminating head ‘b’, the laminating head ‘a’ and the laminating head ‘b’ are rotated around the common central axis of the drum at the fixed speed, and the mutual relative speed is changed for every predetermined section on the circumference of the laminating drum 22. For example, the laminating head ‘a’ and the laminating head ‘b’ are both rotated at the fixed speed so that the relative speed is 0 at a certain timing, but the laminating head ‘a’ is accelerated in the direction of separating from the following laminating head ‘b’ and the relative speed becomes finite at a different timing. By such independent drive of the laminating head, a stop state at a laminating position of a specific laminating head is made possible while maintaining rotation at the fixed angular velocity as the entire laminating drum 22, and the cut 4-layer laminated body and 3-layer laminated body sucked and held on the outer peripheral surface can be discharged and arranged on a laminating stage 24 in the stop state.

The laminating stage 24 is arranged right under the laminating drum 22. On the laminating stage 24, the cut 4-layer laminated body and 3-layer laminated body discharged from the laminating drum 22 are successively laminated and a laminated electrode assembly is formed. The laminating stage 24 is drivable in two axial (X axis and Y axis) direction orthogonal to each other, an inclination angle (θ) on an X-Y plane is adjustable, and thus positioning is performed by adjusting the position (XY position) and the inclination angle (θ) of the cut 4-layer laminated body and 3-layer laminated body discharged from the laminating drum 22, the cut 4-layer laminated body and 3-layer laminated body are successively laminated, and the laminated electrode assembly is manufactured. The laminating stage 24 comprises claws at four corners, and the laminated 4-layer laminated body and 3-layer laminated body are pressed and fixed by the claws. The laminated 3-layer laminated body and 4-layer laminated body are pressurized and/or heated, and bonded to each other.

An outline of a manufacturing process of the laminated electrode assembly is put in order as follows.

(1) The negative electrode plate is generated by cutting negative electrode single plate on the drum.

(2) The negative electrode plate is heated on the drum.

(3) The positive electrode plate is generated by cutting the positive electrode single plate on the drum.

(4) The positive electrode plate is heated on the drum.

(5) The belt-like separator and the negative electrode plate are bonded on the drum, the belt-like separator is bonded further on the drum, and the positive electrode plate is bonded further on the drum.

(6) The 3-layer laminated body and the 4-layer laminated body are generated by cutting the belt-like separator on the drum.

(7) The 3-layer laminated body and the 4-layer laminated body are laminated by the drum.

(8) The laminated 3-layer laminated body and 4-layer laminated body are pressurized and/or heated to be bonded to each other.

By executing the individual processes of cutting, heating, bonding and laminating on the drums in such a manner, high-speed and continuous processing is made possible.

Figure 2:
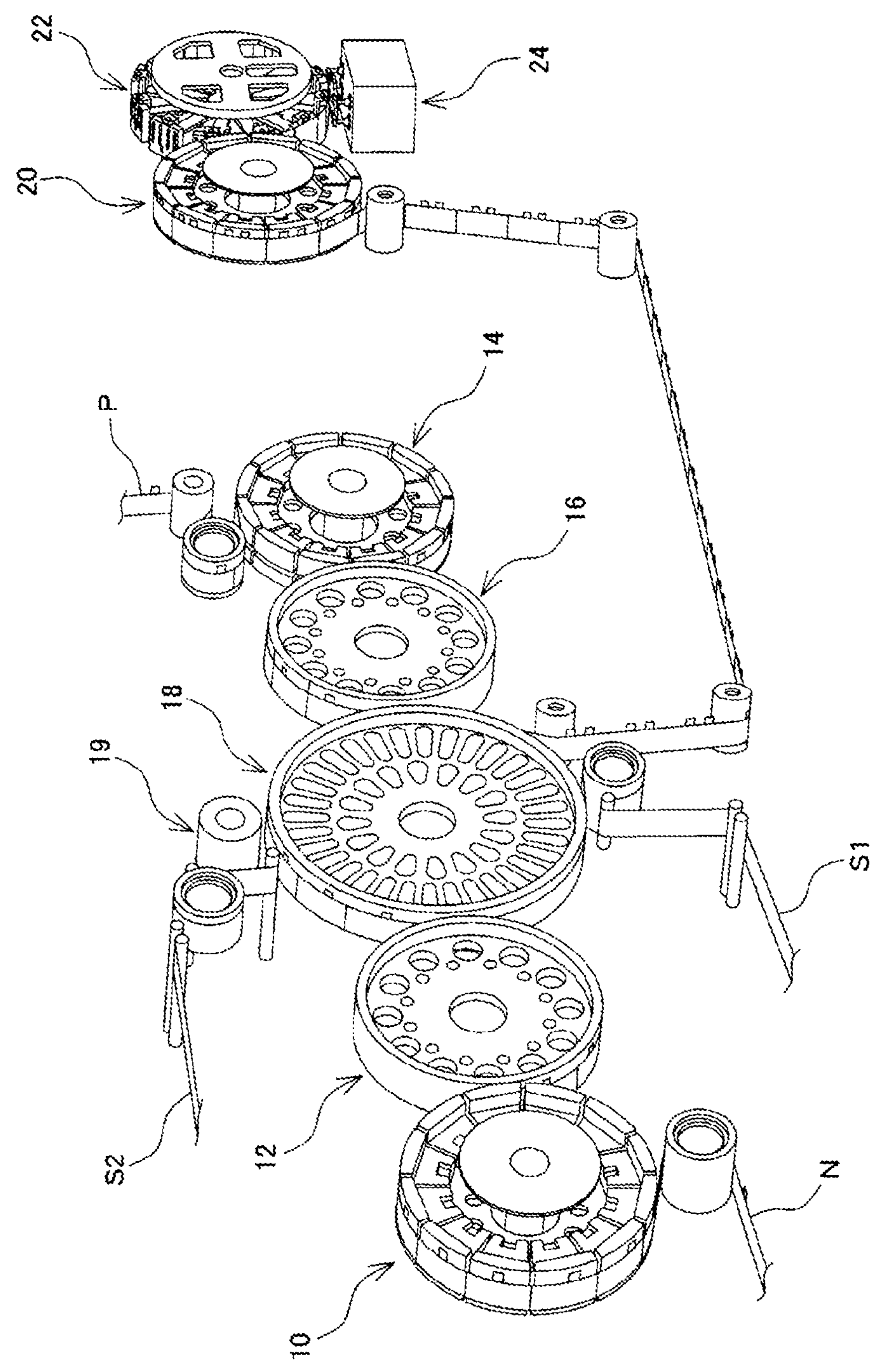
FIG. 2 is a configuration perspective view of the manufacturing device of the embodiment.

FIG. 2 illustrates a specific configuration perspective view of the manufacturing device in the embodiment.

In the order from left in the figure, the negative electrode cutting drum 10, the negative electrode heating drum 12, the bonding drum 18, the positive electrode heating drum 16 and the positive electrode cutting drum 14 are closely arranged. The negative electrode cutting drum 10 and the negative electrode heating drum 12 are closely arranged, the negative electrode heating drum 12 and the bonding drum 18 are closely arranged, the positive electrode cutting drum 14 and the positive electrode heating drum 16 are closely arranged, and the positive electrode heating drum 16 and the bonding drum 18 are closely arranged. The negative electrode cutting drum 10, the negative electrode heating drum 12, the bonding drum 18, the positive electrode heating drum 16 and the positive electrode cutting drum 14 are each rotated around the central axis, and their central axes are approximately parallel to each other.

To the negative electrode cutting drum 10, the belt-like negative electrode single plate N the tension of which is adjusted by a tension roller is supplied. The negative electrode cutting drum 10 comprises the plurality of cutting heads rotated around the central axis, 12 electrode cutting heads arranged in the circumferential direction for example, and the belt-like negative electrode single plate N is sucked and held on the outer peripheral surface of the electrode cutting heads and rotated together with the electrode cutting heads.

The plurality of electrode cutting heads are each provided with the blade moved in the direction roughly orthogonal to the circumferential direction, that is a width direction of the negative electrode cutting drum, and the blade is moved in the width direction of the drum in a fixed range of the rotation direction and cuts the negative electrode single plate N. After cutting the negative electrode single plate N, the electrode cutting head is moved in the circumferential direction independent of the other electrode cutting heads, the gap between the negative electrode plates is adjusted, and the relative speed is turned to roughly 0 at the position close to the negative electrode heating drum 12.

The negative electrode plate sucked and held by the electrode cutting head of the negative electrode cutting drum 10 is supplied to the negative electrode heating drum 12 at the position close to the negative electrode heating drum 12. Specifically, on the outer peripheral surface of the electrode cutting head (holding head), suction holes for sucking and holding the negative electrode plate are formed, and a groove extending in the circumferential direction is formed. To the groove formed on the holding head, supply means to be engaged with the groove to separate the negative electrode plate which is the electrode assembly from a suction surface of the holding head and supply it to the drum of a next stage are arranged between the holding head and the drum of the next stage. As the supply means, for example, a belt conveyor is inserted into the groove at the position close to the negative electrode heating drum 12, the negative electrode plate sucked and held by the electrode cutting head is made to get on the belt conveyor, and the negative electrode plate is supplied to the side of the negative electrode heating drum 12 via the belt conveyor. The belt conveyor will be further described later. The negative electrode cutting drum 10 rotationally conveys the negative electrode plate at the predetermined interval.

To the negative electrode heating drum 12, the negative electrode plates cut by the negative electrode cutting drum 10 are successively supplied. The negative electrode heating drum 12 is rotated at the roughly same linear velocity as the bonding drum 18, heats the negative electrode plates and rotationally conveys the heated negative electrode plates to the position close to the bonding drum 18.

In addition, to the positive electrode cutting drum 14, the belt-like positive electrode single plate P the tension of which is adjusted by a plurality of tension rollers is supplied. The positive electrode cutting drum 14 comprises the plurality of cutting heads rotated around the central axis, 12 electrode cutting heads arranged in the circumferential direction for example, and the belt-like positive electrode single plate P is sucked and held on the outer peripheral surface of the electrode cutting heads and rotated together with the electrode cutting heads.

The plurality of electrode cutting heads are each provided with the blade moved in the direction roughly orthogonal to the circumferential direction, that is the width direction of the positive electrode cutting drum, and the blade is moved in the width direction of the drum in the fixed range of the rotation direction and cuts the positive electrode single plate P. After cutting the positive electrode single plate P, the electrode cutting head is moved in the circumferential direction independent of the other electrode cutting heads, the gap between the positive electrode plates is adjusted, and the relative speed is turned to roughly 0 at the position close to the positive electrode heating drum 16.

The positive electrode plate sucked and held by the electrode cutting head of the positive electrode cutting drum 14 is supplied to the positive electrode heating drum 16 at the position close to the positive electrode heating drum 16. Specifically, on the outer peripheral surface of the electrode cutting head (holding head), suction holes for sucking and holding the positive electrode plate are formed, and a groove extending in the circumferential direction is formed. To the groove formed on the holding head, supply means to be engaged with the groove to separate the positive electrode plate which is the electrode assembly from the suction surface of the holding head and supply it to the drum of the next stage are arranged between the holding head and the drum of the next stage.

As the supply means, for example, a belt conveyor is inserted into the groove at the position close to the positive electrode heating drum 16, the positive electrode plate sucked and held by the electrode cutting head is made to get on the belt conveyor, and the positive electrode plate is supplied to the side of the positive electrode heating drum 16 via the belt conveyor.

The positive electrode cutting drum 14 rotationally conveys the positive electrode plate at the predetermined interval.

To the positive electrode heating drum 16, the positive electrode plates cut by the positive electrode cutting drum 14 are successively supplied. The positive electrode heating drum 16 is rotated at the roughly same linear velocity as the bonding drum 18, heats the positive electrode plates and rotationally conveys the heated positive electrode plates to the position close to the bonding drum 18.

To the bonding drum 18, the belt-like separators S1 and S2 the tension of which is adjusted by the plurality of tension rollers are supplied. In addition, the heated negative electrode plates are supplied at the position close to the negative electrode heating drum 12, and the heated positive electrode plates are supplied at the position close to the positive electrode heating drum 16. The bonding drum 18 is rotated to be in the same direction as the linear velocity of the negative electrode heating drum 12 and the linear velocity of the positive electrode heating drum 16. In the order from an upstream side to the downstream side of the rotation direction of the bonding drum 18, a supply position of the separator S1, a supply position of the negative electrode plate, a supply position of the separator S2 and a supply position of the positive electrode plate are arranged. Between the supply position of the separator S2 and the supply position of the positive electrode plate, the thermocompression bonding roller 19 is arranged.

The bonding drum 18 sucks and holds the belt-like separator S1 on the outer peripheral surface and rotationally conveys the separator S1. Then, at the position close to the negative electrode heating drum 12, the heated negative electrode plates are arranged on the separator S1 at the predetermined interval and pressurized by an inter-drum pressure. The bonding drum 18 holds and rotationally conveys the negative electrode plates arranged at the predetermined interval on the separator S1, the belt-like separator S2 is arranged on the negative electrode plates at the supply position of the separator S2, and the 3-layer laminated body of the separator S1/the negative electrode plate/the separator S2 is pressure-bonded by the pressing force by the thermocompression bonding roller 19.

The 3-layer laminated body thermocompression-bonded by the thermocompression bonding roller 19 is rotationally conveyed further to the position close to the positive electrode heating drum 16, and the positive electrode plates are arranged at the predetermined interval on the separator S2 at the position close to the positive electrode heating drum 16 and pressurized by the inter-drum pressure. The positive electrode plates are thermocompression-bonded to the separator S2 by the inter-drum pressure. In addition, the rotation of the positive electrode cutting drum 14 and the positive electrode heating drum 16 is stopped at the interval of every fixed number of pieces, and the supply of the positive electrode plates from the positive electrode heating drum 16 to the bonding drum 18 is stopped. Thus, the positive electrode plate is not arranged on the separator S2 and the 3-layer laminated body is left as it is. The 3-layer laminated body formed of the belt-like separator S1/the negative electrode plate/the belt-like separator S2 and the 4-layer laminated body formed of the belt-like separator S1/the negative electrode plate/the belt-like separator S2/the positive electrode plate are conveyed to the separator cutting drum 20 via the plurality of tension rollers. Note that, instead of stopping the rotation of the positive electrode cutting drum 14 and the positive electrode heating drum 16 at the timing of obtaining the 3-layer laminated body, the 3-layer laminated body may be created and prepared separately and the 3-layer laminated body may be introduced by a route different from an introducing route of the 4-layer laminated body.

While the 3-layer laminated body and the 4-layer laminated body are thermocompression-bonded by the inter-drum pressure of the negative electrode heating drum 12 and the bonding drum 18, the inter-drum pressure of the positive electrode heating drum 16 and the bonding drum 18 and the pressing force by the thermocompression bonding roller 19, when an end of the negative electrode plate cut by the negative electrode cutting drum 10 and an end of the positive electrode plate cut by the positive electrode cutting drum 14 are pressed by the drum or the roller, the end of the negative electrode plate and the end of the positive electrode plate may be damaged. Therefore, by temporarily mitigating pressing by the inter-drum pressure and the thermocompression bonding roller 19 at the end of the negative electrode plate cut by the negative electrode cutting drum 10 and the end of the positive electrode plate cut by the positive electrode cutting drum 14, damages are prevented. By mitigating the pressing at not only the end of the negative electrode plate cut by the negative electrode cutting drum 10 and the end of the positive electrode plate cut by the positive electrode cutting drum 14 but also the ends on four sides of the negative electrode plate and the ends on four sides of the positive electrode plate, the damages of the negative electrode plate and the positive electrode plate can be suppressed. That is, it is further preferable to bond only the inside of the negative electrode plate and the inside of the positive electrode plate with the separator for suppressing the damages of the negative electrode plate and the positive electrode plate.

The separator cutting drum 20 may be arranged separately from the negative electrode cutting drum 10, the negative electrode heating drum 12, the bonding drum 18, the positive electrode heating drum 16 and the positive electrode cutting drum 14 which are a group of drums.

The separator cutting drum 20 sucks and holds the 3-layer laminated body and the 4-layer laminated body supplied via the tension rollers on the outer peripheral surface, and cuts the belt-like separators S1 and S2 of the 3-layer laminated body and the 4-layer laminated body by a plurality of separator cutting head structures similar to the negative electrode cutting drum 10. The cut 3-layer laminated body and 4-layer laminated body are rotationally conveyed to the position close to the laminating drum 22 while being kept sucked and held by the separator cutting heads. On the outer peripheral surface of the separator cutting head, suction holes for sucking and holding the 3-layer laminated body and the 4-layer laminated body are formed.

The separator cutting drum 20 rotationally conveys the 3-layer laminated body or the 4-layer laminated body at the predetermined interval.

The laminating drum 22 is arranged closely to the separator cutting drum 20, and is rotated roughly the same as the linear velocity of the separator cutting drum 20. The laminating drum 22 is configured by the plurality of laminating heads rotated around a drum rotation center. For the laminating head, a longitudinal section shape is roughly T-shaped, suction holes for sucking and holding the 3-layer laminated body and the 4-layer laminated body are formed on the outer peripheral surface, and a vacuum pad is provided inside the suction hole. The 3-layer laminated body and the 4-layer laminated body sucked and held by the separator cutting drum 20 are sucked by the laminating head via the vacuum pad. The plurality of laminating heads are each rotated around the common central axis of the laminating drum 22, and the individual laminating head is driven in the circumferential direction of the drum independent of the other laminating heads, and is further driven in a radial direction of the drum. That is, the laminating head rotationally conveys the 3-layer laminated body and the 4-layer laminated body to the position close to the laminating stage 24 while sucking and holding them. When the position close to the laminating stage 24 is reached, the relative speed in the circumferential direction of the drum to the laminating stage 24 becomes 0, and the laminating head is moved in the direction of approaching the laminating stage 24 in the radial direction of the drum. The laminating head brings the sucked and held 3-layer laminated body or 4-layer laminated body into contact with the laminating stage 24 or, in the case where the 3-layer laminated body or the 4-layer laminated body is already laminated on the laminating stage 24, brings them into contact on the laminated body, turns off sucking and holding force and laminates the sucked and held 3-layer laminated body or 4-layer laminated body. Thereafter, the laminating head is moved in the direction of separating from the laminating stage 24 in the radial direction of the drum again, and restarts the rotation.

The above is the whole description.

Note that, for delivery of the 3-layer laminated body and the 4-layer laminated body from the separator cutting drum 20 to the laminating drum 22 a method via the vacuum pad provided on the laminating head of the laminating drum 22 has been described but it is not limited thereto. It may be by the method of providing a groove on the separator cutting drum similarly to the positive electrode cutting drum and the negative electrode cutting drum and delivering the 3-layer laminated body and the 4-layer laminated body to the laminating drum 22 via a belt conveyor.

In addition, the positive electrode plates and the negative electrode plates may be delivered from the positive electrode cutting drum and the negative electrode cutting drum to the respective heating drums and the bonding drum not by the belt conveyor but by the vacuum pad. Note that a drum which supplies the electrode assembly or the laminated body of the positive electrode plate and the negative electrode plate or the like to a suction pad is referred to as a first drum, and a drum comprising the suction pad is referred also as a second drum.

Next, details of the manufacturing process of the 3-layer laminated body and the 4-layer laminated body will be described.

Figure 3:
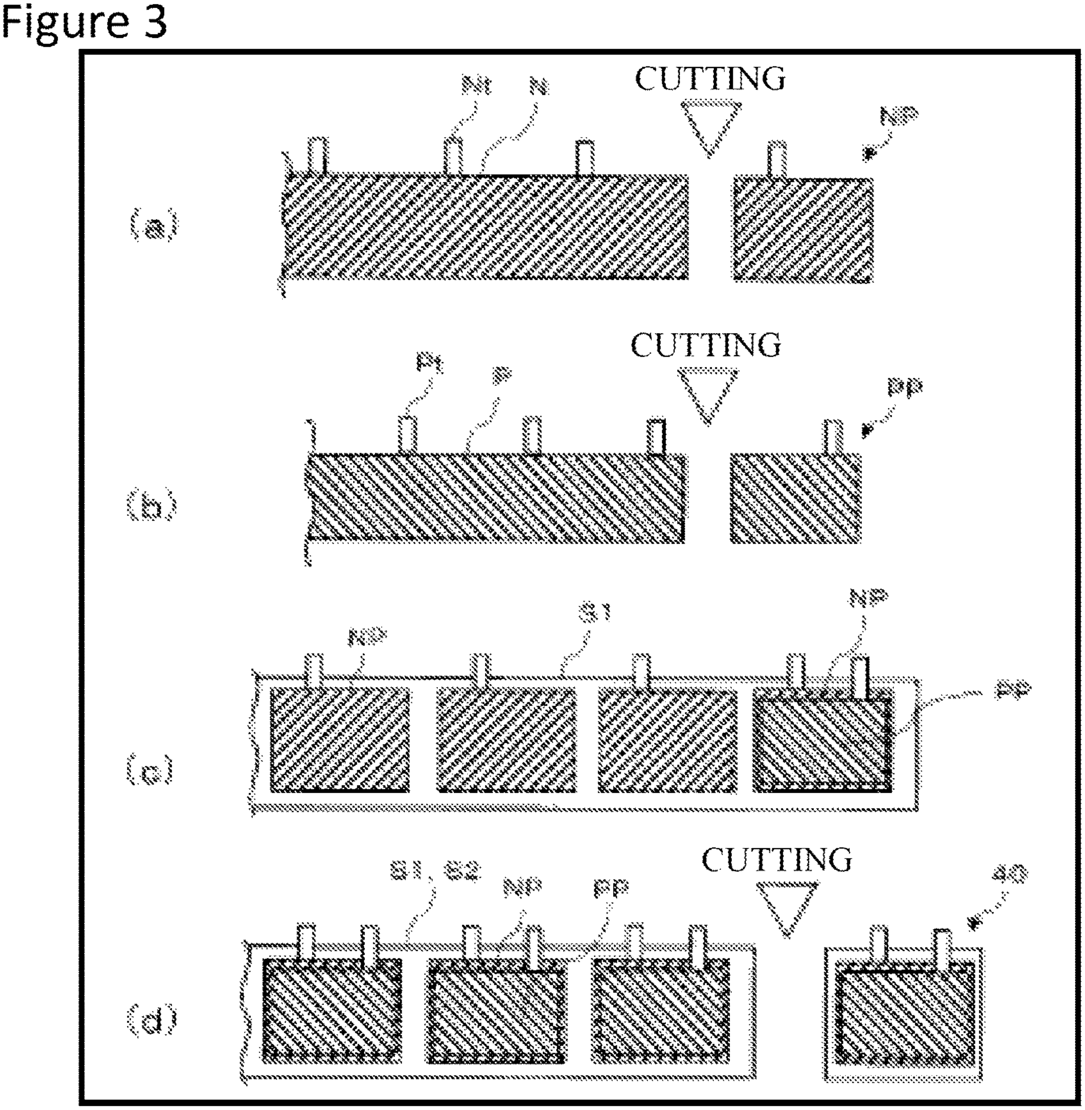
FIG. 3 is an explanatory diagram illustrating a manufacturing method of a 4-layer laminated body of the embodiment.
Figure 4:
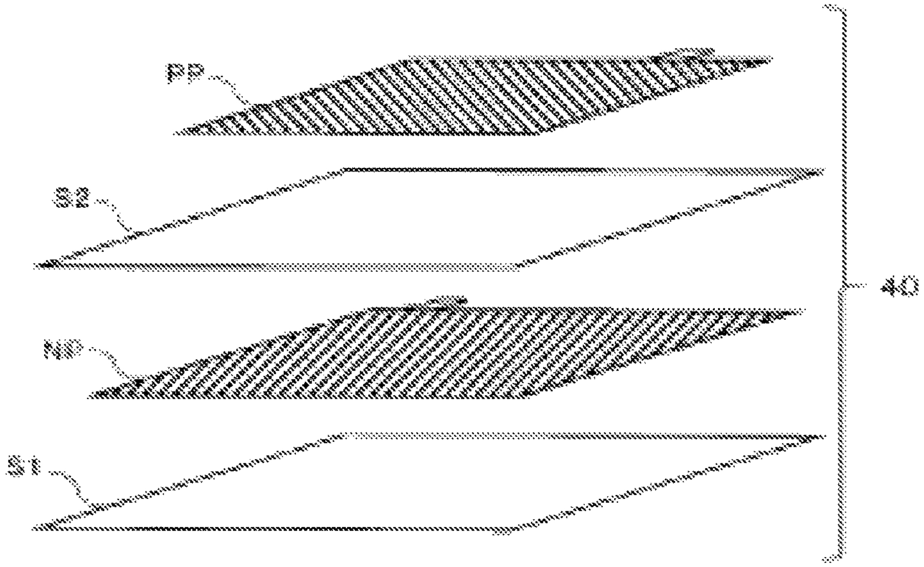
FIG. 4 is a configuration diagram of the 4-layer laminated body of the embodiment.

FIG. 3 and FIG. 4 schematically illustrate the manufacturing process of the 4-layer laminated body to be a base.

FIG. 3(*a*) illustrates a situation of negative electrode cutting at the negative electrode cutting drum 10. On the negative electrode single plate N comprising the negative electrode current collector and the negative electrode active material layer, tabs Nt are formed at a fixed interval. The tab Nt is formed integrally with the negative electrode current collector, and is formed to project from one edge of the negative electrode current collector (formed to project in the direction orthogonal to an extending direction of the belt-like negative electrode single plate N). The negative electrode cutting drum 10 cuts the negative electrode single plate N at the fixed interval and generates the negative electrode plates NP of the first width. At one edge of the negative electrode plate NP, the tab Nt is formed.

FIG. 3(*b*) illustrates the situation of positive electrode cutting at the positive electrode cutting drum 14. On the positive electrode single plate P comprising the positive electrode current collector and the positive electrode active material layer, tabs Pt are formed at the fixed interval. The tab Pt is formed integrally with the positive electrode current collector, and is formed to project from one edge of the positive electrode current collector (formed to project in the direction orthogonal to the extending direction of the belt-like positive electrode single plate P). The positive electrode cutting drum 14 cuts the positive electrode single plate P at the fixed interval and generates the positive electrode plates PP of the second width. At one edge of the positive electrode plate PP, the tab Pt is formed. A size of the positive electrode plate PP is smaller than the size of the negative electrode plate NP. In addition, the interval (pitch) of the tab Pt of the positive electrode plate PP is smaller than the interval (pitch) of the tab Nt of the negative electrode plate NP.

FIG. 3(*c*) illustrates the situation of bonding at the bonding drum 18. The negative electrode plates NP are arranged at the fixed interval and bonded on the belt-like separator S1, the belt-like separator S2 is arranged and bonded thereon, and the positive electrode plates PP are arranged at the fixed interval and bonded so as to be piled up on the negative electrode plates NP further. The positive electrode plate PP is arranged inside an existence area of the negative electrode plate NP. Even though the negative electrode plates NP and the positive electrode plates PP are separate from each other, since the belt-like separators S1 and S2 are not cut yet and are still in a belt shape, they are the belt-like 4-layer laminated body as a whole.

FIG. 3(*d*) illustrates the situation of cutting at the separator cutting drum 20. The separator cutting drum 20 cuts the belt-like 4-layer laminated body at the fixed interval, that is between the adjacent negative electrode plates NP, and generates 4-layer laminated bodies 40 of the third width for which the separators S1 and S2 are cut off.

FIG. 4 illustrates a configuration of the 4-layer laminated body 40. The separator S1 is arranged in a bottom layer, the negative electrode plate NP is laminated thereon, the separator S2 is laminated thereon, and the positive electrode plate PP is laminated thereon further.

Figure 5:
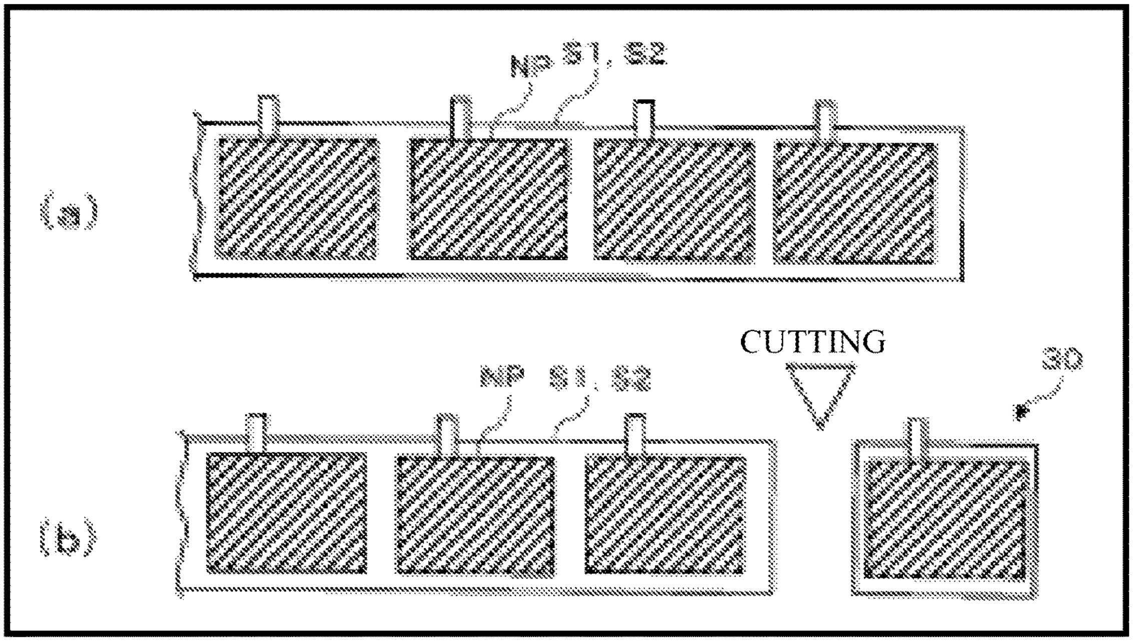
FIG. 5 is an explanatory diagram illustrating a manufacturing method of a 3-layer laminated body of the embodiment.
Figure 6:
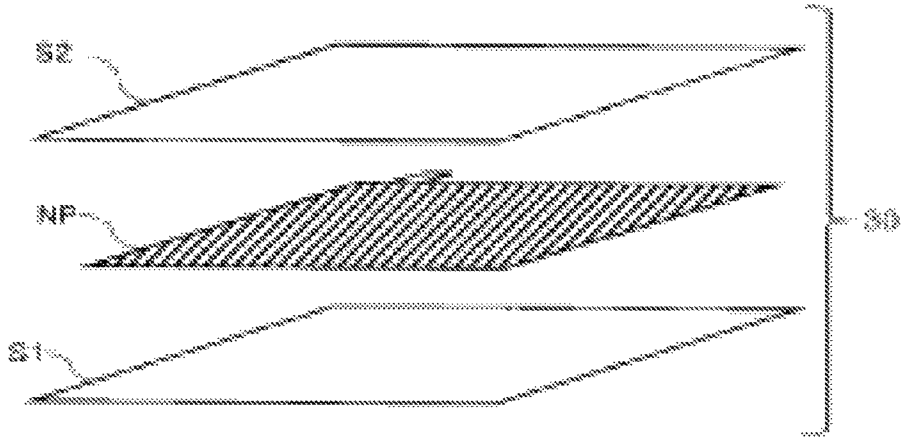
FIG. 6 is a configuration diagram of the 3-layer laminated body of the embodiment.

FIG. 5 and FIG. 6 schematically illustrate the manufacturing process of the 3-layer laminated body.

FIG. 5(*a*) illustrates the situation of bonding at the bonding drum 18. The negative electrode plates NP are arranged at the fixed interval and bonded on the belt-like separator S1, and the belt-like separator S2 is arranged and bonded thereon. For the positive electrode plate PP, the positive electrode plate PP is not arranged at the interval of every fixed number of pieces. Even though the negative electrode plates NP are separate from each other, since the belt-like separators S1 and S2 are not cut yet and are still in the belt shape, they are the belt-like 3-layer laminated body as a whole.

FIG. 5(*b*) illustrates the situation of cutting at the separator cutting drum 20. The separator cutting drum 20 cuts the belt-like 3-layer laminated body at the fixed interval, that is between the adjacent negative electrode plates NP, and generates 3-layer laminated bodies 30 of the third width for which the separators S1 and S2 are cut off. The 3-layer laminated body 30 is generated at the interval of every fixed number of pieces. That is like the 4-layer laminated body 40, the 4-layer laminated body 40, the 3-layer laminated body 30, the 4-layer laminated body . . . .

FIG. 6 illustrates the configuration of the 3-layer laminated body 30. The separator S1 is arranged in the bottom layer, the negative electrode plate NP is laminated thereon, and the separator S2 is laminated thereon.

As above, the 3-layer laminated body 30 and 4-layer laminated body 40 are generated and are supplied from the separator cutting drum 20 to the laminating drum 22.

Figure 7:
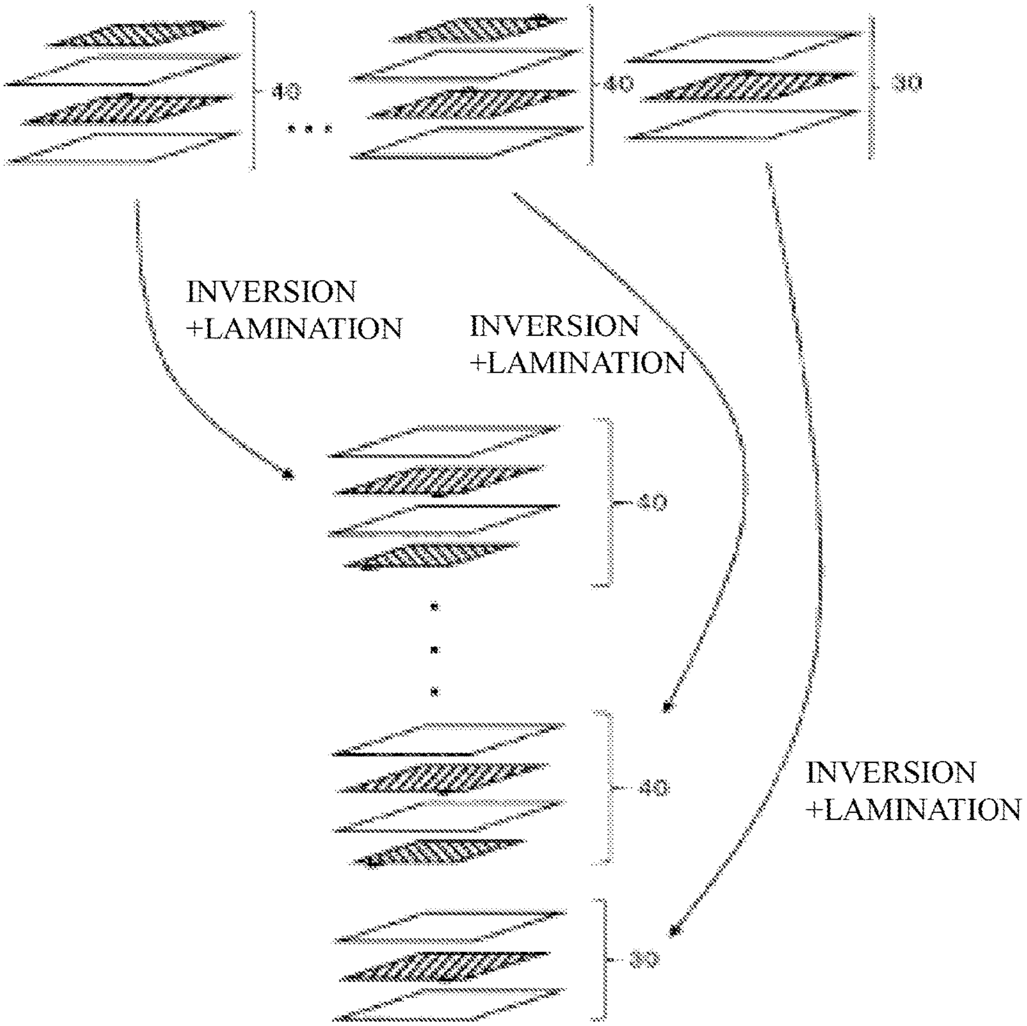
FIG. 7 is a lamination explanatory diagram of the 3-layer laminated body and the 4-layer laminated body of the embodiment.

FIG. 7 schematically illustrates a laminating process at the laminating drum 22.

When the 3-layer laminated body 30 and 4-layer laminated body 40 in a rectangular shape are received from the separator cutting drum 20, the laminating drum 22 successively arranges and laminates them on the laminating stage 24. That is, when the 3-layer laminated body 30 of the separator S1/the negative electrode plate NP/the separator S2 is received, it is inverted upside down to be the separator S2/the negative electrode plate NP/the separator S1 and arranged on the laminating stage 24.

Next, when the 4-layer laminated body 40 of the separator S1/the negative electrode plate NP/the separator S2/the positive electrode plate PP is received, the laminating drum 22 inverts it upside down to be the positive electrode plate PP/the separator S2/the negative electrode plate NP/the separator S1 and arranges and laminates it on the 3-layer laminated body 30 on the laminating stage 24. Thus, on the laminating stage 24, the separator S2/the negative electrode plate NP/the separator S1/the positive electrode plate PP/the separator S2/the negative electrode plate NP/the separator S1 are laminated. Hereinafter, the laminating drum 22 receives the 4-layer laminated body 40, inverts it upside down, and arranges and laminates it on the 4-layer laminated body 40 of the laminating stage 24 similarly. Thus, the separator S2/the negative electrode plate NP/the separator S1/the positive electrode plate PP/the separator S2/the negative electrode plate NP/the separator S1/the positive electrode plate PP/the separator S2/the negative electrode plate NP/the separator S1/ . . . /the positive electrode plate PP/the separator S2/the negative electrode plate NP/the separator S1 are laminated. The laminating drum 22 manufactures the laminated electrode assembly by successively laminating one 3-layer laminated body 30 and a predetermined number of 4-layer laminated bodies 40 on the laminating stage 24. By combining and laminating the 3-layer laminated body 30 and the 4-layer laminated bodies 40, the laminated electrode assembly in the rectangular shape for which electrodes at both ends are always the negative electrode plate NP can be obtained.

Note that the configuration of inversion and lamination is just an example, and it is needless to say that the other lamination methods are also possible. For example, the 4-layer laminated body may be laminated first without being inverted and the 3-layer laminated body may be laminated without being inverted at last.

Figure 8:
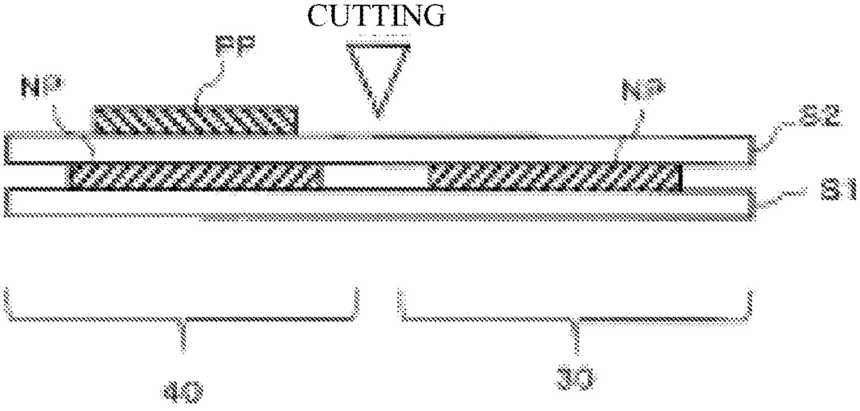
FIG. 8 is a cutting explanatory diagram of a separator of the embodiment.
Figure 9:
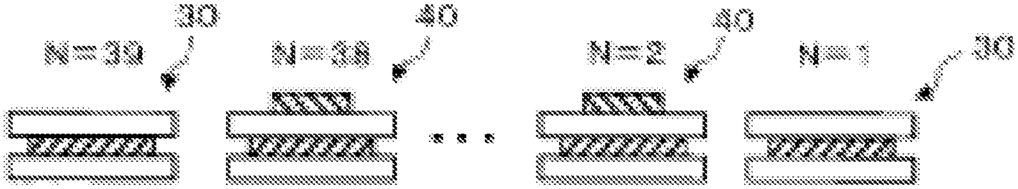
FIG. 9 is a generation order explanatory diagram of the 3-layer laminated body and the 4-layer laminated body of the embodiment.
Figure 10:
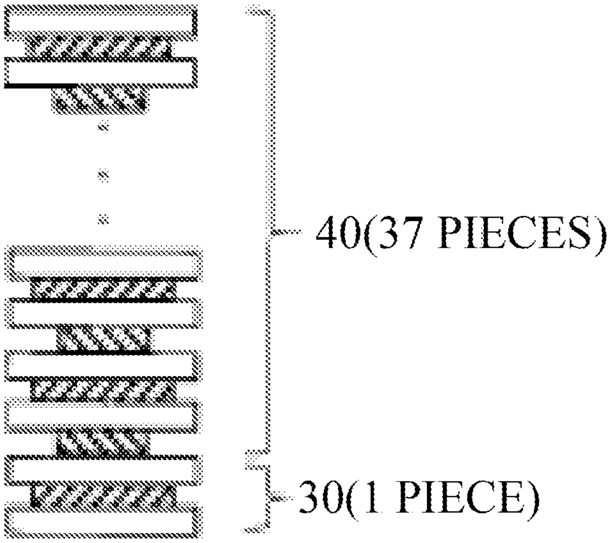
FIG. 10 is a configuration diagram of a laminated electrode assembly of the embodiment.

FIG. 8-FIG. 10 more specifically illustrate the laminating process of the 3-layer laminated body 30 and the 4-layer laminated body 40.

FIG. 8 illustrates a separator cutting process at the separator cutting drum 20. The belt-like 3-layer laminated body 30 and 4-layer laminated body 40 bonded at the bonding drum 18 are cut and separated at a roughly middle position between the adjacent negative electrode plates NP. Similarly, the belt-like 4-layer laminated bodies 40 are also cut and separated from each other at the roughly middle position between the adjacent negative electrode plates NP.

FIG. 9 illustrates the cut 3-layer laminated bodies 30 and 4-layer laminated bodies 40. When it is assumed that a blank of the positive electrode plate PP is generated at the interval of every 38 pieces of the positive electrode plates PP for example, 37 pieces of the 4-layer laminated bodies 40 follow after one 3-layer laminated body 30, one 3-layer laminated body 30 is generated again thereafter, and 37 pieces of 4-layer laminated bodies 40 are generated further thereafter. When N is defined as a counter variable, it is the 3-layer laminated body 30 when N=1, it is the 4-layer laminated body 40 when N=2, it is the 4-layer laminated body 40 when N=3, . . . , it is the 4-layer laminated body 40 when N=38, it is the 3-layer laminated body 30 when N=39, and it is the 4-layer laminated body 40 when N=40.

FIG. 10 illustrates the configuration of the laminated electrode assembly formed by arranging the 3-layer laminated body 30 on the laminating stage 24 first and successively laminating the 4-layer laminated bodies 40 thereon. It is the configuration for which one 3-layer laminated body 30 and 37 pieces of the 4-layer laminated bodies 40 are laminated. The electrodes at both ends of the laminated electrode assembly are the negative electrode plate NP.

Next, a specific configuration of the electrode cutting head will be described more in detail.

Figure 11:
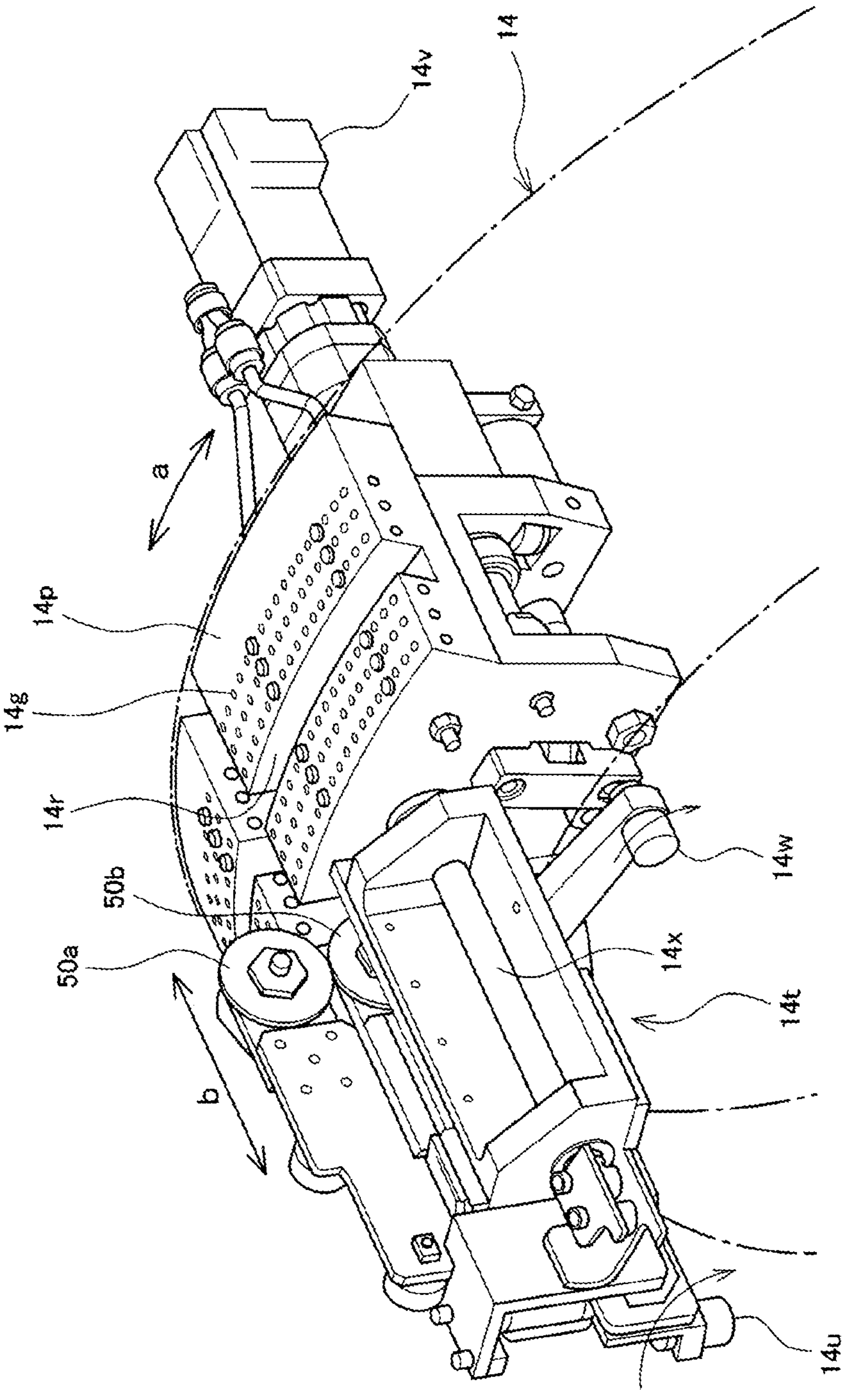
FIG. 11 is a configuration perspective view of a positive electrode cutting head of the embodiment.

FIG. 11 illustrates a configuration perspective view of the electrode cutting head configuring the positive electrode cutting drum 14. The plurality of electrode cutting heads are provided in the circumferential direction centering on a rotating shaft of the positive electrode cutting drum 14. The electrode cutting head is driven independent of the other electrode cutting heads in the circumferential direction ('a' direction in the figure) by a motor 14*v* provided for each electrode cutting head. Here, instead of the motor 14*v*, independent drive may be performed using a linear motor, a planet gear, a cogged belt or the like.

On an outer peripheral surface 14*p* of the electrode cutting head, suction holes 14*g* for sucking and holding the positive electrode single plate P and the positive electrode plate PP (after being cut) are formed. At the almost center in the direction ('b' direction in the figure) orthogonal to the circumferential direction of the outer peripheral surface 14*p*, a groove 14*r* is formed along the circumferential direction, and the suction holes 14*g* are not formed at the groove 14*r*. In addition, the electrode cutting head is provided with a cutting mechanism block 14*t* comprising round blades 50*a* and Sob. The round blades 50*a* and 50*b* are a pair of blades. The round blades 50*a* and 50*b* are a set of upper and lower rotary blades, and cut the positive electrode single plate which is the rectangular electrode assembly by reciprocating in the 'b' direction in the figure while being rotated. That is, the round blades 50*a* and 50*b* cut the positive electrode single plate by moving forward in the 'b' direction in the figure from an initial position withdrawn from the outer peripheral surface 14*p*, and return to the initial position by moving back in the 'b' direction in the figure thereafter. The cutting mechanism block 14*t* comprises a cam 14*u* engaged with a cam groove formed on a fixed shaft of the positive electrode cutting drum 14. The cutting mechanism block 14*t* makes the round blades 50*a* and 50*b* reciprocate along a rail in the direction ('b' direction in the figure) orthogonal to the circumferential direction at a clearance from the adjacent electrode cutting head via a rack and pinion mechanism, by the cam 14*u* moving along the cam groove accompanying the rotation of the electrode cutting head. A reciprocating speed in the 'b' direction in the figure of the round blades 50*a* and 50*b* can be appropriately adjusted by setting a gear ratio of the rack and pinion mechanism.

Further, the cutting mechanism block 14*t* is connected to a cam 14*w*, and after the round blades 50*a* and 50*b* are moved forward in the 'b' direction in the figure and cut the positive electrode single plate, the cam 14*w* is rotated after the cutting head sucking and holding the positive electrode plate is moved in the direction of separating from the cutting head holding the positive electrode single plate, and thus a rotating shaft 14*x* of the cutting mechanism block 14*t* is rotated. Then, the cutting mechanism block 14*t* and the round blades 50*a* and 50*b* are moved in the direction of separating from a cut surface of the positive electrode single plate accompanying the rotation of the rotating shaft 14*x*. Thereafter, the round blades 50*a* and Sob are moved back in the 'b' direction in the figure.

Figure 12:
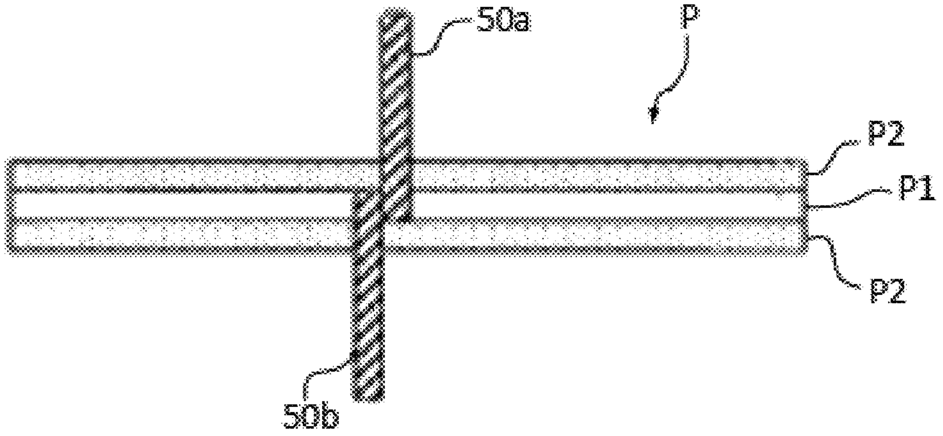
FIG. 12 is a cutting explanatory diagram of a positive electrode single plate of a comparative example.

FIG. 12 illustrates the case of performing cutting by arranging the upper and lower round blades 50*a* and 50*b* so as to overlap with each other in a thickness direction of the positive electrode single plate P. The positive electrode single plate P is configured from a positive electrode current collector P1 and positive electrode active material layers P2, and the round blade 50*a* on an upper side is arranged to such a depth of passing through the positive electrode active material layer P2 on the upper side and the positive electrode current collector P1. In addition, the round blade 50*b* on a lower side is arranged to such a depth of passing through the positive electrode active material layer P2 on the lower side and the positive electrode current collector P1. The depth of the round blade 50*a* and the depth of the round blade 50*b* overlap with each other in the thickness direction of the positive electrode single plate P. The positive electrode single plate P can be cut even by such arrangement positions of the round blades 50*a* and 50*b*, however, the present inventors have confirmed that, by the arrangement of the round blades 50*a* and 50*b*, there are cases where unneeded projections, that are burrs, are generated on the cut surface of the positive electrode single plate P, and degradation of the laminated electrode assembly may be caused.

Figure 13:
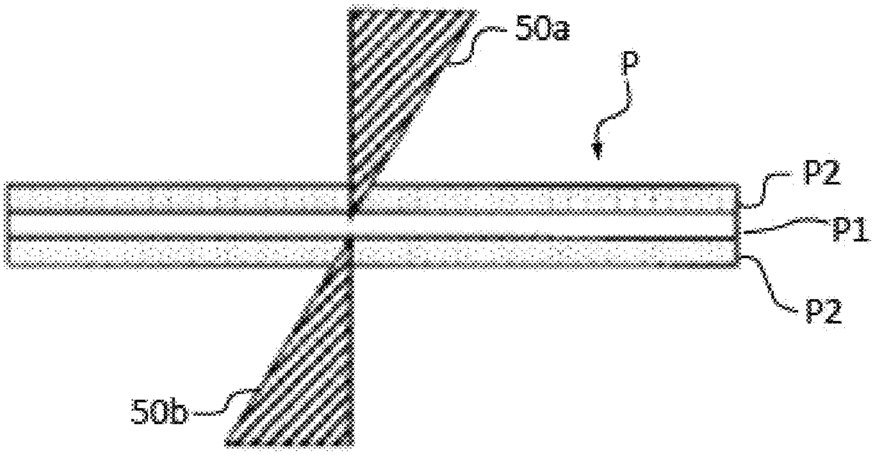
FIG. 13 is a cutting explanatory diagram (part 1) of the positive electrode single plate of the embodiment.

On the other hand, FIG. 13 illustrates the case of performing cutting by arranging the upper and lower round blades 50*a* and 50*b* so as not to overlap in the thickness direction of the positive electrode single plate P. The round blade 50*a* on the upper side is arranged to such a depth of passing through the positive electrode active material layer P2 on the upper side but not passing through the positive electrode current collector P1. In addition, the round blade Sob on the lower side is arranged to such a depth of passing through the positive electrode active material layer P2 on the lower side but not passing through the positive electrode current collector P1 similarly, and the upper and lower round blades 50*a* and Sob are arranged at a finite distance from each other in the thickness direction. In the case of such an arrangement, the upper and lower positive electrode active material layers P2 of the positive electrode single plate P are cut by the round blades 50*a* and 50*b* but the positive electrode current collector P1 is not cut and is maintained in the belt shape as it is even though a cutout portion is generated at a part of it. However, the positive electrode single plate P is sucked and held on the outer peripheral surfaces of the plurality of electrode cutting heads, and the electrode cutting heads are moved in the circumferential direction independent of each other, adjust the interval between the positive electrode plates PP, and are moved so as to turn the relative linear velocity with the positive electrode heating drum 16 to roughly 0. When the electrode cutting heads are independently moved in the circumferential direction, mutually reverse tensile force acts on a cutting part of the positive electrode single plate P. By the tensile force, the positive electrode current collector P1 is broken with the cutout portion as an origin and results in being cut. The present inventors have confirmed that, by the arrangement of the round blades 50*a* and 50*b* illustrated in FIG. 13, burrs are not generated or hardly generated on the cut surface of the positive electrode single plate P.

Note that, while the upper and lower round blades 50*a* and 50*b* are arranged so as not to overlap in the thickness direction of the positive electrode single plate P in FIG. 13, the arrangement may be such that the distance in the thickness direction between the upper and lower round blades 50*a* and Sob is 0. In other words, when the distance in the thickness direction of the positive electrode single plate P between a blade tip of the upper round blade 50*a* and the blade tip of the lower round blade Sob is L and the thickness of the positive electrode current collector P1 is d, the arrangement is performed so as to be $d>L\geq 0$. Here, $L<0$ means that the upper and lower round blades 50*a* and 50*b* overlap with each other, and means that the upper and lower round blades 50*a* and Sob cut the positive electrode active material layers P2 on the upper side and the lower side and the positive electrode current collector P1. It can be said that, when it is $d>L\geq 0$, the positive electrode active material layer P2 on the upper side is cut by the round blade 50*a* on the upper side, the positive electrode active material layer P2 on the lower side is cut by the round blade 50*b* on the lower side, and the positive electrode current collector P1 is broken by the tensile force without being cut.

Figure 14:
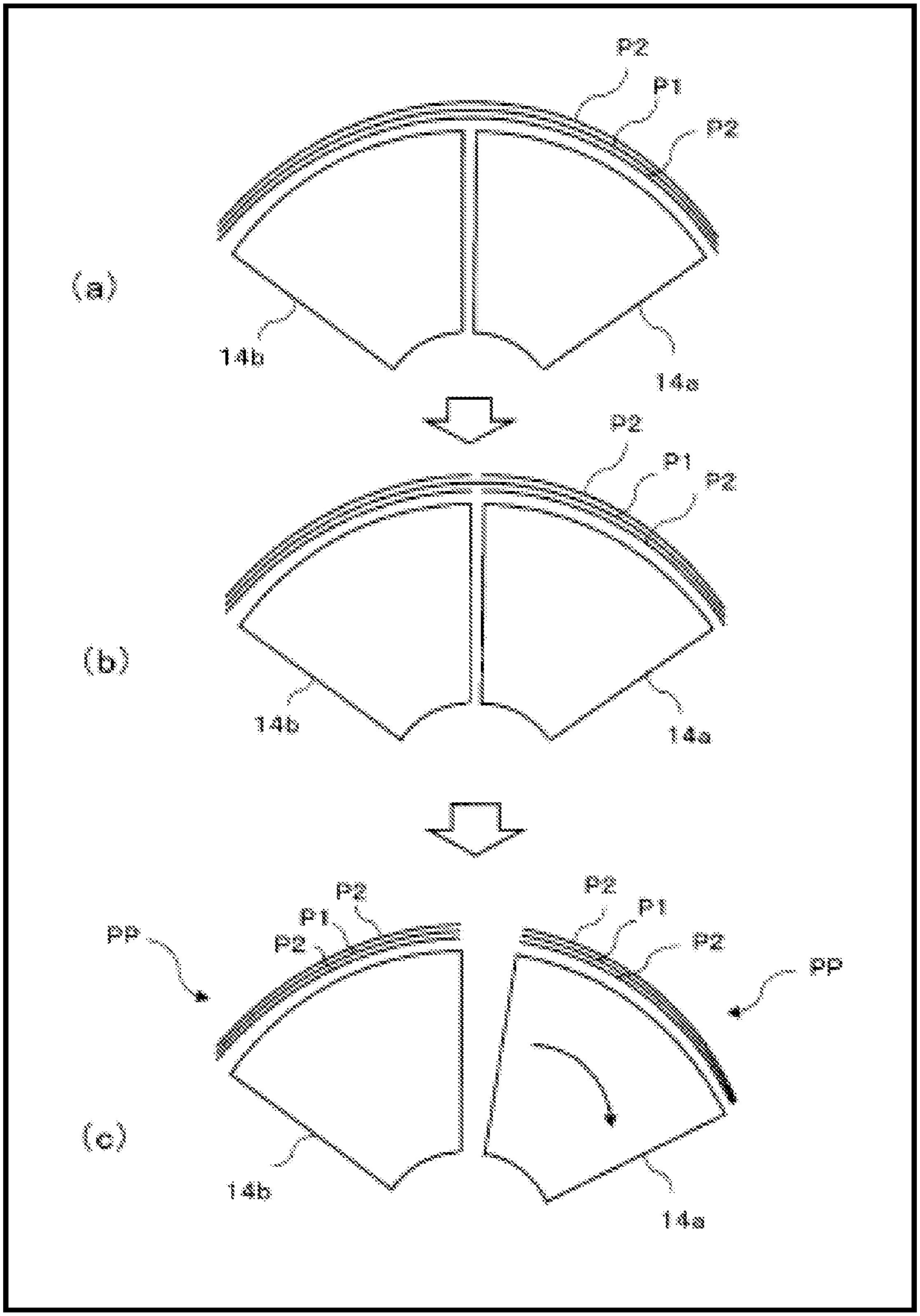
FIG. 14 is a cutting explanatory diagram (part 2) of the positive electrode single plate of the embodiment.

FIG. 14 illustrates the situation of cutting the positive electrode single plate P at an electrode cutting head 14*a* and an electrode cutting head 14*b* relating to FIG. 13.

As illustrated in FIG. 14(*a*), the electrode cutting head 14*a* and the electrode cutting head 14*b* are rotated around the rotating shaft center of the drum while sucking and holding the positive electrode single plate P on the outer peripheral surface. The positive electrode single plate P is configured from the positive electrode current collector P1 and the positive electrode active material layers P2 formed on the both surfaces. When rotational movement is made to a predetermined position, the round blades 50*a* and 50*b* are moved forward by the cutting mechanism 14*t* provided in the electrode cutting head 14*a*, and the positive electrode active material layers P2 of the positive electrode single plate P are cut.

FIG. 14(*b*) illustrates the situation where the positive electrode active material layers P2 are cut by the round blades 50*a* and 50*b*. At the time, the positive electrode current collector P1 is not cut yet, and is kept sucked and held on the outer peripheral surface of the electrode cutting head 14*a* and the electrode cutting head 14*b* in the belt shape as it is.

Thereafter, as illustrated in FIG. 14(*c*), the electrode cutting head 14*a* is accelerated and moved in the circumferential direction of the drum independent of the electrode cutting head 14*b*. By the movement, the tensile force is applied to the positive electrode current collector P1, and the belt-like positive electrode current collector P1 is cut. Thereafter, by the cutting mechanism 14*t* provided in the electrode cutting head 14*a*, the round blades 50*a* and 50*b* are moved back. In this sense, in the present embodiment, it can be said that cutting of the positive electrode single plate P is executed by the combination of the movement of the round blades 50*a* and 50*b* and the movement of the electrode cutting heads. Note that details of reciprocation of the round blades 50*a* and 50*b* will be further described later using FIG. 15.

In the present embodiment, since the positive electrode current collector P1 of the positive electrode single plate P is cut by the tensile force and the positive electrode active material layers P2 are cut by the round blades 50*a* and Sob, the cut surface of the positive electrode current collector P1 and the cut surfaces of the positive electrode active material layers P2 are in cut forms different from each other.

Figure 16:
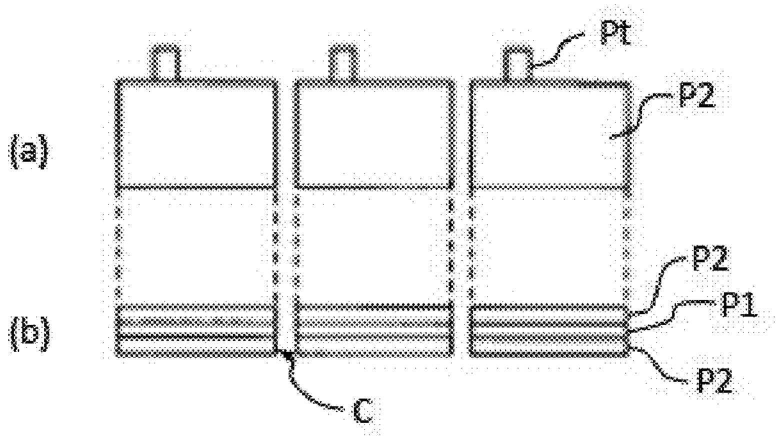
FIG. 16 is a top view and a side view of the positive electrode single plate of the embodiment.

FIG. 16 illustrates a top view and a side view of the positive electrode plate PP after being cut. FIG. 16(*a*) is the top view, the positive electrode active material layer P2 is present on a surface, and the tab Pt extends from the end. FIG. 16(*b*) is the side view, and the positive electrode active material layers P2 are present at an upper part and a lower part of the positive electrode current collector P1 similarly to FIG. 14. Here, the cut surface cut by the electrode cutting head is illustrated as c in the figure.

Figure 17:
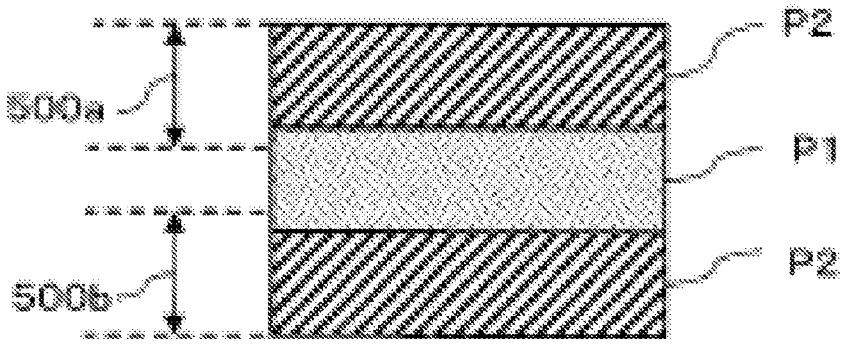
FIG. 17 is a cut surface explanatory diagram of the positive electrode single plate of the embodiment.

FIG. 17 illustrates a cross section of the cut surface c in FIG. 16(*b*). FIG. 17 illustrates the cross section of the cut surface c of the positive electrode single plate P cut by the electrode cutting head 14*a* and the electrode cutting head 14*b* relating to FIG. 13. FIG. 17 illustrates a range 500*a* where the round blade 50*a* is brought into contact by forward movement and a range 500*b* where the round blade Sob is brought into contact by the forward movement. Since the range where the round blades 50*a* and 50*b* rub the positive electrode current collector P1 is relatively small, burrs for which an end face of the positive electrode current collector P1 stretches when the positive electrode current collector P1 is rubbed by the round blades 50*a* and Sob are suppressed. In addition, as to be described later, by separating the round blades 50*a* and 50*b* from the cut surface after cutting, the round blades 50*a* and Sob do not rub the cut surface when moving back, and damages of the cut surface are suppressed also in this respect.

Figure 18:
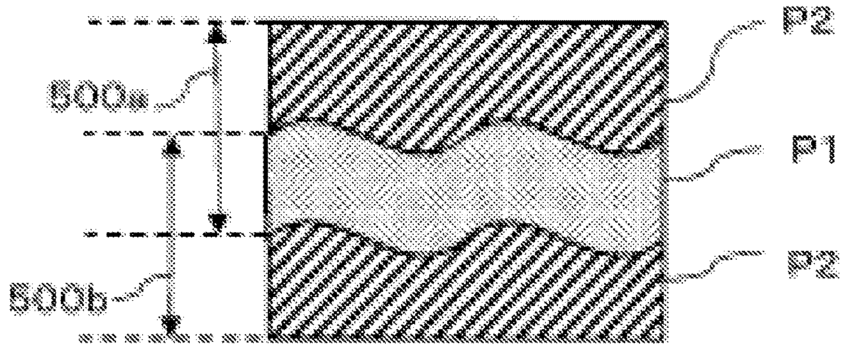
FIG. 18 is a cut surface explanatory diagram of the positive electrode single plate of the comparative example.

On the other hand, FIG. 18 schematically illustrates the cut surface c in the case of performing cutting by arranging the round blades 50*a* and 50*b* so as to overlap with each other in the thickness direction of the positive electrode single plate P as illustrated in FIG. 12, for comparison. The reciprocation range 500*a* of the round blade 50*a* and the reciprocation range 500*b* of the round blade 50*b* overlap with each other, and by the round blades 50*a* and Sob rubbing the positive electrode current collector P1, the end face of the positive electrode current collector P1 stretches and burrs are generated. By comparing FIG. 17 and FIG. 18, an effect of the arrangement of the round blades in the present embodiment is clarified.

Figure 15:
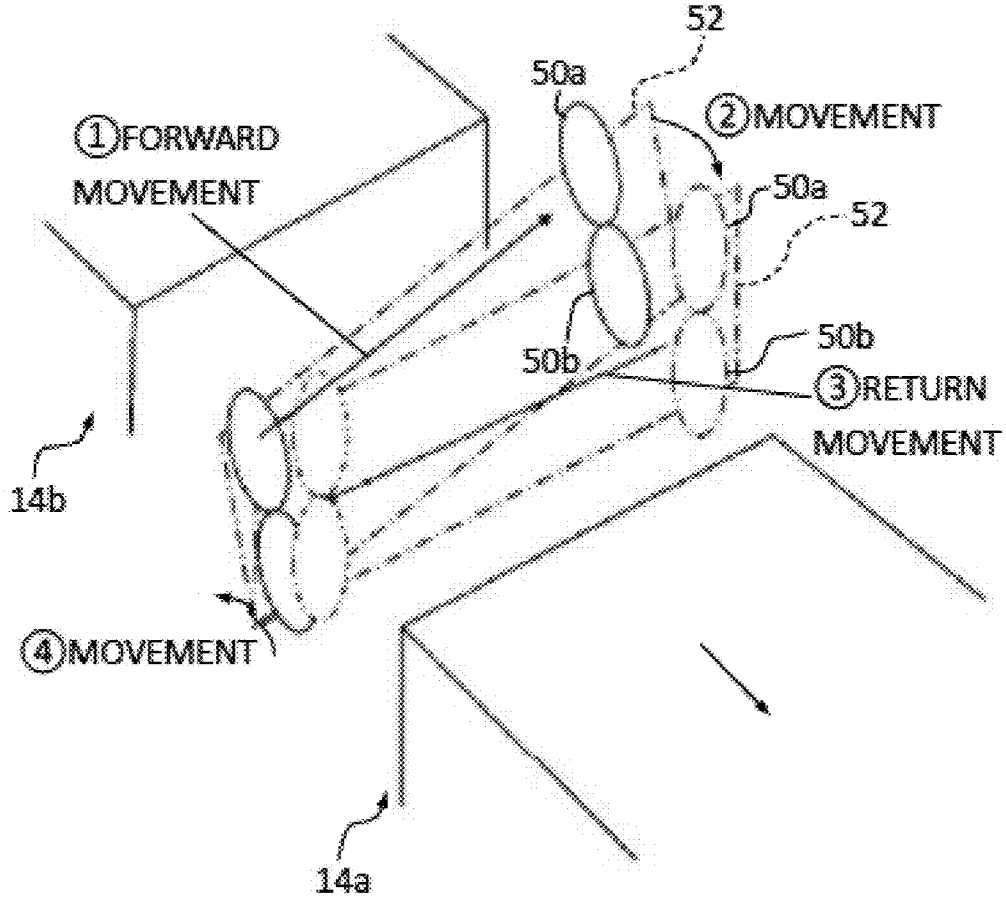
FIG. 15 is a reciprocation explanatory diagram of a round blade of the embodiment.

The round blades 50*a* and 50*b* cut the positive electrode single plate P by reciprocating as already described, and FIG. 15 schematically illustrates the situation of the reciprocation of the round blades 50*a* and Sob. The round blades 50*a* and 50*b* are moved forward in the direction orthogonal to the circumferential direction of the drum from the initial position by the cutting mechanism block 14*t* and cut the positive electrode active material layer P2. The round blades 50*a* and Sob are moved forward along a moving plane 52.

Next, the round blades 50*a* and 50*b* return to the initial position by return movement. First, after the electrode cutting head 14*a* sucking and holding the positive electrode plate PP is moved in the direction of separating from the electrode cutting head 14*b* holding the positive electrode single plate P, the rotating shaft 14*x* is rotated by the rotation of the cam 14*w* illustrated in FIG. 11, and the cutting mechanism block 14*t* and the round blades 50*a* and 50*b* are moved in the direction of separating from the positive electrode single plate P accompanying the rotation of the rotating shaft 14*x*. Thereafter, the round blades 50*a* and 50*b* are moved back in the direction orthogonal to the circumferential direction of the drum. After the forward movement, the cutting mechanism block 14*t* and the round blades 50*a* and 50*b* are moved again to the initial position by reverse rotation of the cam 14*w*. A forward movement track and a return movement track of the round blades 50*a* and 50*b* are different from each other, and since the round blades 50*a* and 50*b* are not brought into contact with the cut surface of the positive electrode single plate P and the positive electrode plate PP during the return movement, damages of the cut surface can be effectively suppressed.

In the present embodiment, the round blades 50*a* and 50*b* are illustrated as the blades of the electrode cutting head, however, the shape of the blades is not limited thereto. In addition, in the present embodiment, damages of the cut surface are suppressed by making the tracks of the reciprocation of the round blades 50*a* and 50*b* of the electrode cutting head be different, however, the configuration of suppressing damages of the cut surface is not limited thereto.

Figure 19:
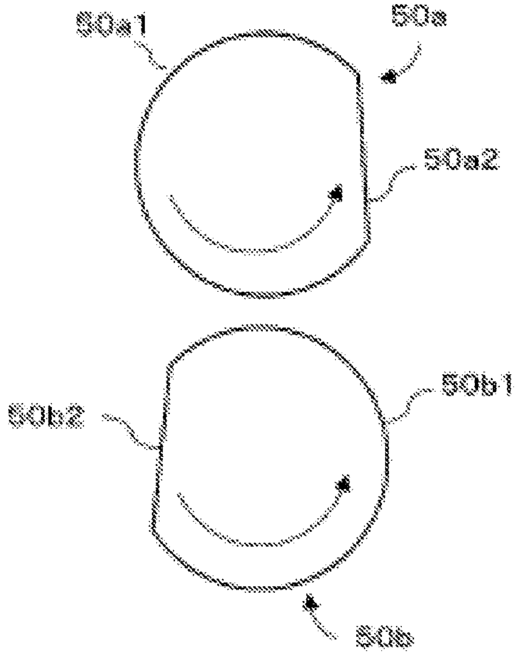
FIG. 19 is an explanatory diagram illustrating another blade shape of the embodiment.

FIG. 19 illustrates another blade shape of the electrode cutting head. The upper and lower blades 50*a* and 50*b* are round blades as a whole, however, a part of the blade is a flat portion. When paying attention to the blade 50*a*, the blade 50*a* is configured from an arc portion 50*a*1 and a flat portion 50*a*2, the blade is formed at the arc portion 50*al*, and the blade is not formed at the flat portion 50*a*2. It is similar for the blade 50*b*, the blade 50*b* is configured from an arc portion 50*b*1 and a flat portion 50*b*2, the blade is formed at the arc portion 50*b*1, and the blade is not formed at the flat portion 50*b*2. The blades 50*a* and 50*b* are both rotated centering on the rotating shaft, and cut the positive electrode single plate P at the arc portions 50*a*1 and 50*b*1 where the blade is formed.

Figure 20:
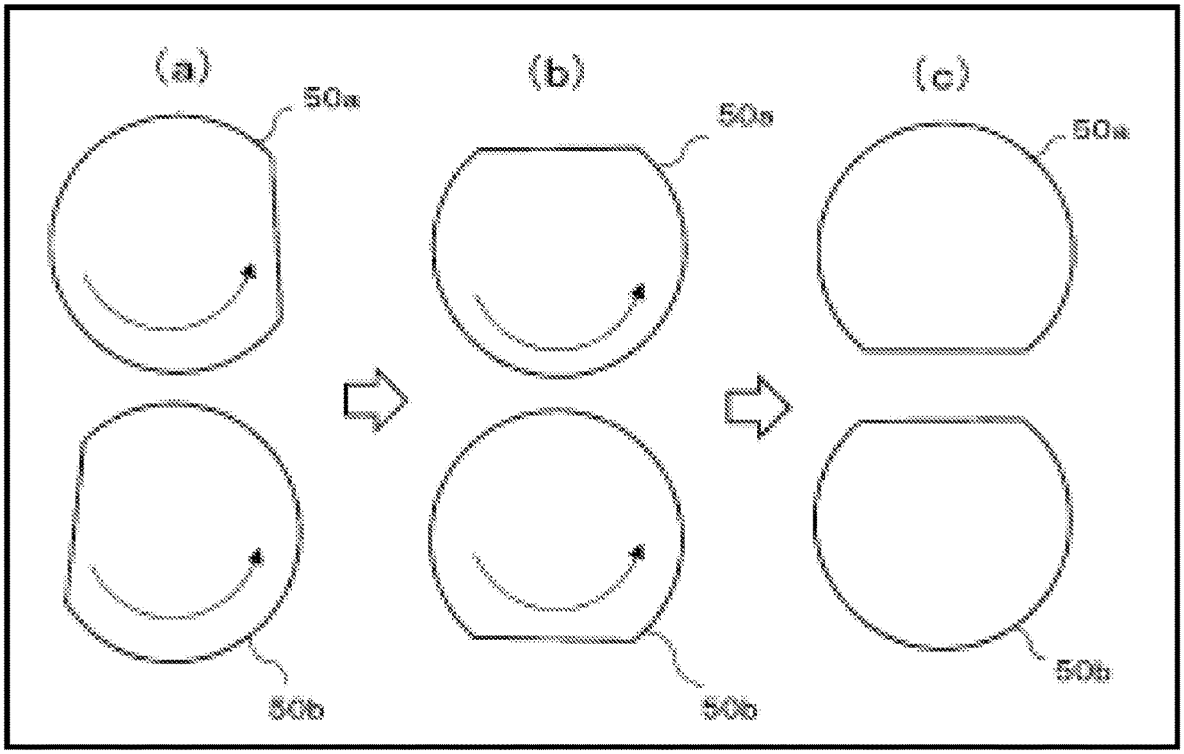
FIG. 20 is a reciprocation explanatory diagram of another blade of the embodiment.

FIG. 20 illustrates the situation of cutting the positive electrode single plate P by the rotation of the blades 50*a* and 50*b* illustrated in FIG. 19. The arc portion 50*a*1 of the blade 50*a* and the arc portion 50*b*1 of the blade 50*b* face each other at the initial position, and the positive electrode single plate P is cut by the arc portion 50*a*1 and the arc portion 50*b*1 as illustrated in (a) and (b) by the rotation of the blades 50*a* and 50*b* from the initial position during the forward movement. The blades 50*a* and 50*b* are further rotated, and when they are rotated to the position where the flat portion 50*a*2 and the flat portion 50*b*2 face each other as in (c), the cutting of the positive electrode single plate P is ended and the forward movement is completed. During the return movement, while maintaining the state where the flat portion 50*a*2 and the flat portion 50*b*2 face each other, the blades 50*a* and 50*b* are moved to the initial position. Since an inter-axial distance of the blades 50*a* and Sob is fixed, in the state where the flat portion 50*a*2 and the flat portion 50*b*2 face each other, a gap is generated between the blades 50*a* and Sob. By being moved back while maintaining the gap, the blades 50*a* and Sob are not brought into contact with the cut surface and damages of the cut surface can be suppressed. In this case, the need of the movement (inclination) of the cutting mechanism block 14*t* by the rotation of the cam 14*w* as illustrated in FIG. 15 can be eliminated.

The positive electrode plate PP is generated by cutting the positive electrode single plate P at the positive electrode cutting drum 14 as above, and the generated positive electrode single plate PP is supplied to the positive electrode heating drum 16. The positive electrode plate PP can be supplied from the positive electrode cutting drum 14 to the positive electrode heating drum 16 via a belt conveyor for example.

Figure 21:
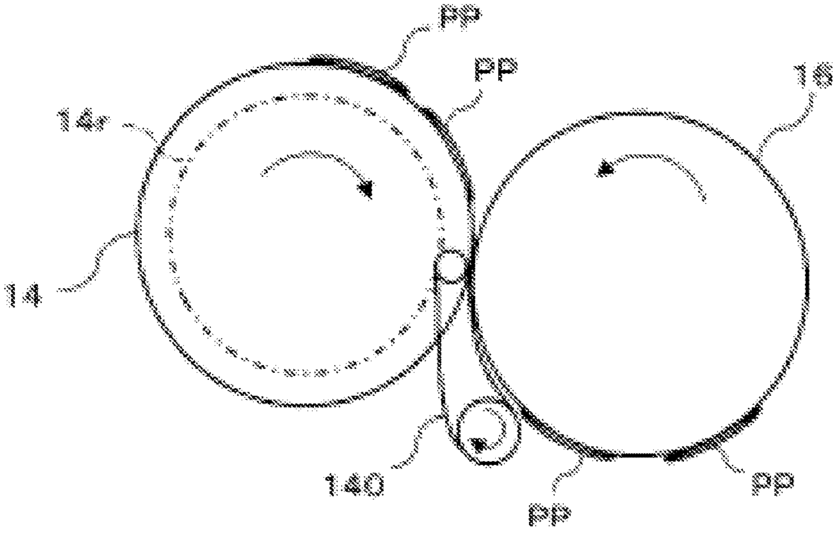
FIG. 21 is a supply explanatory diagram of the positive electrode single plate of the embodiment.
Figure 22:
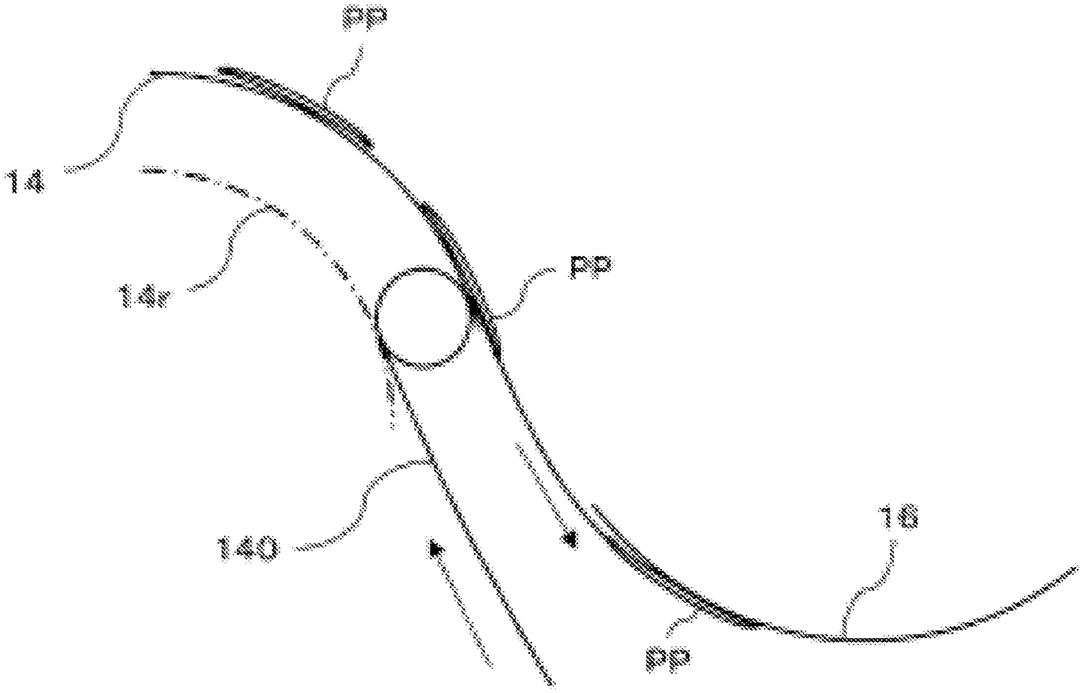
FIG. 22 is a partially enlarged view of FIG. 21.

FIG. 21 schematically illustrates supply of the positive electrode plate PP from the positive electrode cutting drum 14 to the positive electrode heating drum 16. In addition, FIG. 22 illustrates a partially enlarged view of FIG. 21, that is an enlarged view of a contact part of the positive electrode cutting drum 14 and the positive electrode heating drum 16.

A belt conveyor 140 is arranged near the contact part of the positive electrode cutting drum 14 and the positive electrode heating drum 16, and one end of the belt conveyor 140 is inserted into the groove 14*r* of the positive electrode cutting drum 14 (see FIG. 11). A width of a pulley on one end side of the belt conveyor 140 inserted into the groove 14*r* is roughly the same as the width of the groove 14*r*. A pulley on the other end side of the belt conveyor 140 is arranged near the positive electrode heating drum 16. A belt of the belt conveyor 140 extends from the groove 14*r* of the positive electrode cutting drum 14 to vicinity of the positive electrode heating drum 16, turns back at the pulley on the other end side of the belt conveyor 140, and returns into the groove 14*r* of the positive electrode cutting drum 14.

The positive electrode single plate PP is cut at the positive electrode cutting drum 14, sucked and held on the outer peripheral surface, and rotationally conveyed. When the positive electrode plate PP is rotationally conveyed and brought into contact with the belt conveyor 140 one end of which is inserted into the groove 14*r*, the positive electrode plate PP gets on the belt conveyor 140, separates from the surface of the positive electrode cutting drum 14 and rides on the belt conveyor 140. The positive electrode plate PP riding on the belt conveyor 140 is conveyed to the positive electrode heating drum 16 by the belt conveyor 140, sucked by the suction holes formed on the outer peripheral surface of the positive electrode heating drum 16, moved from the belt conveyor 140 to the outer peripheral surface of the positive electrode heating drum 16, sucked and held. Note that, while the belt conveyor 140 inserted into the groove 14*r* is held by the pulley on one end side in the description above, a knife edge may be inserted into the groove 14*r* instead of the pulley and the belt conveyor 140 inserted into the groove 14*r* may be held by the knife edge.

The cutting of the positive electrode single plate P at the positive electrode cutting drum 14 and the supply of the positive electrode plate PP from the positive electrode cutting drum 14 to the positive electrode heating drum 16 have been described above, and it is similar for the cutting of the negative electrode single plate N at the negative electrode cutting drum 10 and the supply of the negative electrode plate NP from the negative electrode cutting drum 10 to the negative electrode heating drum 12. In addition, also for the cutting of the belt-like separator at the separator cutting drum 20, by making the blades 50*a* and 50*b* move back without being in contact with the cut surface, damages of the cut surface can be suppressed.

Next, the process of supplying the negative electrode plate NP or the positive electrode plate PP from the negative electrode heating drum 12 or the positive electrode heating drum 16 to the bonding drum 18 will be described in detail.

Figure 23A:
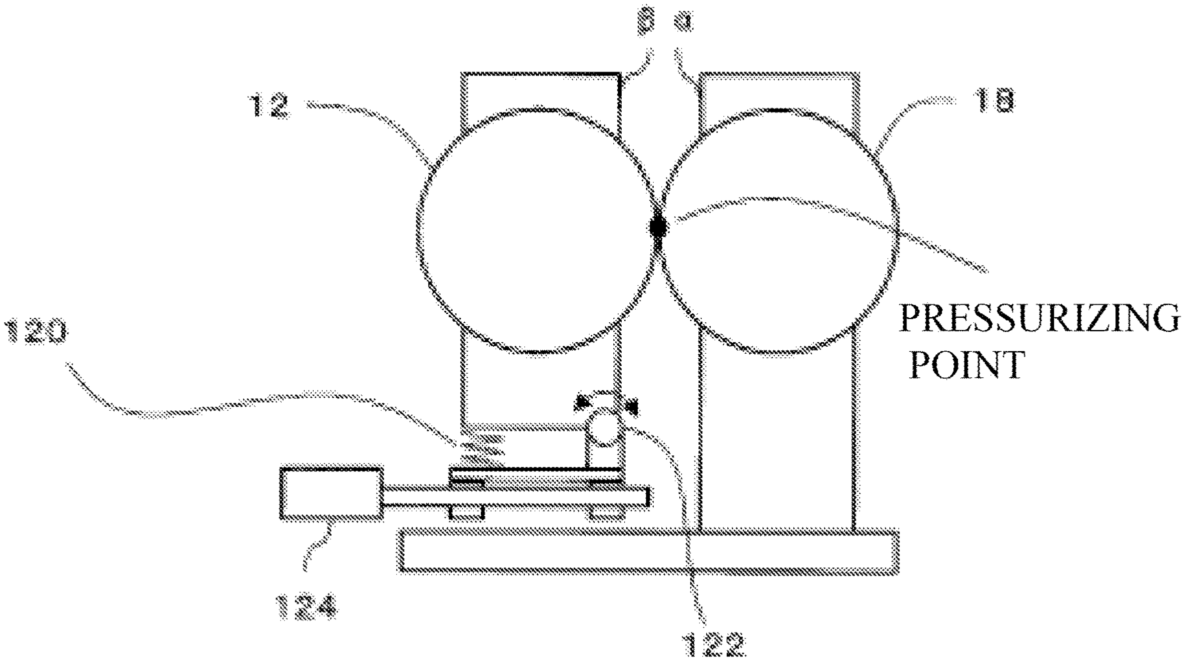
FIG. 23A is an explanatory diagram of a negative electrode heating drum and a bonding drum of the embodiment.

FIG. 23A illustrates the negative electrode heating drum 12 and the bonding drum 18. The negative electrode heating drum 12 receives the negative electrode plate NP cut at the negative electrode cutting drum 10, sucks and holds it on the outer peripheral surface, and heats it while rotationally conveying it. Then, at the position close to the bonding drum 18, the heated negative electrode plate NP is successively bonded at the fixed interval on the belt-like separator S1 which is sucked and held on the outer peripheral surface of the bonding drum 18 and rotationally conveyed.

The negative electrode heating drum 12 is pivotally supported freely swingably centering on a drum rotation fulcrum 122, and is swung centering on the drum rotation fulcrum 122 by a motor 124. In addition, to the negative electrode heating drum 12, a coil spring 120 is installed so as to face the drum rotation fulcrum 122. When the negative electrode heating drum 12 is swung centering on the rotation fulcrum 122, a deflection amount of the coil spring 120 changes, and thus pressurizing force at a pressurizing point which is a contact point of the negative electrode heating drum 12 and the bonding drum 18 is adjusted.

While the negative electrode heating drum 12 presses the heated negative electrode plate NP to the belt-like separator S1 on the bonding drum 18 and bonds the negative electrode plate NP to the separator S1 by the pressurizing force at the pressurizing point, a finite eccentricity exists at the negative electrode heating drum 12 and the finite eccentricity also exists at the bonding drum 18. When the eccentricity exists, since the deflection amount of the coil spring 120 changes, the negative electrode plate NP cannot be pressurized and bonded by fixed pressurizing force.

Then, eccentricity amounts of the negative electrode heating drum 12 and the bonding drum 18 are combined, the negative electrode heating drum 12 is swung centering on the rotation fulcrum 122 by rotating the motor 124 at all times using the combined value matched with drum rotation, the change of the pressurizing force at the pressurizing point is offset, and the negative electrode plate NP is pressurized and bonded on the belt-like separator S1 by almost fixed pressurizing force.

The eccentricity amounts of the negative electrode heating drum 12 and the bonding drum 18 are measured and obtained beforehand, and stored in a memory of a controller as a table. Drive signals based on a cancellation waveform which cancels a composite waveform of the eccentricity amounts of the two drums are supplied to the motor 124, deflection by the eccentricity of the coil spring 120 is suppressed and fluctuation of the pressurizing force is suppressed.

By driving the motor 124 with the cancellation waveform as a drive signal waveform, the controller can cancel the respective eccentricities and press the negative electrode heating drum 12 to the bonding drum 18 by the fixed pressurizing force at all times.

However, if the negative electrode heating drum 12 is pressed to the bonding drum 18 by the fixed pressurizing force and the negative electrode plate NP is bonded onto the belt-like separator S1, there is a risk that the negative electrode plate NP is damaged by the pressurizing force at the end of the negative electrode plate NP, that is the end in the circumferential direction of the drum, in particular. Therefore, damages of both ends of the negative electrode plate NP are prevented by reducing the pressurizing force between the negative electrode heating drum 12 and the bonding drum 18 or interrupting the pressurization (turning the pressurizing force to 0) at both ends in the circumferential direction of the negative electrode plate NP without bonding the negative electrode plate NP onto the separator S1 by the fixed pressurizing force.

Figure 24:
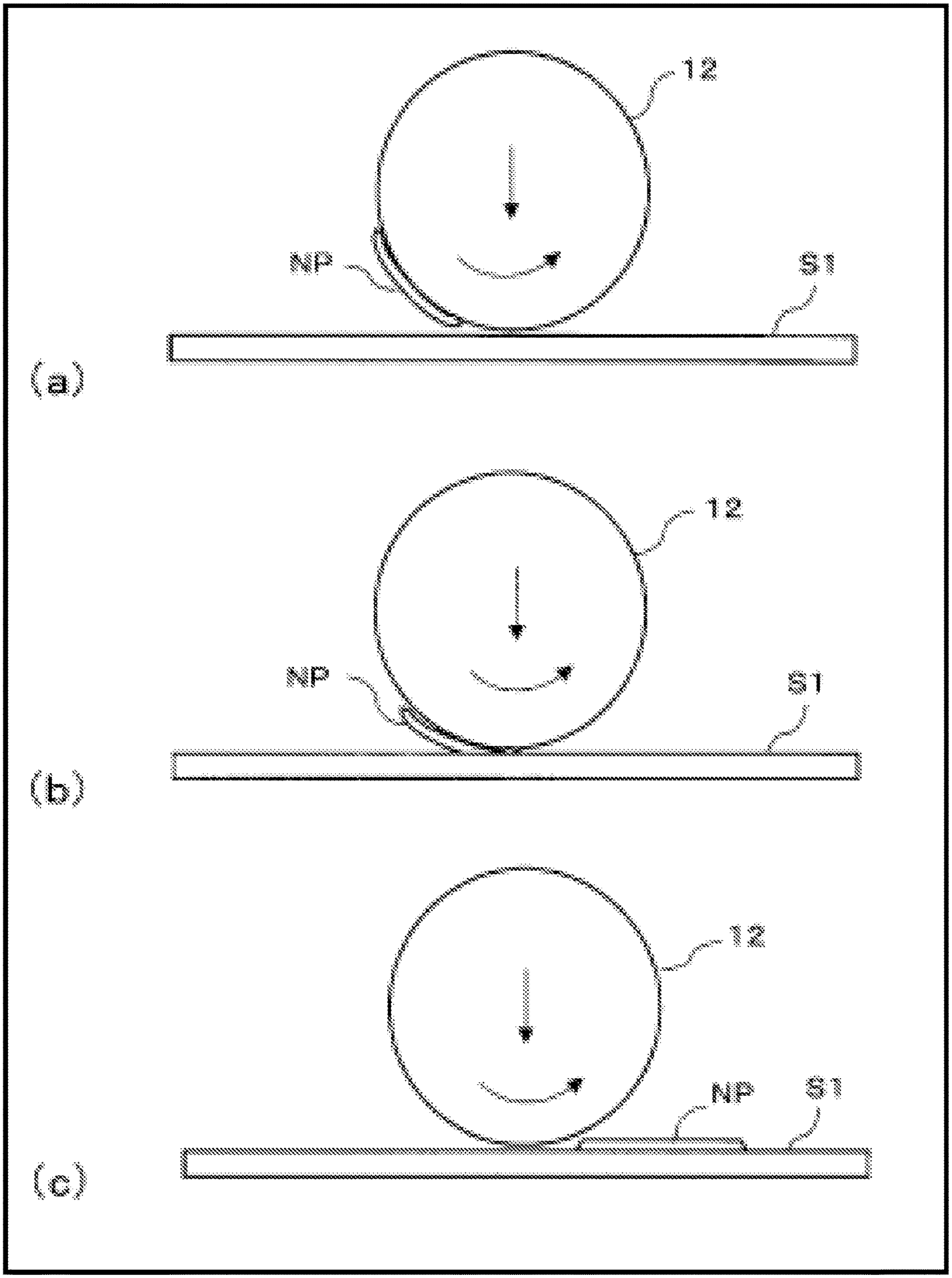
FIG. 24 is a bonding explanatory diagram of a negative electrode plate of the comparative example.

FIG. 24 illustrates the situation of bonding the negative electrode plate NP onto the belt-like separator S1 by the fixed pressurizing force. That is, FIG. 24 illustrates the situation of bonding the negative electrode plate NP onto the separator S1 without reducing the pressurizing force between the negative electrode heating drum 12 and the bonding drum 18 or interrupting the pressurization. The separator S1 is linearly illustrated in FIG. 24, but is actually sucked and held by the bonding drum 18 and is in the state of drawing an arc along an arc-shaped outer shape of the bonding drum 18. In addition, one negative electrode plate NP is heated on the negative electrode heating drum 12 in FIG. 24, however, the plurality of negative electrode plates NP can be heated.

In FIG. 24(*a*), the negative electrode heating drum 12 is in direct contact with the separator S1 in an area where the negative electrode plate NP is not present, and presses the separator S1 by the fixed pressurizing force. When the negative electrode plate NP is rotationally conveyed in the state, as illustrated in FIG. 24(*b*), the negative electrode heating drum 12 gets on a circumferential direction tip end of the negative electrode plate NP first and presses the circumferential direction tip end to the separator S1 by the fixed pressurizing force. At the time, the tip end of the negative electrode plate NP is crushed and deformed by the pressurizing force.

Even thereafter, the negative electrode heating drum 12 continuously presses the negative electrode plate NP to the separator S1 by the fixed pressurizing force, and bonds the negative electrode plate NP to the separator S1. Then, as illustrated in FIG. 24(*c*), a circumferential direction rear end of the negative electrode plate NP is also pressed to the separator S1 by the fixed pressurizing force so that the rear end is also crushed and deformed by the pressurizing force similarly to the tip end.

In such a manner, when the negative electrode heating drum 12 is pressed to the bonding drum 18 by the fixed pressurizing force at all times, there is a risk that the separator S1 is damaged since the separator S1 is pressed even at a part where the negative electrode plate NP is not present, and also there is a risk that the circumferential direction tip end and the circumferential direction rear end of the negative electrode plate NP are pressed and damaged. FIG. 24(*c*) schematically illustrates crushing at the circumferential direction tip end and the circumferential direction rear end as a slope shape.

Figure 25:
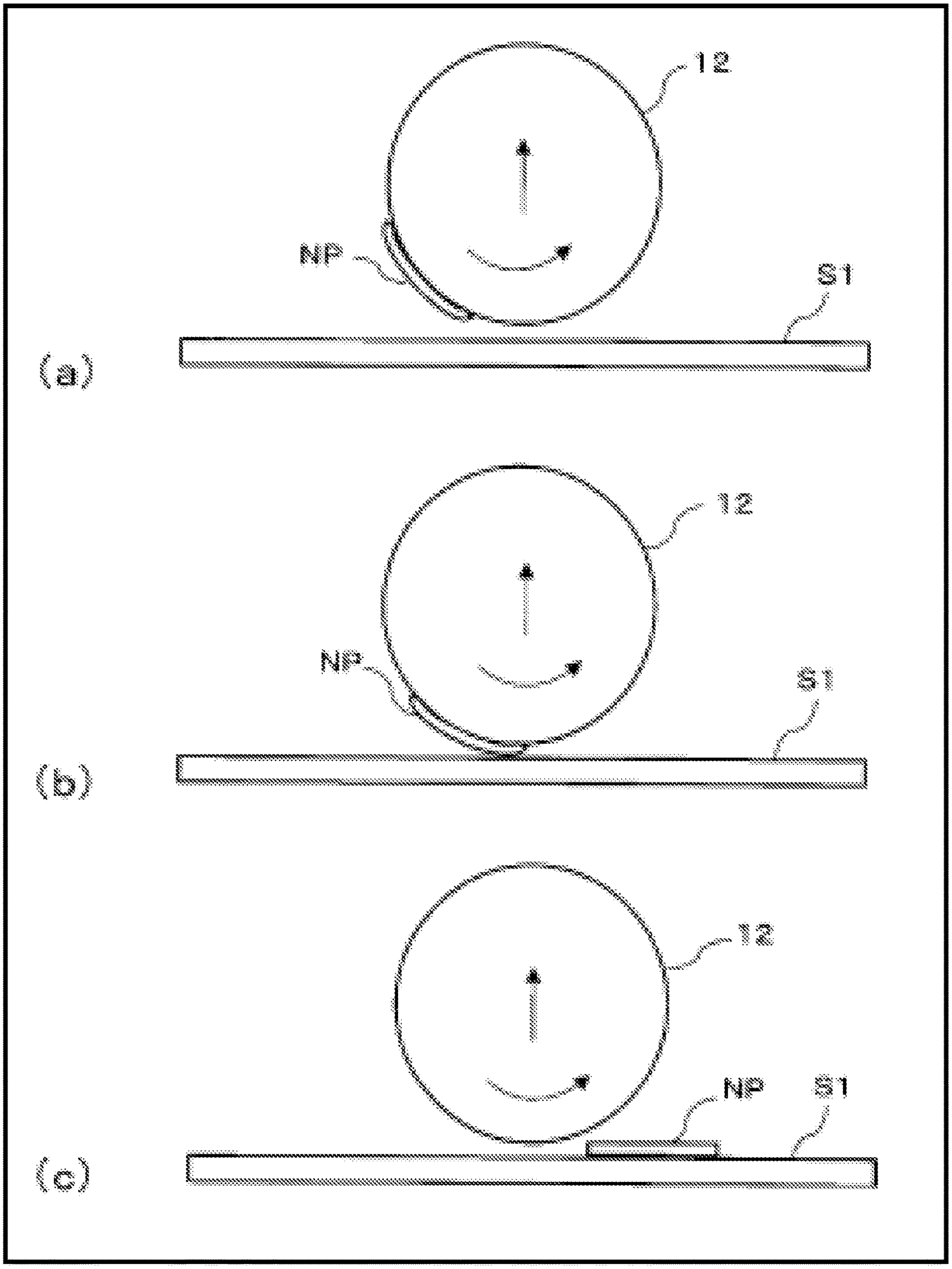
FIG. 25 is a bonding explanatory diagram of a negative electrode plate of the embodiment.

On the other hand, FIG. 25 illustrates the situation of bonding the negative electrode plate NP to the separator S1 in the present embodiment. That is, FIG. 25 illustrates the situation of bonding the negative electrode plate NP onto the separator S1 with the timing of reducing the pressurizing force between the negative electrode heating drum 12 and the bonding drum 18 or interrupting the pressurization. The separator S1 is linearly illustrated in FIG. 25, but is actually sucked and held by the bonding drum 18 and is in the state of drawing an arc along the arc-shaped outer shape of the bonding drum 18. In addition, one negative electrode plate NP is heated on the negative electrode heating drum 12 also in FIG. 25, however, the plurality of negative electrode plates NP can be heated.

In FIG. 25(*a*), the negative electrode heating drum 12 regulates the pressurizing force at the pressurizing point in the area where the negative electrode plate NP is not present so as not to press the negative electrode heating drum 12 to the bonding drum 18. Even when the negative electrode plate NP is rotationally conveyed and the circumferential direction tip end of the negative electrode plate NP is brought into contact with the separator S1 in the state, regulation of the fixed pressurizing force is maintained as it is. Accordingly, the circumferential direction tip end of the negative electrode plate NP is not pressed.

In FIG. 25(*b*), when the negative electrode plate NP is rotationally conveyed further and a center portion other than the circumferential direction tip end is brought into contact with the separator S1, the negative electrode heating drum 12 is pressed to the bonding drum 18 by the fixed pressurizing force. Thus, the negative electrode plate NP is bonded to the separator S1.

In FIG. 25(*c*), when the negative electrode plate NP is rotationally conveyed further and the circumferential direction rear end is brought into contact with the separator S1, the pressurizing force is regulated and the negative electrode heating drum 12 is not pressed to the bonding drum 18. Accordingly, the circumferential direction rear end of the negative electrode plate NP is not pressed.

As above, by pressing only the center portion of the negative electrode plate NP by the fixed pressurizing force, regulating the fixed pressurizing force at both ends, that are the circumferential direction tip end and the circumferential direction rear end, of the negative electrode plate NP and not pressing both ends, damages of both ends of the negative electrode plate NP are prevented. In addition, by regulating the fixed pressurizing force also in the area where the negative electrode plate NP is not present, damages of the separator S1 are also prevented.

Separately from cancellation of the eccentricity amounts of the negative electrode heating drum 12 and the bonding drum 18, the controller reduces the pressurizing force between the negative electrode heating drum 12 and the bonding drum 18 or interrupts the pressurization at both ends of the negative electrode plate NP. A mechanism of reducing the pressurizing force between the negative electrode heating drum 12 and the bonding drum 18 or interrupting the pressurization will be described based on FIG. 23B and FIG. 23C.

Figure 23B:
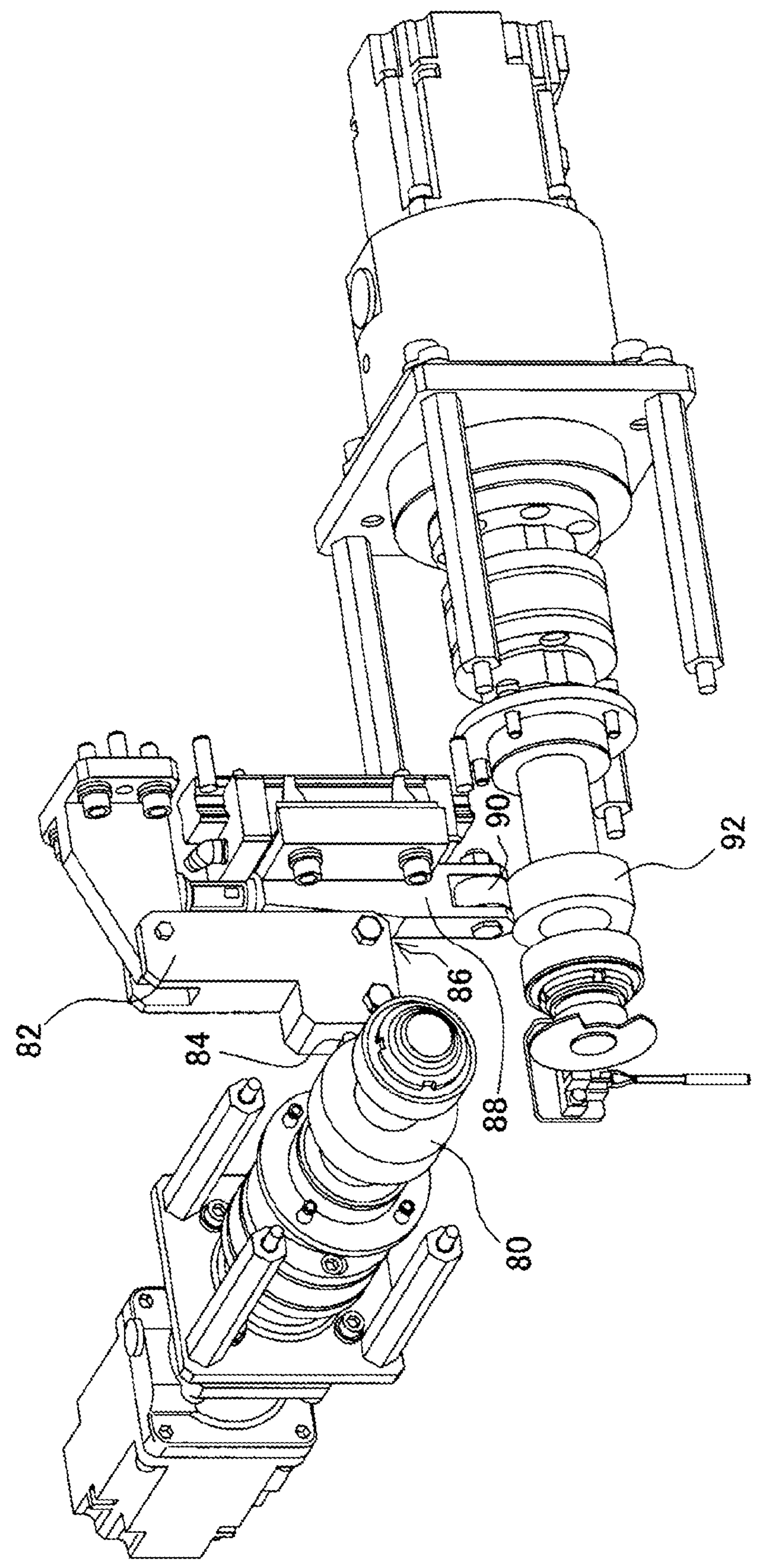
FIG. 23B is a perspective view of a pressurizing force adjusting mechanism of the embodiment.
Figure 23C:
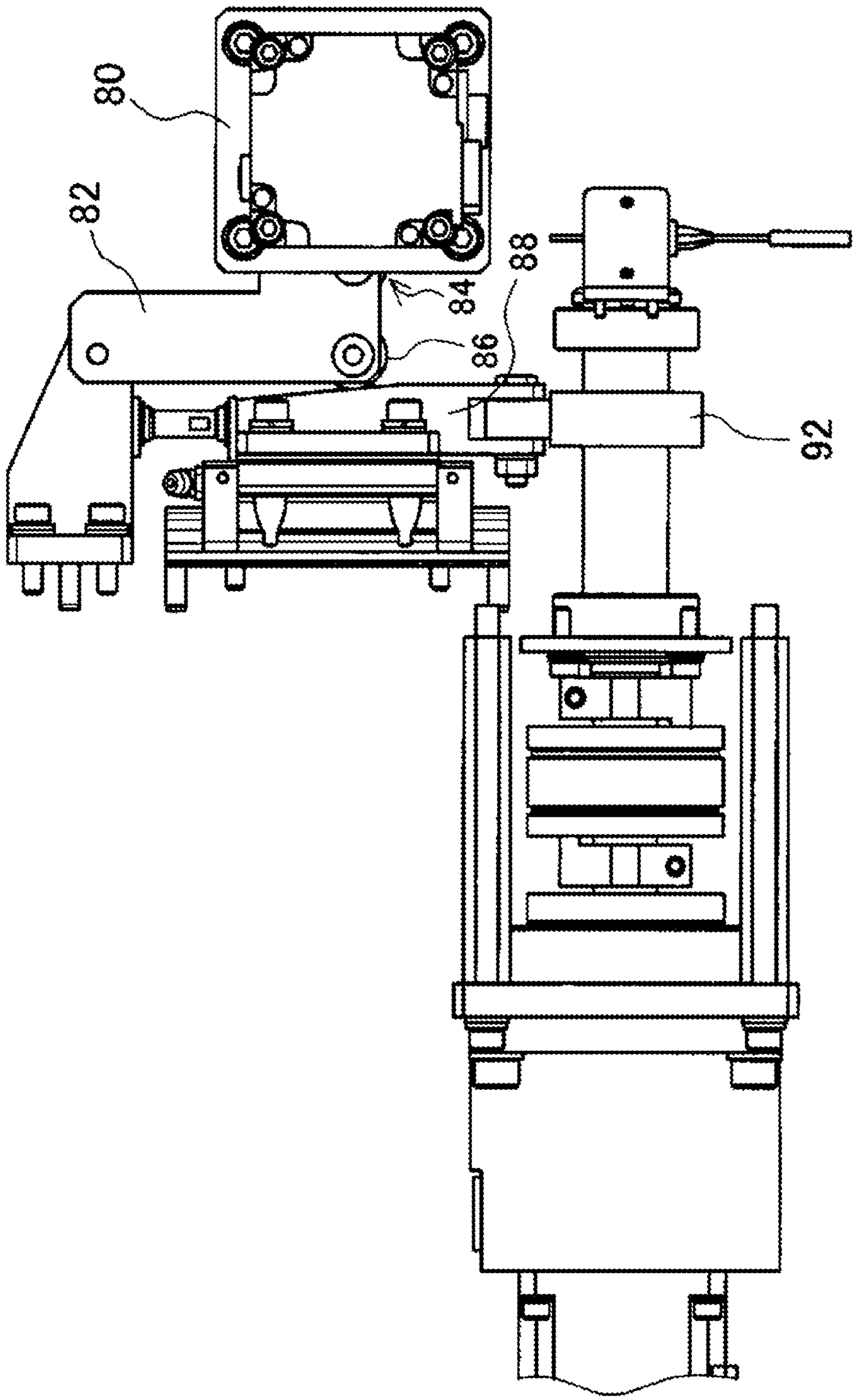
FIG. 23C is a rear elevation of the pressurizing force adjusting mechanism of the embodiment.

FIG. 23B and FIG. 23C are a perspective view and a rear elevation of a pressurizing force adjusting mechanism, and a column α of the bonding drum 18 is provided with a cam mechanism 80. To a column β of the negative electrode heating drum 12, a swing arm 82 is attached as an arm engaged with the cam mechanism 80, and the swing arm 82 pivotally supports a roller 84. The surface of the cam mechanism 80 and the roller 84 are in contact. A surface shape of the cam mechanism 80 is polygonal or has projections at a predetermined interval. In the cam mechanism 80, corner portions of a polygon or the projections operate to reduce the pressurizing force between the negative electrode heating drum 12 and the bonding drum 18 or to interrupt the pressurization. The cam mechanism 80 is driven by a motor independent of the drive of the motor 124. By the operation of the cam mechanism 80, a distance between the negative electrode heating drum 12 and the bonding drum 18 is controlled, and the pressurizing force to the negative electrode plate NP can be reduced or the pressurization can be interrupted.

The pressurizing force between the negative electrode heating drum 12 and the bonding drum 18 is kept fixed by the drive of the motor 124, however, the distance between the column β to which the negative electrode heating drum 12 is attached and the column α to which the bonding drum 18 is attached fluctuates. Accompanying the fluctuation of the distance, the fluctuation of the distance between the cam mechanism 80 and the roller 84 is generated and there may be a case where the pressurizing force between the negative electrode heating drum 12 and the bonding drum 18 cannot be reduced or the pressurization cannot be interrupted at a predetermined timing.

In order to keep the distance between the cam mechanism 80 and the roller 84 fixed, the swing aim 82 is provided with a roller 86, and an inclination member 88, a roller 90 and a cam mechanism 92 drivable independent of the column β of the negative electrode heating drum 12 are provided on the side of the column β. The roller 86 is in contact with an inclined surface of the inclination member 88. The roller 90 is attached to the inclination member 88 and is in contact with the cam mechanism 92. Since the inclination member 88 is moved up and down by the cam mechanism 92 driven by the motor, the swing arm 82 is swung via the roller 86 in contact with the inclined surface of the inclination member 88.

While the column β and the inclination member 88 are moved to right and left by the drive of the motor 124 according to a cancellation waveform, the inclined surface of the inclination member 88 is also moved up and down by the drive of the motor (not illustrated) which moves the cam mechanism 92 up and down also according to the cancellation waveform, and thus the fluctuation of the position of the roller 86 can be suppressed. Since the fluctuation of the position of the roller 86 is suppressed, the fluctuation of the distance between the roller 84 and the cam mechanism 80 can be suppressed.

Note that the method of bonding the negative electrode plate NP to the belt-like separator S1 by the fixed pressurizing force by the drive of the motor 124 and suppressing damages of both ends of the negative electrode plate NP by the drive of the cam mechanism 80 has been described in the description above, however, it is possible to suppress damages of both ends of the negative electrode plate NP after bonding the negative electrode plate NP to the belt-like separator S1 by the fixed pressurizing force even by driving the motor 124.

The positions of the negative electrode plates NP and the interval between the negative electrode plates NP at the negative electrode heating drum 12 can be detected by a camera arranged near the negative electrode heating drum 12 for example. The controller which monitors and controls the entire manufacturing device can also receive position data and interval data of the negative electrode plate NP detected by the camera, and control permission/regulation of the fixed pressurizing force (or ON/OFF of the fixed pressurizing force) using the received position data and interval data.

It is similar for a relation of the positive electrode heating drum 16 and the bonding drum 18, and the controller defines the drive signal waveform for cancelling the eccentricity amounts of the positive electrode heating drum 16 and the bonding drum 18 and pressing the positive electrode heating drum 16 to the bonding drum 18 by the fixed pressurizing force as a reference, superimposes the drive signal waveform for regulating the fixed pressurizing force at both ends of the positive electrode plate PP and in the area where the positive electrode plate PP is not present, and performs driving.

Further, while the thermocompression bonding roller 19 is a roller for pressing and thermocompression-bonding the belt-like separator S1/the negative electrode plate NP/the belt-like separator S2, the controller can also drive the roller by the drive signal waveform for regulating the fixed pressurizing force at both ends of the negative electrode plate NP and in the area where the negative electrode plate NP is not present.

Note that, while the case where the drum rotation fulcrum 122, the motor 124 and the coil spring 120 are installed to the negative electrode heating drum 12 has been described in the description relating to FIG. 23A, they may be provided on the side of the bonding drum 18. However, while FIG. 23A illustrates the state where the negative electrode heating drum 12 and the bonding drum 18 are in contact, there is a case where the drum which supplies the positive electrode plate is also in contact with the bonding drum 18. In such a case, the drum rotation fulcrum, the motor and the coil spring are preferably provided on the drum which supplies the positive electrode plate and the drum which supplies the negative electrode plate.

Figure 26:
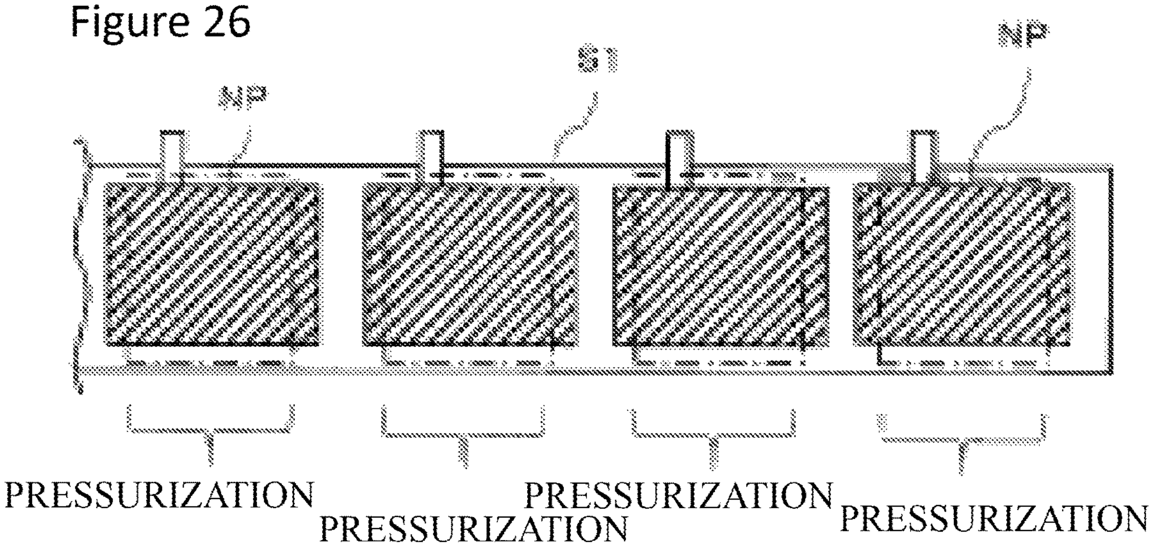
FIG. 26 is a pressurizing range explanatory diagram for the time of bonding the negative electrode plate of the embodiment.
Figure 27:
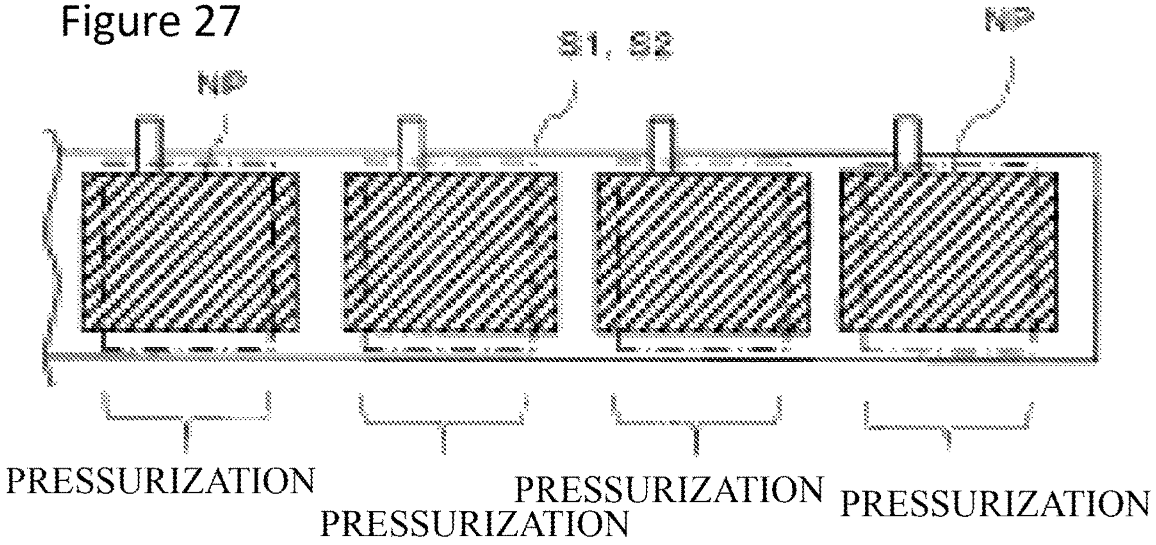
FIG. 27 is a pressurizing range explanatory diagram for the time of bonding a separator S2 of the embodiment.
Figure 28:
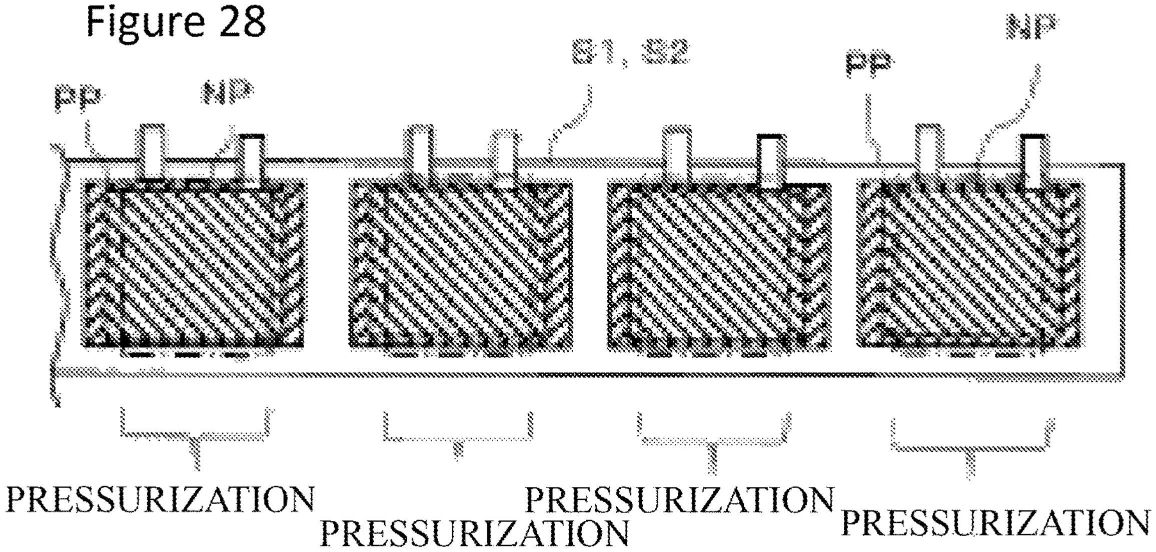
FIG. 28 is a pressurizing range explanatory diagram for the time of bonding a negative electrode plate of the embodiment.

FIG. 26-FIG. 28 illustrate a pressurizing range at the negative electrode heating drum 12, the thermocompression bonding roller 19 and the positive electrode heating drum 16.

FIG. 26 illustrates the pressurizing range when bonding the belt-like separator S1 and the negative electrode plate NP by the negative electrode heating drum 12 and the bonding drum 18 by a dashed line. Of the negative electrode plate NP, both ends in a longitudinal direction of the belt-like separator S1 are not pressurized, and the other area is pressurized and pressed. In other words, of four sides of the negative electrode plate NP in the rectangular shape, the two opposite sides, that are the two opposite sides in the longitudinal direction of the belt-like separator S1, are not pressurized, and the two opposite sides in the direction orthogonal to the longitudinal direction are pressurized. Of the four sides of the negative electrode plate NP in the rectangular shape, the two pressurized sides are bonded with the separator S1 at the pressurized parts, and the two sides that are not pressurized are not bonded with the separator S1.

FIG. 27 illustrates the pressurizing range when bonding the belt-like separator S1, the negative electrode plate NP and the belt-like separator S2 by the thermocompression bonding roller 19 and the bonding drum 18 by a dashed line. Similarly to the case of FIG. 26, of the negative electrode plate NP, both ends in the longitudinal direction of the belt-like separators S1 and S2 are not pressurized, and the other area is pressurized and pressed. In other words, of the four sides of the negative electrode plate NP in the rectangular shape, the two opposite sides, that are the two opposite sides in the longitudinal direction of the belt-like separators S1 and S2, are not pressurized, and the two opposite sides in the direction orthogonal to the longitudinal direction are pressurized. Of the four sides of the negative electrode plate NP in the rectangular shape, the two pressurized sides are bonded with the separator S2 at the pressurized parts, and the two sides that are not pressurized are not bonded with the separator S1.

FIG. 28 illustrates the pressurizing range when bonding the belt-like separator S the negative electrode plate NP, the belt-like separator S2 and the positive electrode plate PP by the positive electrode heating drum 16 and the bonding drum 18 by a dashed line. Of the positive electrode plate PP, both ends in the longitudinal direction of the belt-like separators S1 and S2 are not pressurized, and the other area is pressurized and pressed. In other words, of the four sides of the positive electrode plate PP in the rectangular shape, the two opposite sides, that are the two opposite sides in the longitudinal direction of the belt-like separators S1 and S2, are not pressurized, and the two opposite sides in the direction orthogonal to the longitudinal direction are pressurized. Of the four sides of the positive electrode plate PP in the rectangular shape, the two pressurized sides are bonded with the separators S1 and S2 at the pressurized parts, and the two sides that are not pressurized are not bonded with the separators S1 and S2.

Since the size of the positive electrode plate PP is smaller than the size of the negative electrode plate NP, the pressurizing range in FIG. 28 is smaller than the pressurizing range in FIG. 26. As above, the 3-layer laminated body 30 and the 4-layer laminated body 40 are manufactured while the pressurizing range is controlled.

Next, the laminating process at the laminating drum 22 and the laminating stage 24 will be described in more detail.

Figure 29:
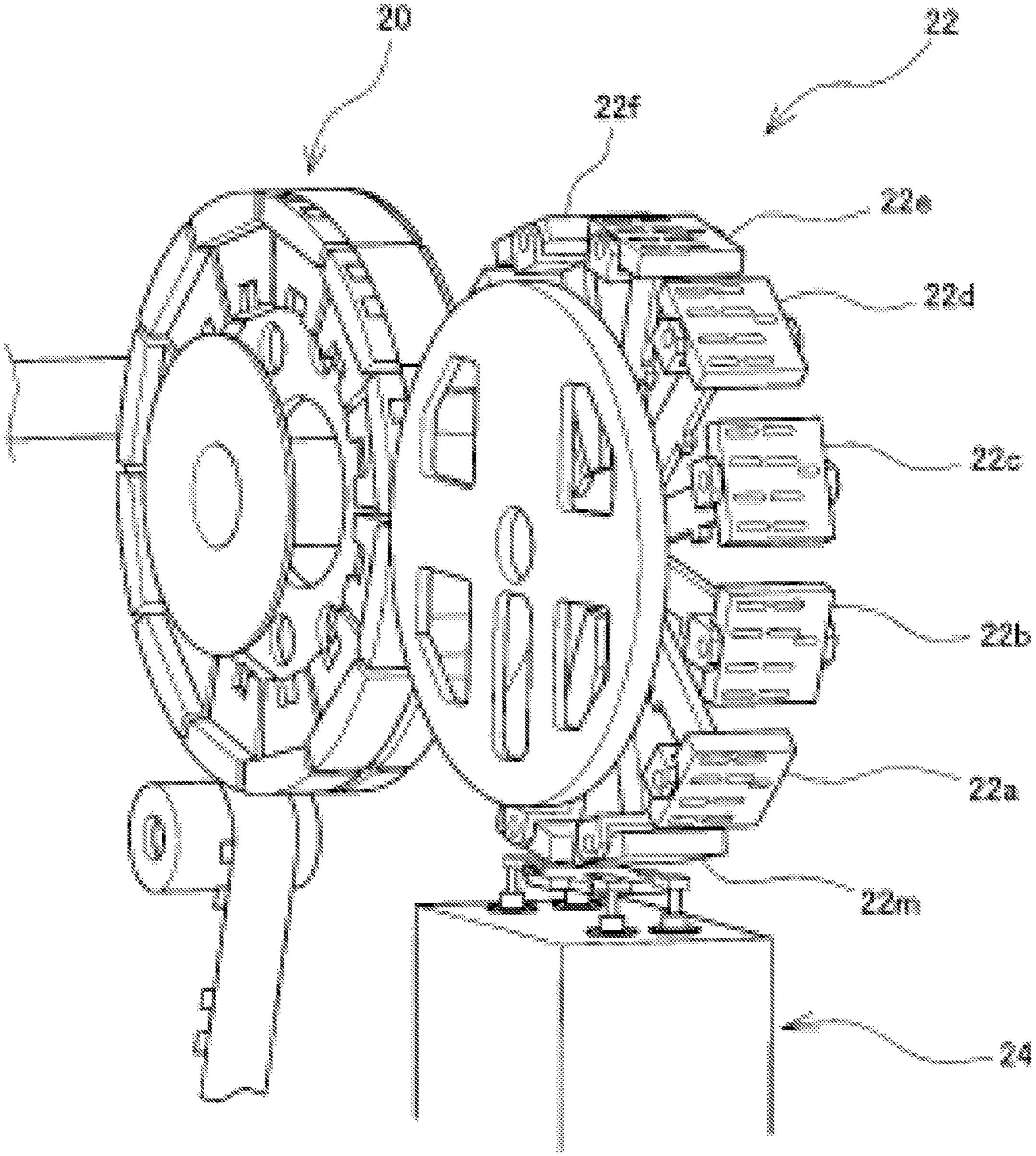
FIG. 29 is a configuration perspective view of a laminating drum of the embodiment.

FIG. 29 illustrates a configuration perspective view of the laminating drum 22. The laminating drum 22 is arranged closely to the separator cutting drum 20, and is rotated roughly the same as the linear velocity of the separator cutting drum 20. The laminating drum 22 is configured by the plurality of laminating heads which are rotated around the drum rotation center. The number of the laminating heads is arbitrary, and the laminating drum 22 is configured from 12 laminating heads 22*a*, 22*b*, 22*c*, 22*d*, 22*e*, 22*f*, 22*g*, 22*h*, 22*i*, 22*j*, 22*k* and 22*m* for example. Each laminating head is configured from an arm (spoke) connected to a drum center axis (hub) and a holding portion connected to the other end of the spoke. For each laminating head, the longitudinal section shape is roughly T-shaped by the arm and the holding portion, and the suction holes for sucking and holding the 3-layer laminated body 30 and the 4-layer laminated body 40 generated by being cut by the separator cutting drum 20 are formed on the outer peripheral surface of the holding portion. The holding portion is connected freely swingably in the circumferential direction to the arm.

The plurality of laminating heads 22*a*-22*m* are each rotated around the central axis of the laminating drum 22, and the individual laminating head is driven in the circumferential direction of the drum independent of the other laminating heads, and is further driven in the radial direction of the drum. That is, the individual laminating head rotationally conveys the 3-layer laminated body 30 and the 4-layer laminated body 40 to the position close to the laminating stage 24 while sucking and holding them. When the position close to the laminating stage 24 is reached, the relative speed in the circumferential direction of the drum to the laminating stage 24 becomes 0, and the individual laminating head is moved in the direction of approaching the laminating stage 24 in the radial direction of the drum. The individual laminating head which approaches the laminating stage 24 brings the sucked and held 3-layer laminated body 30 or 4-layer laminated body 40 into contact with the laminating stage 24 or, in the case where the 3-layer laminated body 30 or the 4-layer laminated body 40 is already laminated on the laminating stage 24, into contact on the laminated body, turns off the sucking and holding force and laminates the sucked and held 3-layer laminated body 30 or 4-layer laminated body 40. Thereafter, the individual laminating head is moved in the direction of separating from the laminating stage 24 in the radial direction of the drum.

FIG. 30-FIG. 33 illustrate a basic operation of the laminating heads 22*a*-22*m*. Hereinafter, in the description of the operation of the individual laminating head, "the radial direction of the drum" and "the radial direction of the laminating drum 22" are appropriately referred to as "the radial direction".

Figure 30:
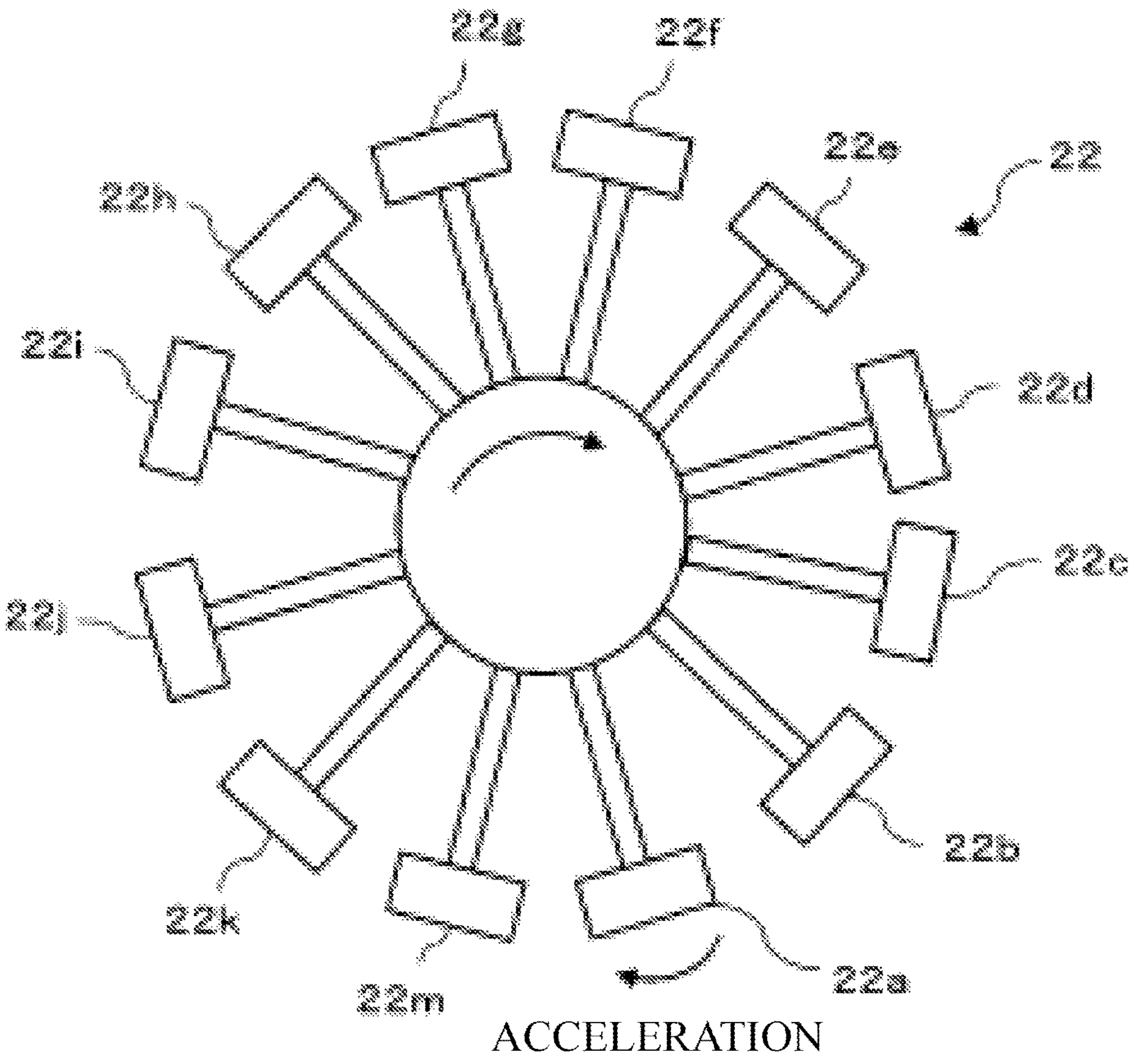
FIG. 30 is an operation explanatory diagram (part 1) of the laminating drum of the embodiment.

As illustrated in FIG. 30, the laminating heads 22*a*-22*m* are rotated around the rotation center axis of the laminating drum 22 at the fixed angular velocity, and when the predetermined position is reached, accelerated in the circumferential direction independent of the other laminating heads. For example, when paying attention to the laminating head 22*a*, the laminating head 22*a* is accelerated when the predetermined position in the circumferential direction is reached, approaches the adjacent laminating head 22*m* on the upstream side of the rotation direction, and separates from the adjacent laminating head 22*b* on the downstream side of the rotation direction.

Figure 31:
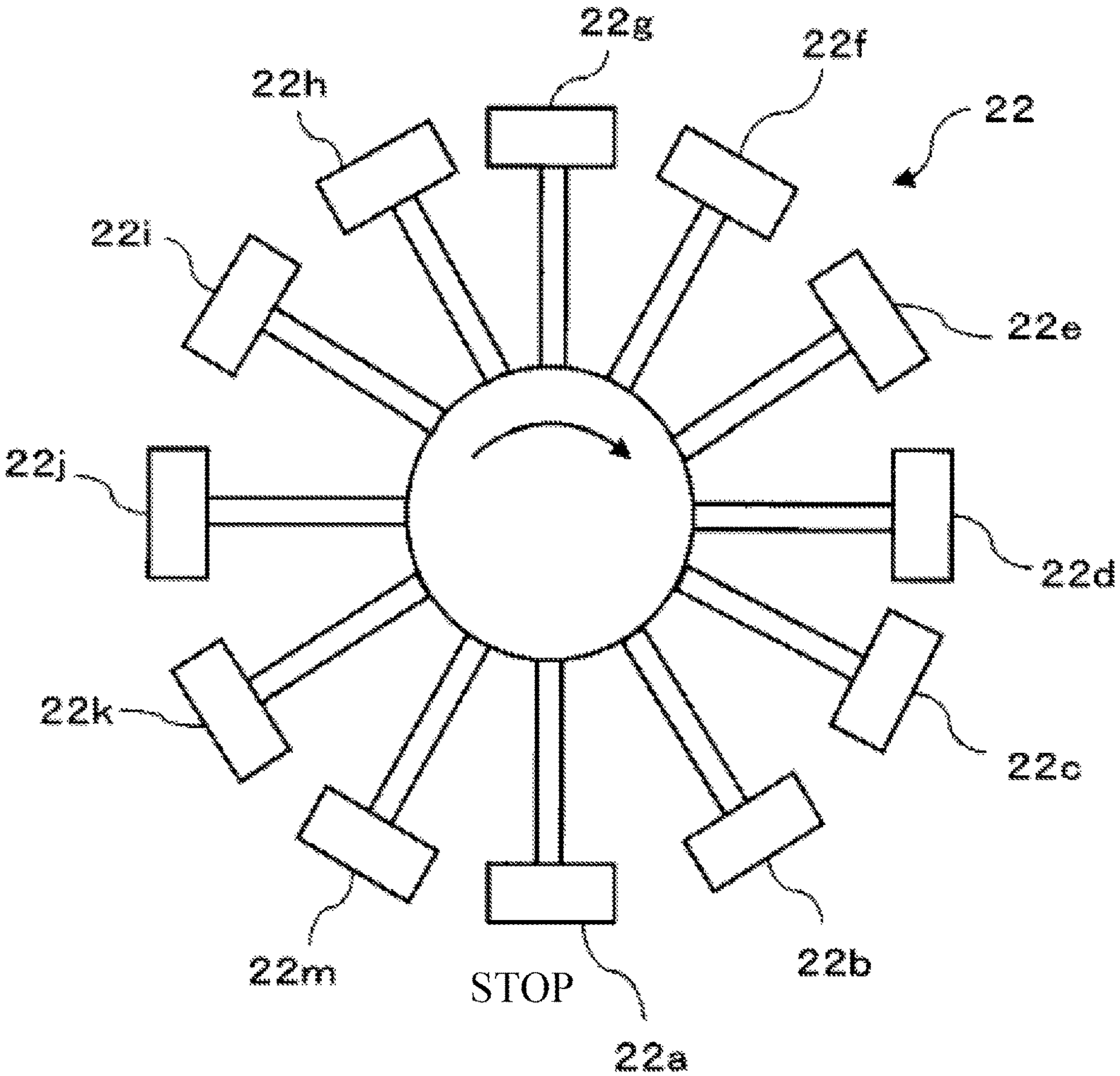
FIG. 31 is an operation explanatory diagram (part 2) of the laminating drum of the embodiment.

After the acceleration, when the laminating head 22*a* reaches the position close to the laminating stage 24 as illustrated in FIG. 31, for the laminating head 22*a*, the relative speed in the circumferential direction of the drum to the laminating stage 24 becomes 0. At the close position, the 3-layer laminated body 30 or the 4-layer laminated body 40 sucked and held on the outer peripheral surface is laminated on the laminating stage 24. In more detail, when approaching the position close to the laminating stage 24, the outer peripheral surface of the holding portion is swung to an angle to be roughly parallel to a stage surface of the laminating stage 24, and the laminating head 22*a* brings the outer peripheral surface of the holding portion close to the stage surface of the laminating stage 24 by being moved in the direction of the laminating stage 24 by the arm moving in the radial direction while maintaining the state that the outer peripheral surface of the holding portion is roughly parallel to the stage surface of the laminating stage 24, and laminates the 3-layer laminated body 30 or the 4-layer laminated body 40 sucked and held on the outer peripheral surface onto the laminating stage 24.

Figure 32:
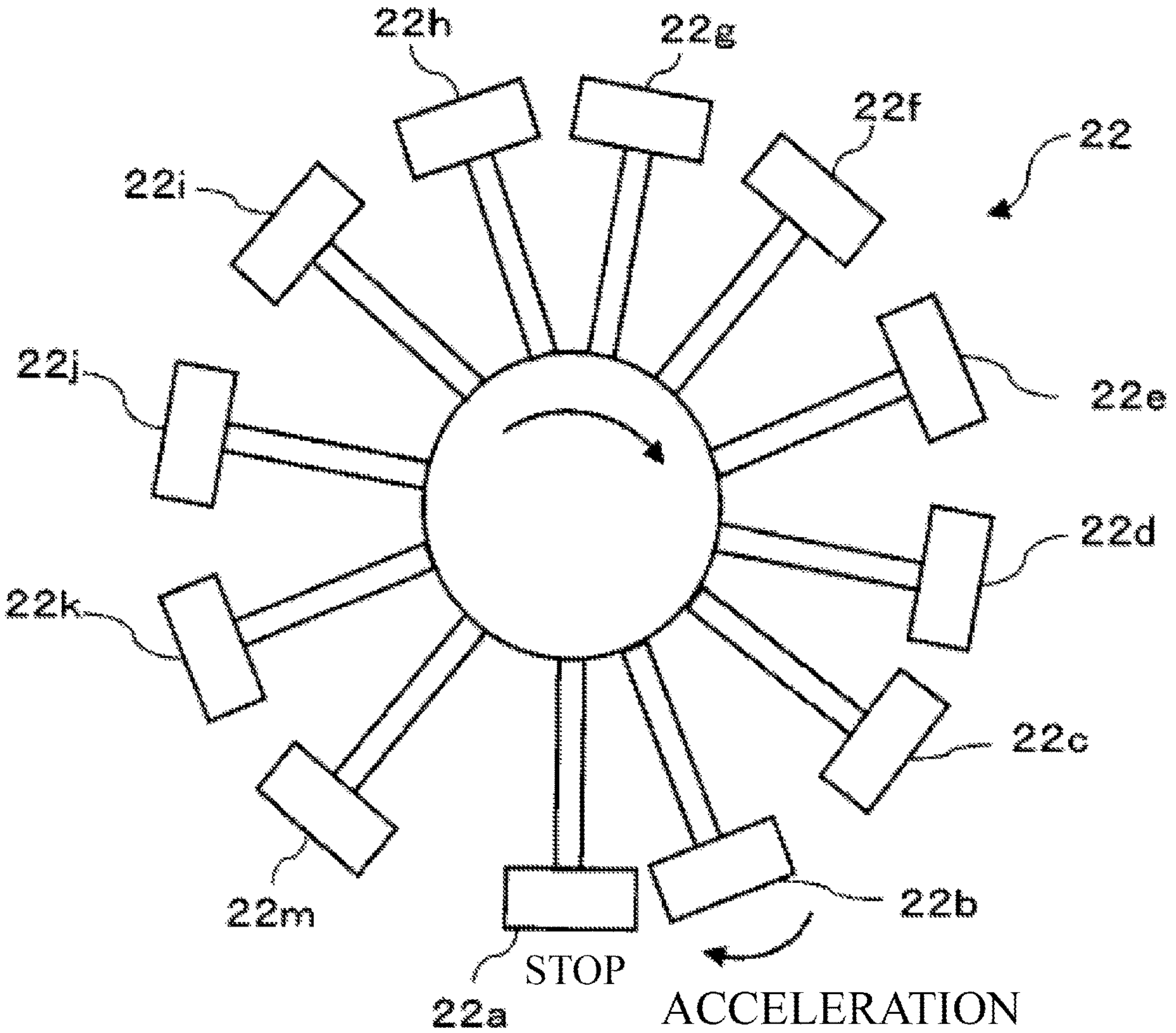
FIG. 32 is an operation explanatory diagram (part 3) of the laminating drum of the embodiment.
Figure 33:
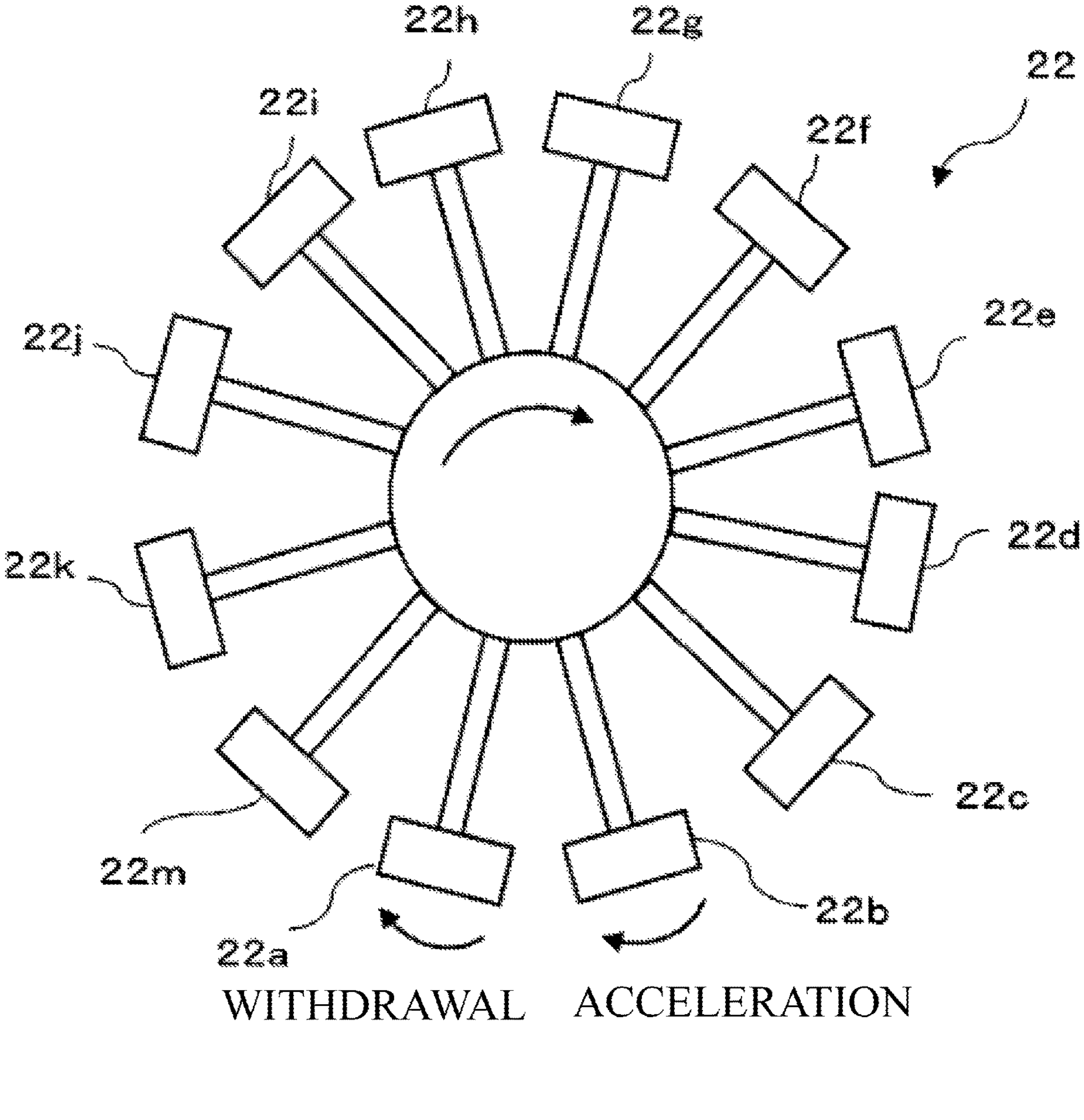
FIG. 33 is an operation explanatory diagram (part 4) of the laminating drum of the embodiment.

FIG. 32 and FIG. 33 illustrate the state after the 3-layer laminated body 30 or the 4-layer laminated body 40 is laminated on the laminating stage 24. The adjacent laminating head 22*b* on the rotation direction downstream side of the laminating head 22*a* is accelerated since it has reached the predetermined position, and approaches the laminating head 22*a*. After laminating the 3-layer laminated body 30 or the 4-layer laminated body 40 on the laminating stage 24, the laminating head 22*a* is rotated in the circumferential direction and withdrawn from the position close to the laminating stage 24. In more detail, the laminating head 22*a* is moved in such a direction that the outer peripheral surface separates from the position close to the stage surface of the laminating stage 24 by the arm moving in the radial direction, and is moved in the rotation direction and withdrawn so that the laminating head 22*a* does not interfere with the laminating head 22*b*. After withdrawal from the close position, the outer peripheral surface of the holding portion is swung in the opposite direction and returns.

Figure 34:
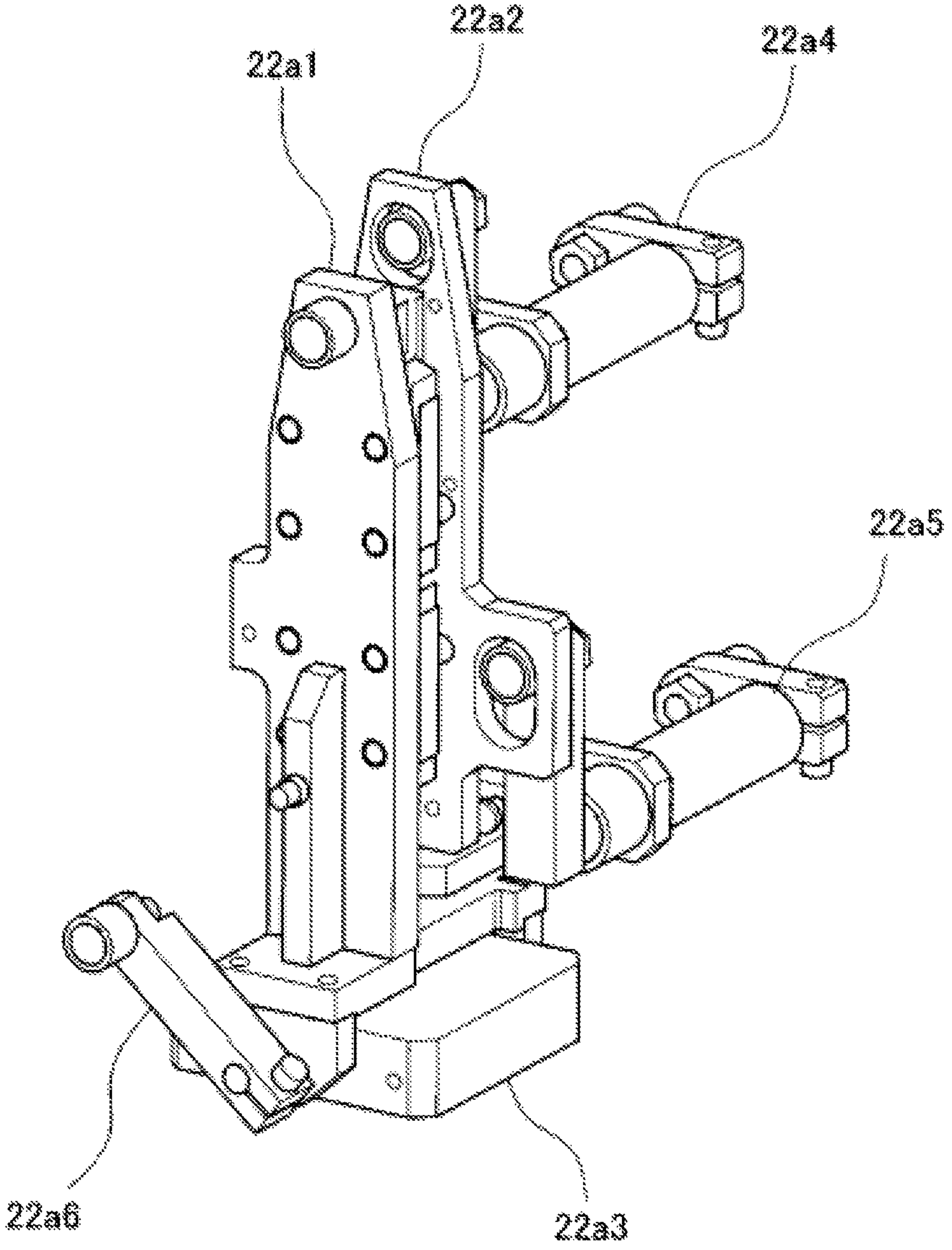
FIG. 34 is a configuration perspective view of a laminating head of the embodiment.

FIG. 34 illustrates a specific configuration example of the laminating head 22*a*. It is similar also for the other laminating heads 22*b*-22*m*.

The laminating head 22*a* comprises two arms 22*a*1 and 22*a*2 and a holding portion 22*a*3. The arms 22*a*1 and 22*a*2 extend in parallel to the radial direction of the laminating drum 22, the arm 22*a*1 and the arm 22*a*2 are rotationally driven integrally in the circumferential direction of the drum by a cam mechanism 22*a*4, and the arm 22*a*1 and the arm 22*a*2 are driven to swing in the circumferential direction by a cam mechanism 22*a*5. On ends in the radial direction of the arm 22*a*1 and the arm 22*a*2, an outer peripheral surface 22*a*3 is freely swingably provided. The outer peripheral surface 22*a*3 is rotated together with the rotation in the circumferential direction of the arm 22*a*1 and the aim 22*a*2, and is swung/moved together with the swing and radial direction movement of the arm 22*a*1 and the arm 22*a*2. Further, the outer peripheral surface 22*a*3 is swung to the arm 22*a*1 and the arm 22*a*2 by a cam mechanism 22*a*6.

Figure 35:
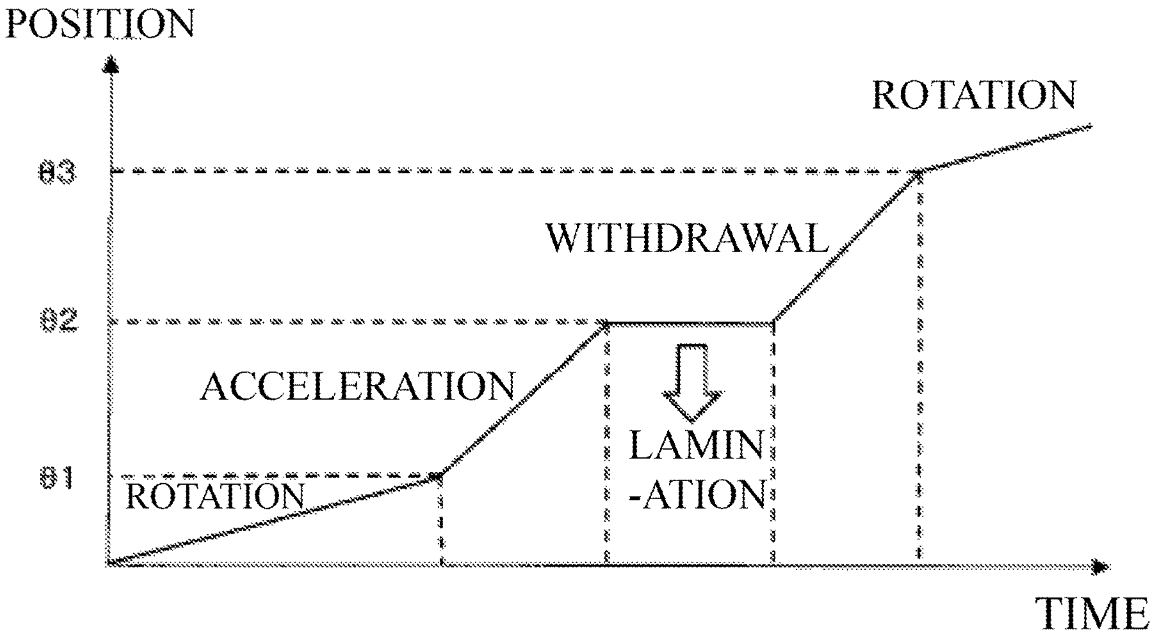
FIG. 35 is a graphical representation illustrating a position change of the laminating head of the embodiment.

FIG. 35 illustrates a time change of the position of the laminating head 22*a*. In the figure, a horizontal axis indicates time, and a vertical axis indicates the position (angle) in the circumferential direction of the drum.

From a certain reference position to a position θ1, the laminating head 22*a* is rotated at the fixed angular velocity. The outer peripheral surface 22*a*3 is rotated while sucking and holding the 3-layer laminated body 30 or the 4-layer laminated body 40.

Next, when the predetermined position θ1 is reached, the laminating head 22*a* is accelerated in the circumferential direction, and the outer peripheral surface 22*a*3 is also accelerated accompanying that. During the time, since the adjacent laminating head 22*b* on the rotation direction downstream side is continuously rotated at the fixed angular velocity, a clearance between the laminating head 22*a* and the laminating head 22*b* increases. It can be said that, by the acceleration, the laminating head 22*a* generates/secures stop time at the position close to the laminating stage 24, that is lamination time of the 3-layer laminated body 30 or the 4-layer laminated body 40 onto the laminating stage 24. In addition, during the acceleration, the outer peripheral surface 22*a*3 is swung to the arms 22*a*1 and 22*a*2, and the surface sucking and holding the 3-layer laminated body 30 or the 4-layer laminated body 40 is inclined so as to be roughly parallel to the stage surface of the laminating stage 24.

Next, when a position θ2 close to the laminating stage 24 is reached, the laminating head 22*a* is stopped at the position (needless to say, deceleration control is executed before stop, however, it is omitted for convenience of the description), moves the arm 22*al* and the arm 22*a*2 in the radial direction to bring the outer peripheral surface close to the stage surface of the laminating stage 24, turns off suction force of the outer peripheral surface, and laminates the 3-layer laminated body 30 or the 4-layer laminated body 40 on the laminating stage 24. At the time, by the claws provided on the laminating stage 24, the corner parts of the 3-layer laminated body 30 or the 4-layer laminated body 40 supplied from the laminating head 22*a* are pressed and held. The movement of the claws of the laminating stage 24 linked with the movement of the laminating head 22*a* will be further described later.

After laminating the 3-layer laminated body 30 or the 4-layer laminated body 40, the laminating head 22*a* is accelerated and rotated so as to withdraw to a predetermined position θ3. During the withdrawal, the outer peripheral surface 22*a*3 is swung to the arms 22*a*1 and 22*a*2, and the surface sucking and holding the 3-layer laminated body 30 or 4-layer laminated body 40 is inclined and returned to an initial angle.

Then, when the predetermined position θ3 is reached, the laminating head 22*a* is rotated at the fixed angular velocity again until the predetermined position θ1 is reached again. During the period, the laminating head 22*a* receives a new 3-layer laminated body 30 or 4-layer laminated body 40 from the separator cutting drum 20, sucks and holds it on the outer peripheral surface 22*a*3, and then reaches the predetermined position θ1.

Next, the operation of the laminating stage 24 will be described in more detail.

Figure 36:
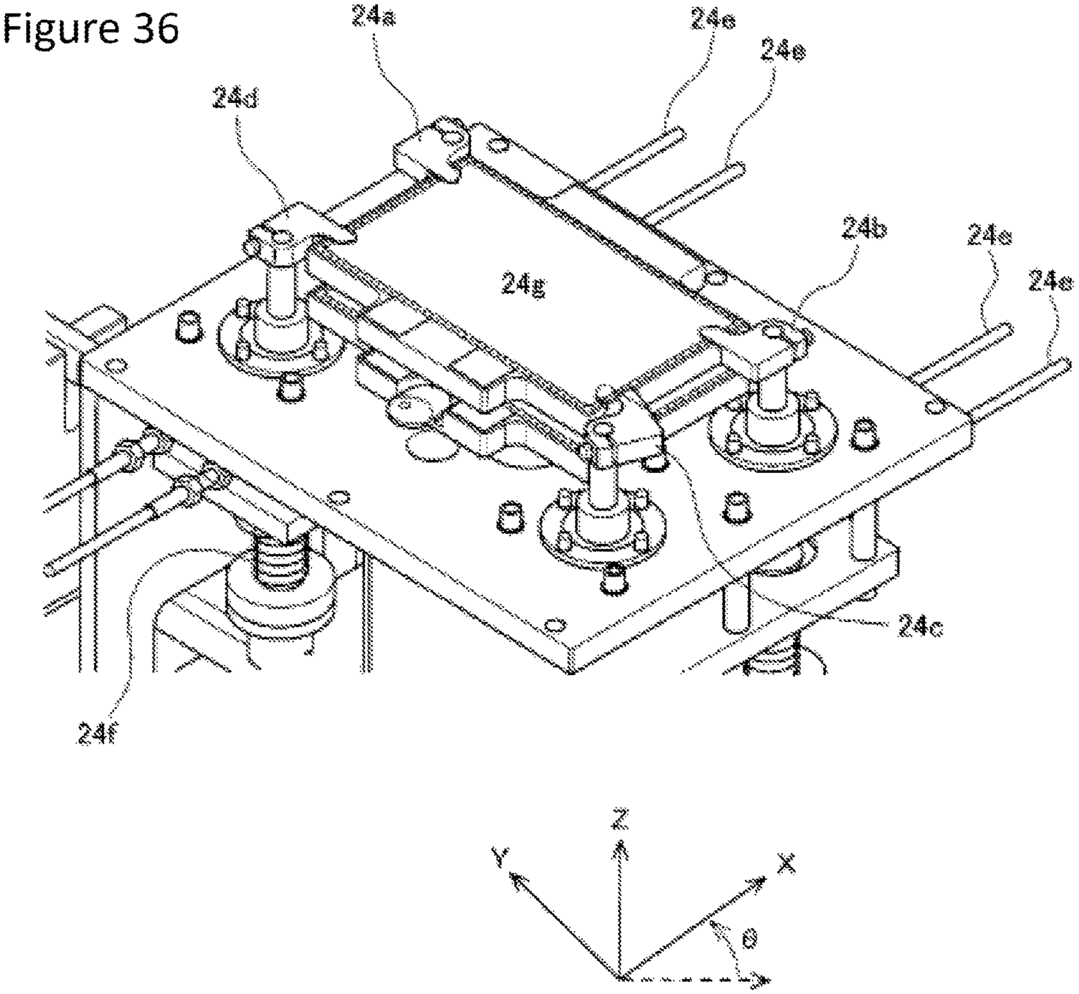
FIG. 36 is a configuration perspective view of a laminating stage of the embodiment.

FIG. 36 illustrates a configuration perspective view of the laminating stage 24. The laminating stage 24 is arranged right under the laminating drum 22. The laminating stage 24 comprises a stage surface 24*g* where the 3-layer laminated body 30 and the 4-layer laminated body 40 are laminated, and claws 24*a*-24*d* which press the 3-layer laminated body 30 and the 4-layer laminated body 40 laminated on the stage surface 24*g* from above and hold them.

The stage surface 24*g* forms a rectangular outer shape corresponding to the rectangular shape of the 3-layer laminated body 30 and the 4-layer laminated body 40, and is arranged within a roughly horizontal plane. The 3-layer laminated body 30 or the 4-layer laminated body 40 sucked and held on the outer peripheral surface of the laminating heads 22*a*-22*m* of the laminating drum 22 is positioned on the rectangular stage surface 24g and laminated. Specifically, when two orthogonal axes within the horizontal plane are defined as an X axis and a Y axis and the rotation direction of the X axis with a certain direction within the horizontal plane as a reference is defined as a θ direction, the stage surface 24g is driven in X axis and Y axis directions and also driven in the θ direction, that is, moved and rotationally driven within the horizontal plane, and is thus positioned so as to match a sucked and held posture of the 3-layer laminated body 30 or the 4-layer laminated body 40 sucked and held on the outer peripheral surface of the laminating heads 22a-22m of the laminating drum 22. For a lamination order, for example, the 3-layer laminated body 30 is arranged on the stage surface 24g first, then the 4-layer laminated body 40 is laminated on the 3-layer laminated body 30 and then the new 4-layer laminated body 40 is laminated on the already laminated 4-layer laminated body 40.

The claws 24a-24d are arranged respectively at four corners of the rectangular stage surface 24g. The claws 24a-24d each form a roughly L-shaped planar shape, are supported freely swingably in the θ direction centering on the shaft, and are also supported freely movably in a vertical direction (hereinafter, it is appropriately referred to as a vertically upper direction or a vertically lower direction). A drive source of the claws 24a-24d may be loaded on the laminating stage 24 similarly to a drive source for driving and positioning the stage surface 24g in the X-Y direction and the θ direction, but may be loaded outside the laminating stage 24 in order to reduce weight of the laminating stage 24. In the case of loading the drive source of the claws 24a-24d outside the laminating stage 24, the external drive source and the claws 24a-24d are connected by wires 24e via a cam mechanism, drive force from the external drive source is transmitted by the wires 24e and the claws 24a-24d are swung and vertically driven. The claws 24a-24d are pressurized in the vertically lower direction by a spring 24f, and the 3-layer laminated body 30 and the 4-layer laminated body 40 on the stage surface 24g are pressed and held by the pressurizing force.

Figure 37:
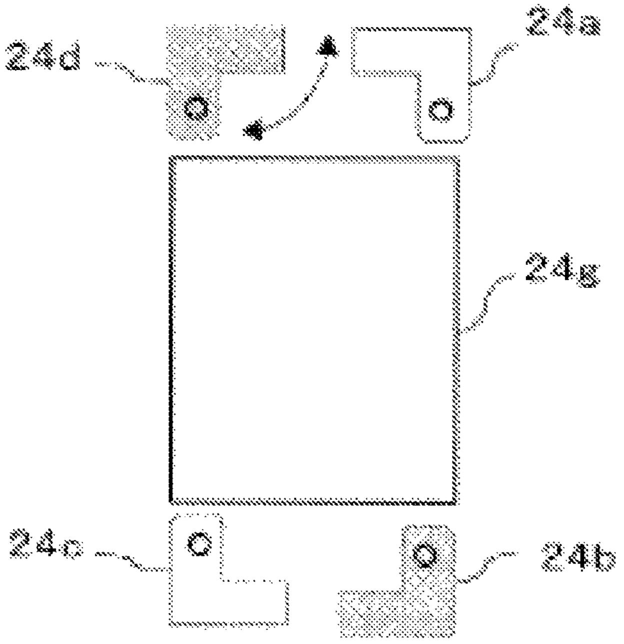
FIG. 37 is a diagram illustrating a claw arrangement of the laminating stage of the embodiment.

FIG. 37 illustrates a plane arrangement of the stage surface 24g and the claws 24a-24d of the laminating stage 24. When the stage surface 24g is in the rectangular shape, the claws 24a-24d are arranged at the four corner parts of the rectangular shape. The claw 24a and the claw 24c are arranged on a diagonal line of the stage surface 24g, and the claw 24b and the claw 24d are arranged on the other diagonal line of the stage surface 24g. The claw 24a and the claw 24c are paired and are a first claw pair, and the claw 24b and the claw 24d are paired and are a second claw pair. The claws 24a-24d are each freely swingable (freely turnable) clockwise and counterclockwise centering on the rotating shaft. When paying attention to the claw 24d, it is arranged at an upper left corner of the stage surface 24g, and the shaft is positioned within an area defined by extended lines of two opposite long sides of the stage surface 24g. The claw 24d is withdrawn to the outside (withdrawn position) of the existence area of the stage surface 24g at the initial position, is partially positioned inside the existence area of the stage surface 24g by swinging clockwise, and presses the laminated body (the 3-layer laminated body 30 and the 4-layer laminated body 40) laminated on the stage surface 24g at a pressing position. In addition, when paying attention to the claw 24a, it is arranged at an upper right corner of the stage surface 24g, and the shaft is positioned within the area defined by the extended lines of the two opposite long sides of the stage surface 24g. The claw 24a is withdrawn to the outside (withdrawn position) of the existence area of the stage surface 24g at the initial position, is partially positioned inside the existence area of the stage surface 24g by swinging counterclockwise, and presses and holds the laminated body laminated on the stage surface 24g. The claw 24b is operated the same as the claw 24d, and the claw 24c is operated the same as the claw 24a.

When pressing and holding the laminated body, the claw 24a and the claw 24c, and the claw 24b and the claw 24d positioned on the diagonal line of the stage surface 24g are swung within the horizontal plane and also vertically moved respectively as sets. That is, the first claw pair of the claw 24a and the claw 24c is swung and presses and holds the laminated body, but the second claw pair of the claw 24b and the claw 24d does not hold the laminated body which is newly laminated since it is pressing and holding the laminated body which is already laminated at the time. Then, when the new laminated body is laminated next, the second claw pair of the claw 24b and the claw 24d is swung, withdrawn from the stage surface 24g, moved in the upper direction and swung again, and presses and holds the laminated body which is newly laminated.

Figure 38:
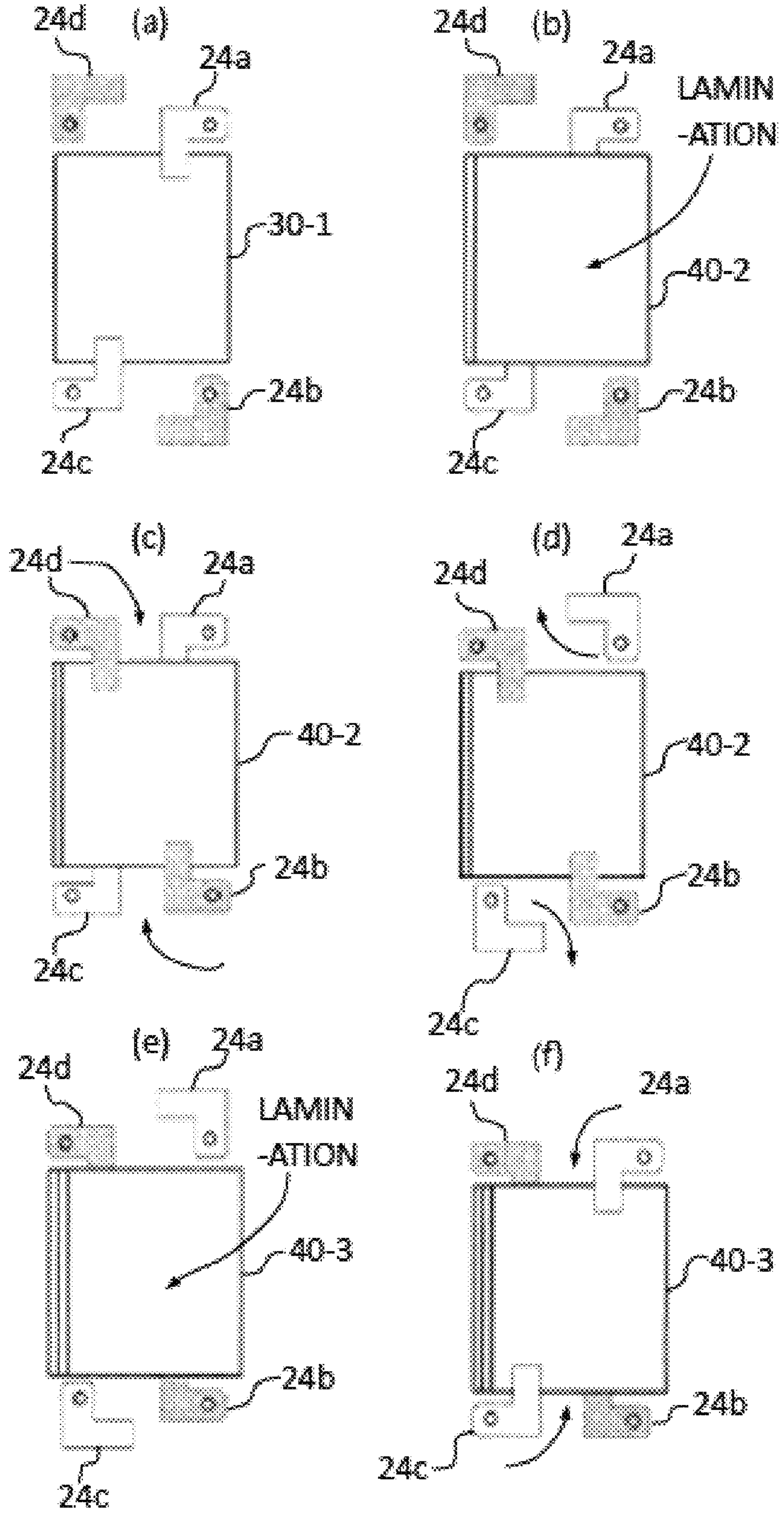
FIG. 38 is a claw operation explanatory diagram of the laminating stage of the embodiment.

FIG. 38 illustrates the operation of pressing and holding the laminated body by the claws 24a-24d.

FIG. 38(a) illustrates the state of pressing and holding a 3-layer laminated body 30-1 laminated on the stage surface 24g. When the first 3-layer laminated body 30-1 is laminated on the stage surface 24g, the claw 24a and the claw 24c are swung counterclockwise and arranged on the 3-layer laminated body 30-1, press the 3-layer laminated body 30-1 in the vertically lower direction from above by the pressurizing force of the spring 24f, and hold the 3-layer laminated body 30-1.

FIG. 38(b) illustrates the state where a new 4-layer laminated body 40-2 is laminated on the 3-layer laminated body 30-1 newly from the state of FIG. 38(a). Since the 4-layer laminated body 40-2 is laminated over the claws 24a and 24c pressing and holding the 3-layer laminated body 30-1, the 4-layer laminated body 40-2 is laminated so as to cover a part of the claws 24a and 24c.

FIG. 38(c) illustrates the state of pressing and holding the 4-layer laminated body 40-2. While the 3-layer laminated body 30-1 is kept pressed and held by the claws 24a and 24c, the claws 24b and 24d are moved in the vertically upper direction, swung clockwise further, and arranged on the 4-layer laminated body 40-2. The claws 24b and 24d press the 4-layer laminated body 40-2 in the vertically lower direction from above by the pressurizing force of the spring 24f and hold it.

FIG. 38(d) illustrates the state where the claws 24a and 24c are withdrawn from the state of FIG. 38(c). After the 4-layer laminated body 40-2 is pressed and held by the claws 24b and 24d, the claws 24a and 24c no longer need to press and hold the 3-layer laminated body 30-1, and need to be withdrawn from the stage surface 24g so as not to obstruct the laminated body to be newly laminated next. Then, the claws 24a and 24c are moved in the vertically upper direction, swung clockwise and withdrawn from the stage surface 24g. At the time, since the 3-layer laminated body 30-1 and the 4-layer laminated body 40-2 are pressed and held by the claws 24b and 24d, the laminating position is not shifted by the swing of the claws 24a and 24c.

FIG. 38(e) illustrates the state where a next laminated body 40-3 is laminated on the 4-layer laminated body 40-2 newly from the state of FIG. 38(d). Since the 4-layer laminated body 40-3 is laminated over the claws 24b and 24d pressing and holding the 4-layer laminated body 40-2, the 4-layer laminated body 40-3 is laminated so as to cover a part of the claws 24*b* and 24*d*.

FIG. 38(*f*) illustrates the state of pressing and holding the 4-layer laminated body 40-3. While the 4-layer laminated body 40-2 is kept pressed and held by the claws 24*b* and 24*d*, the claws 24*a* and 24*c* are moved in the vertically upper direction, swung counterclockwise further, and arranged on the 4-layer laminated body 40-3. The claws 24*a* and 24*c* press the 4-layer laminated body 40-3 in the vertically lower direction from above by the pressurizing force of the spring 24*f* and hold it. By repeating the above-described operation, the 4-layer laminated bodies 40-2, 40-3, . . . are laminated successively on the 3-layer laminated body 30-1.

The claws 24*a*-24*d* and the respective shafts in the present embodiment are arranged within the area defined by the extended lines of the two opposite long sides of the stage surface 24*g* as illustrated in FIG. 37, however, without being limited thereto, they may be arranged outside the area defined by the extended lines of the two opposite long sides of the stage surface 24*g*. The inside of the area defined by the extended lines of the two opposite long sides of the stage surface 24*g* is the area including also the stage surface 24*g*. The outside of the area defined by the extended lines of the two opposite long sides of the stage surface 24*g* is the area not including the stage surface 24*g*.

Figure 39:
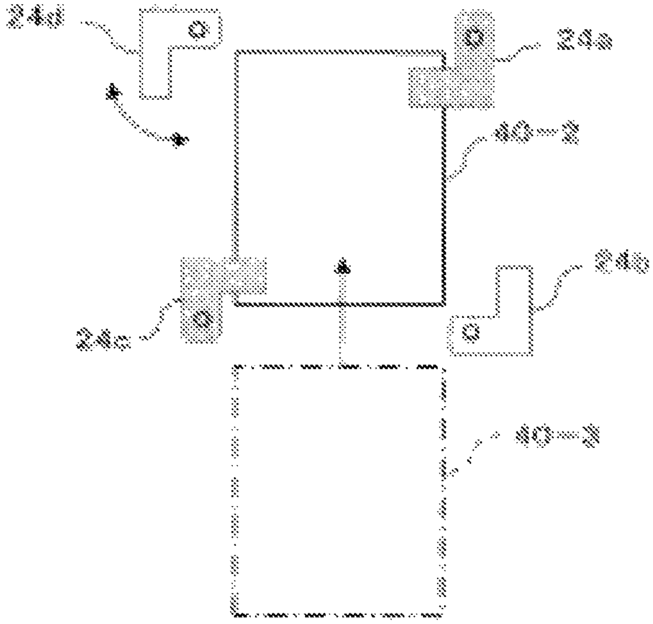
FIG. 39 is a plan view illustrating another claw arrangement of the laminating stage of the embodiment.

FIG. 39 illustrates a plan view in the case where the respective shafts of the claws 24*a*-24*d* are arranged outside the area defined by the extended lines of the two opposite long sides of the stage surface 24*g*. When paying attention to the claw 24*d*, it is arranged at the upper left corner of the stage surface 24*g*, and the shaft is positioned outside the area defined by the extended lines of the two opposite long sides of the stage surface 24*g*. The attention should be paid to a difference between the position of the claw 24*d* in FIG. 37 and the position of the claw 24*d* in FIG. 39. It is similar for the other claws 24*a*-24*c*. Note that, in FIG. 39, the respective shafts of the claws 24*a*-24*d* are positioned outside the area defined by the extended lines of two opposite short sides of the stage surface 24*g*. The outside of the area defined by the extended lines of the two opposite short sides of the stage surface 24*g* is the area not including the stage surface 24*g*.

When the respective shafts of the claws 24*a*-24*d* are arranged outside the area defined by the extended lines of the two opposite long sides of the stage surface 24*g*, in the case where the laminated body sucked and held on the outer peripheral surface of the laminating heads 22*a*-22*m* of the laminating drum 22 is laminated onto the stage surface 24*g*, the laminated body does not enter from right above the stage surface 24*g*, and the laminated body enters from diagonally above the stage surface 24*g* since the outer peripheral surface is moved along the circumference. When the radius of the laminating drum 22 is sufficiently large relatively compared to the size of the stage surface 24*g*, it is almost the same as the entry of the laminated body from a side direction of the stage surface 24*g*.

FIG. 39 schematically illustrates the situation where the laminated body enters from the side direction of the stage surface 24*g* in such a manner. The 4-layer laminated body 40-2 is laminated on the stage surface 24*g*, and the 4-layer laminated body 40-2 is pressed and held by the claws 24*a* and 24*c*. In the case of newly laminating the next 4-layer laminated body 40-3, the 4-layer laminated body 40-3 sucked and held on the outer peripheral surface of the laminating drum 22 enters from the side (from below in the figure) of the stage surface 24*g*. The shafts of the claws 24*b* and 24*d* are arranged outside the area defined by the extended lines of the two opposite long sides of the stage surface 24*g*. The claws 24*b* and 24*d* are moved in the vertically upper direction and swung, and do not collide with the next 4-layer laminated body 40-3 entering from the side even when they are positioned on the stage surface 24*g*. The claws 24*b* and 24*d* are not obstacles to the 4-layer laminated body 40-3. Accordingly, when laminating the 4-layer laminated body 40-3, the claws 24*b* and 24*d* do not need to be withdrawn to the outside (withdrawn position) of the existence area of the stage surface 24*g*. The claws 24*b* and 24*d* are positioned on the stage surface 24*g* (standby position) and made to stand by, and the claws 24*b* and 24*d* can press and hold the 4-layer laminated body 40-3 by the pressurizing force of the spring 24*f* promptly after the 4-layer laminated body 40-3 is laminated on the 4-layer laminated body 40-2.

FIG. 40-FIG. 44 illustrate the operation of the claws 24*a*-24*d* of the laminating stage 24 linked with the movement of the laminating heads 22*a*-22*m* in more detail. In the figures, the movement of the laminating head 22*a* among the laminating heads 22*a*-22*m* is illustrated, however, it is also similar for the other laminating heads 22*b*-22*m*.

Figure 40:
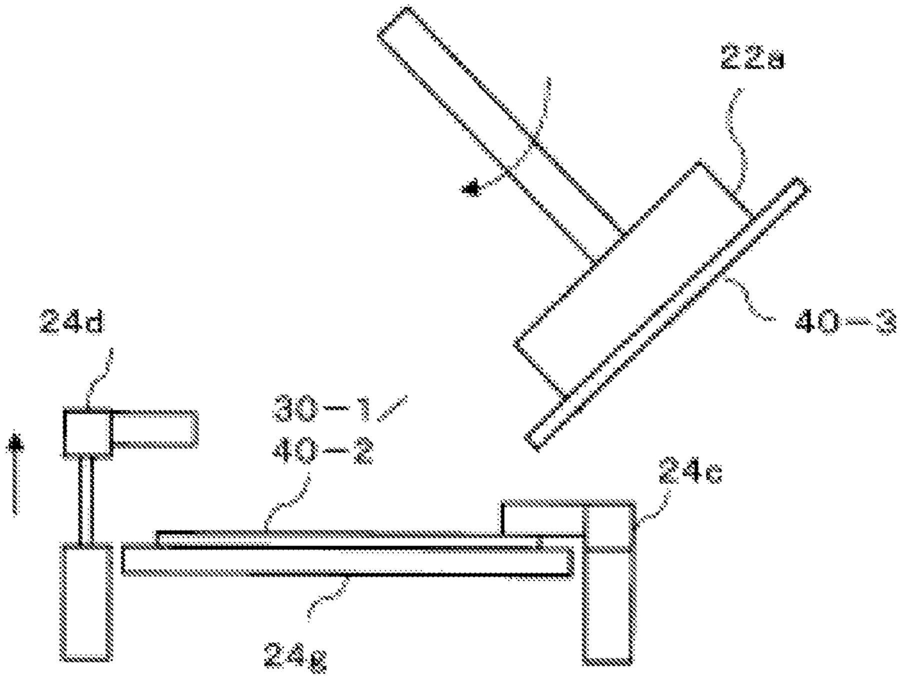
FIG. 40 is a linked operation explanatory diagram (part 1) of the laminating head and claws of the embodiment.

FIG. 40 illustrates a side view of the case where the 3-layer laminated body 30-1 and the 4-layer laminated body 40-2 are already laminated on the stage surface 24*g* of the laminating stage 24 and the 4-layer laminated body 40-3 is to be newly laminated next by the laminating head 22*a*. While the figure illustrates the claws 24*c* and 24*d*, the claw 24*a* is operated similarly to the claw 24*c*, and the claw 24*b* is operated similarly to the claw 24*d*.

The claw 24*c* presses and holds the 3-layer laminated body 30-1 and the 4-layer laminated body 40-2 on the stage surface 24*g* by the pressurizing force of the spring 24*f*. On the other hand, the claw 24*d* is moved in the vertically upper direction and swung around the shaft and is in a standby state so as to be partially positioned above the stage surface 24*g* (withdrawn position). The laminating head 22*a* is rotated while sucking and holding the 4-layer laminated body 40-3 on the outer peripheral surface, is accelerated when the specific position is reached, and approaches the position close to the stage surface 24*g*. When the laminating head 22*a* approaches the position close to the stage surface 24*g*, the holding portion 22*a*3 is swung to the arms 22*a*1 and 22*a*2 and the outer peripheral surface is made roughly parallel to the stage surface 24*g* while avoiding a collision with the stage surface 24*g*.

Figure 41:
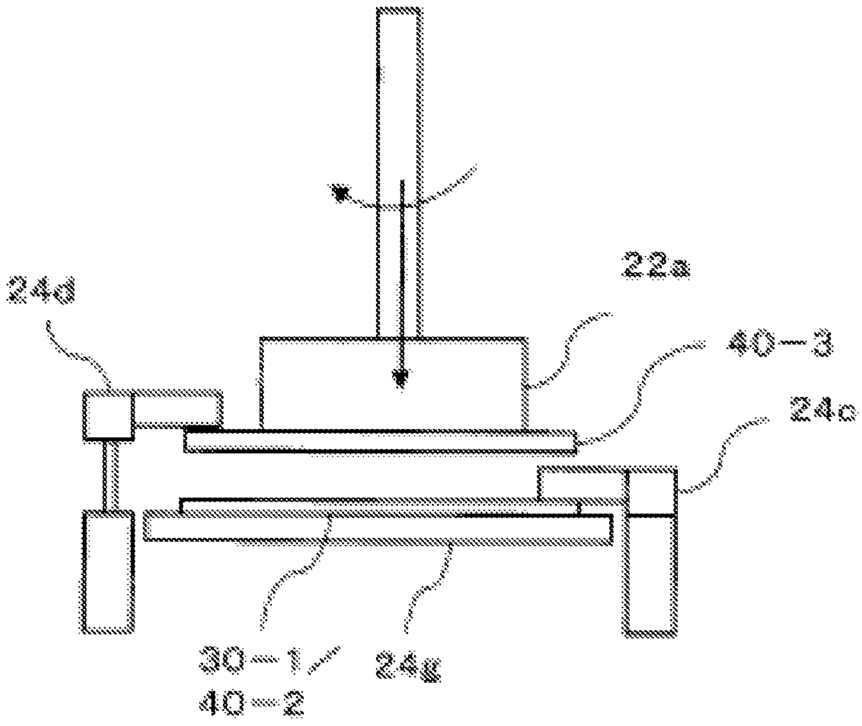
FIG. 41 is a linked operation explanatory diagram (part 2) of the laminating head and the claws of the embodiment.

FIG. 41 is the case where the laminating head 22*a* reaches the position close to the stage surface 24*g*.

Figure 42:
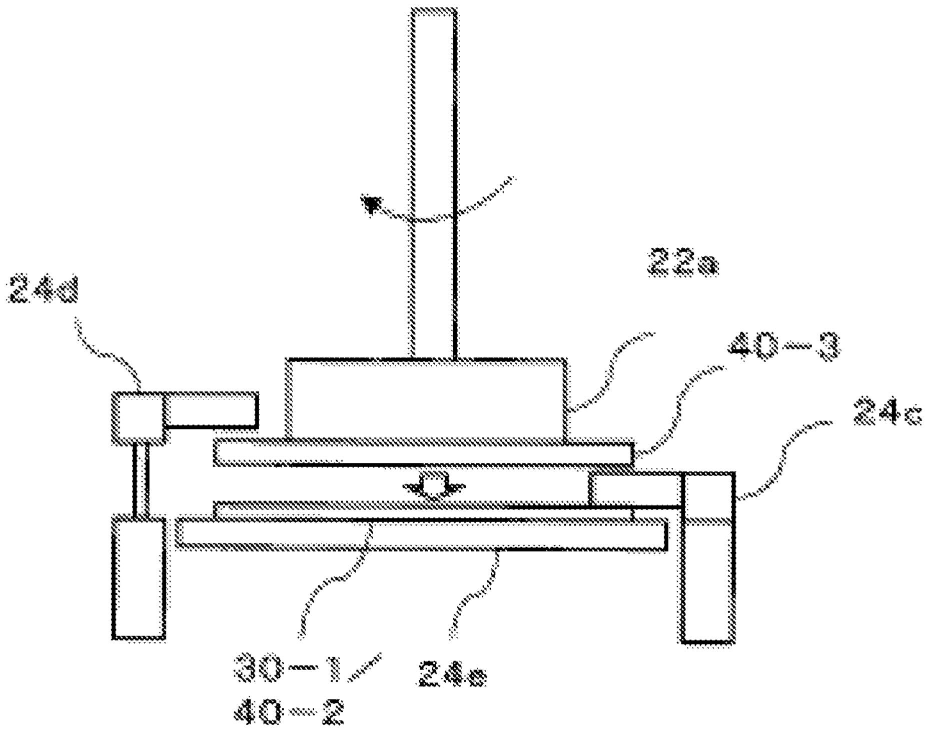
FIG. 42 is a linked operation explanatory diagram (part 3) of the laminating head and the claws of the embodiment.

The aims 22*a*1 and 22*a*2 of the laminating head 22*a* are moved in the radial direction of the laminating drum 22, the holding portion 22*a*3 is also moved in the vertically lower direction, and the outer peripheral surface of the holding portion 22*a*3 further gets closer to the stage surface 24*g*. At the time, the claw 24*d* is in the standby state above the stage surface 24*g* (withdrawn position), and the claw 24*c* maintains the state of pressing and holding the 3-layer laminated body 30-1 and the 4-layer laminated body 40-2. Then, from the state, as illustrated in FIG. 42, the laminating head 22*a* laminates the 4-layer laminated body 40-3 onto the 3-layer laminated body 30-1 and the 4-layer laminated body 40-2 on the stage surface 24*g*, and turns off the suction force of the holding portion 22*a*3. The movement in the vertically lower direction of the holding portion 22*a*3 may be temporarily stopped after the movement in the vertically lower direction of the holding portion 22*a*3 is started and before the 4-layer laminated body 40-3 is laminated on the 3-layer laminated body 30-1 and the 4-layer laminated body 40-2 on the stage surface 24*g*. By the temporary stop, an impact when the 4-layer laminated body 40-3 is laminated on the 3-layer laminated body 30-1 and the 4-layer laminated body 40-2 on the stage surface 24*g* can be mitigated.

Figure 43:
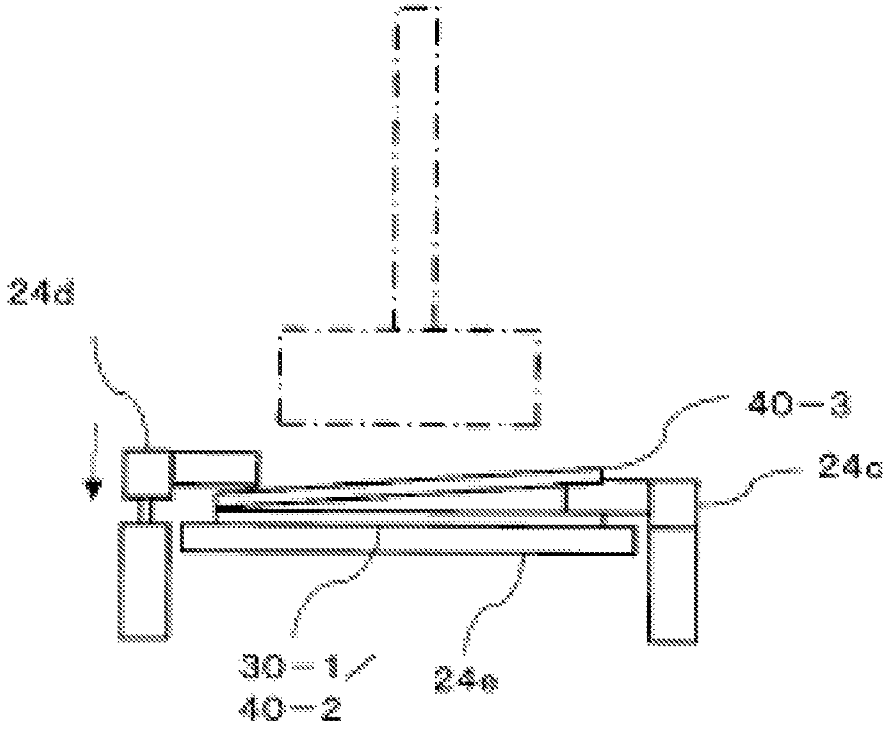
FIG. 43 is a linked operation explanatory diagram (part 4) of the laminating head and the claws of the embodiment.

FIG. 43 illustrates the state where the 4-layer laminated body 40-3 is laminated on the 3-layer laminated body 30-1 and the 4-layer laminated body 40-2. Since the claw 24*c* (and the claw 24*a*) presses and holds the 3-layer laminated body 30-1 and the 4-layer laminated body 40-2, the 4-layer laminated body 40-3 is laminated on the claw 24*c* (and the claw 24*a*). In addition, the claw 24*d* (and the claw 24*b*) is in the standby state above the stage surface 24*g*. When the 4-layer laminated body 40-3 is laminated, the claw 24*d* (and the claw 24*b*) is promptly moved in the vertically lower direction, and presses and holds the newly laminated 4-layer laminated body 40-3. When the 4-layer laminated body 40-3 is pressed and held by the claw 24*d* (and the claw 24*b*), since there is no need to press and hold the 3-layer laminated body 30-1 and the 4-layer laminated body 40-2 anymore, the claw 24*c* (and the claw 24*a*) is moved in the vertically upper direction, then swung around the shaft and withdrawn from the stage surface 24*g*, and stands by above the stage surface 24*g* (withdrawn position).

Figure 44:
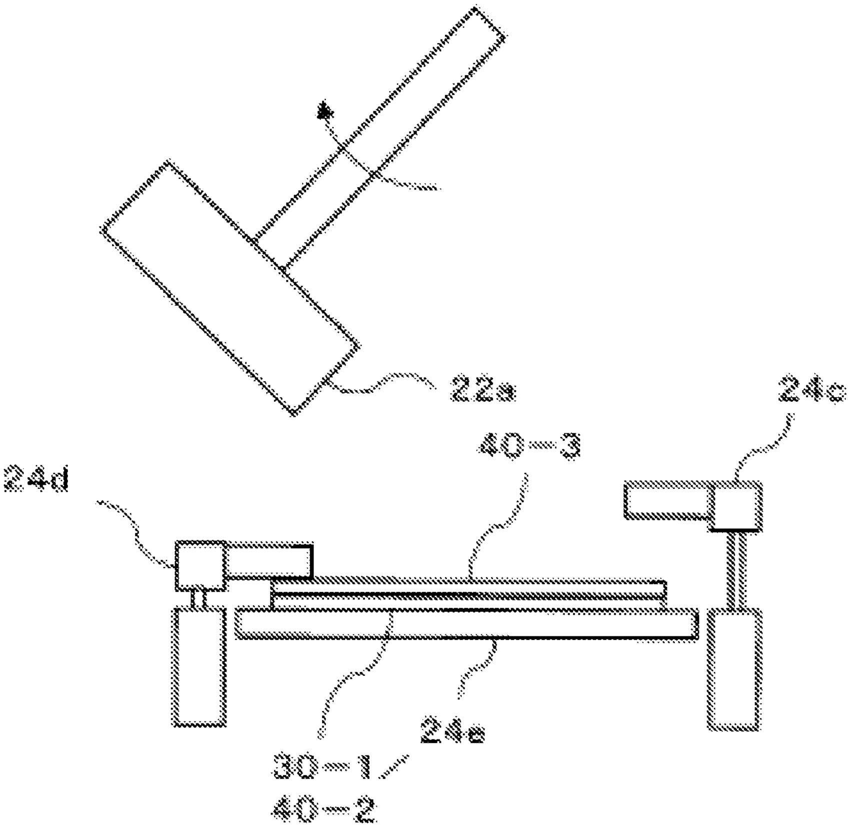
FIG. 44 is a linked operation explanatory diagram (part 5) of the laminating head and the claws of the embodiment.

FIG. 44 illustrates the state where the lamination of the 4-layer laminated body 40-3 is ended. The 3-layer laminated body 30-1, the 4-layer laminated body 40-2 and the 4-layer laminated body 40-3 are pressed and held by the claw 24*d* (and the claw 24*b*). In addition, the claw 24*c* (and the claw 24*a*) is positioned above the stage surface 24*g* (withdrawn position) in the standby state, and prepares for the lamination of the 4-layer laminated body to be newly laminated next, that is the 4-layer laminated body sucked and held on the outer peripheral surface of the laminating head 22*b*.

In such a manner, according to the arrangement of the claws 24*a*-24*d* illustrated in FIG. 39, since the two claws other than the claws pressing and holding the laminated body can stand by above the stage surface 24*g* (withdrawn position) without the need of being withdrawn so as not to be obstructive when the next laminated body enters, the laminated body is promptly pressed and held after it is laminated and the total lamination time can be shortened.

Note that the outer peripheral surface (holding portion 22*a*3) of the laminating head 22*a* may be configured such that the cross section viewed from the circumferential direction of the laminating drum 22 is not flat and is curved in a concave shape or a convex shape and the 3-layer laminated body or the 4-layer laminated body is sucked and held on the concave or the convex. It is to suppress fluttering of the part of the 3-layer laminated body or the 4-layer laminated body protruding from the end of the laminating head 22*a* even in the case where the size of the outer peripheral surface of the laminating head 22*a* is made one size smaller than the size of the 3-layer laminated body or the 4-layer laminated body. In the case where the holding portion 22*a*3 of the laminating head 22*a* is curved in the convex shape, the close position of the laminating head 22*a* and the stage surface 24*g* means the position at which the distance between the most convex part of the holding portion 22*a*3 and the stage surface 24*g* is the shortest. In the case where the outer peripheral surface of the laminating head 22*a* is curved in the concave shape, the close position of the laminating head 22*a* and the stage surface 24*g* means the position at which the distance between the part positioned at the outermost periphery of the laminating head 22*a* and the stage surface 24*g* is the shortest.

The embodiment of the present disclosure has been described above, and the present disclosure is not limited to the embodiment and can be various modified. Hereinafter, modifications will be described.

<Modification 1>

While only one set of the laminating drum 22 and the laminating stage 24 is arranged in the present embodiment, the plurality of sets of the laminating drum 22 and the laminating stage 24 may be arranged.

Figure 45:
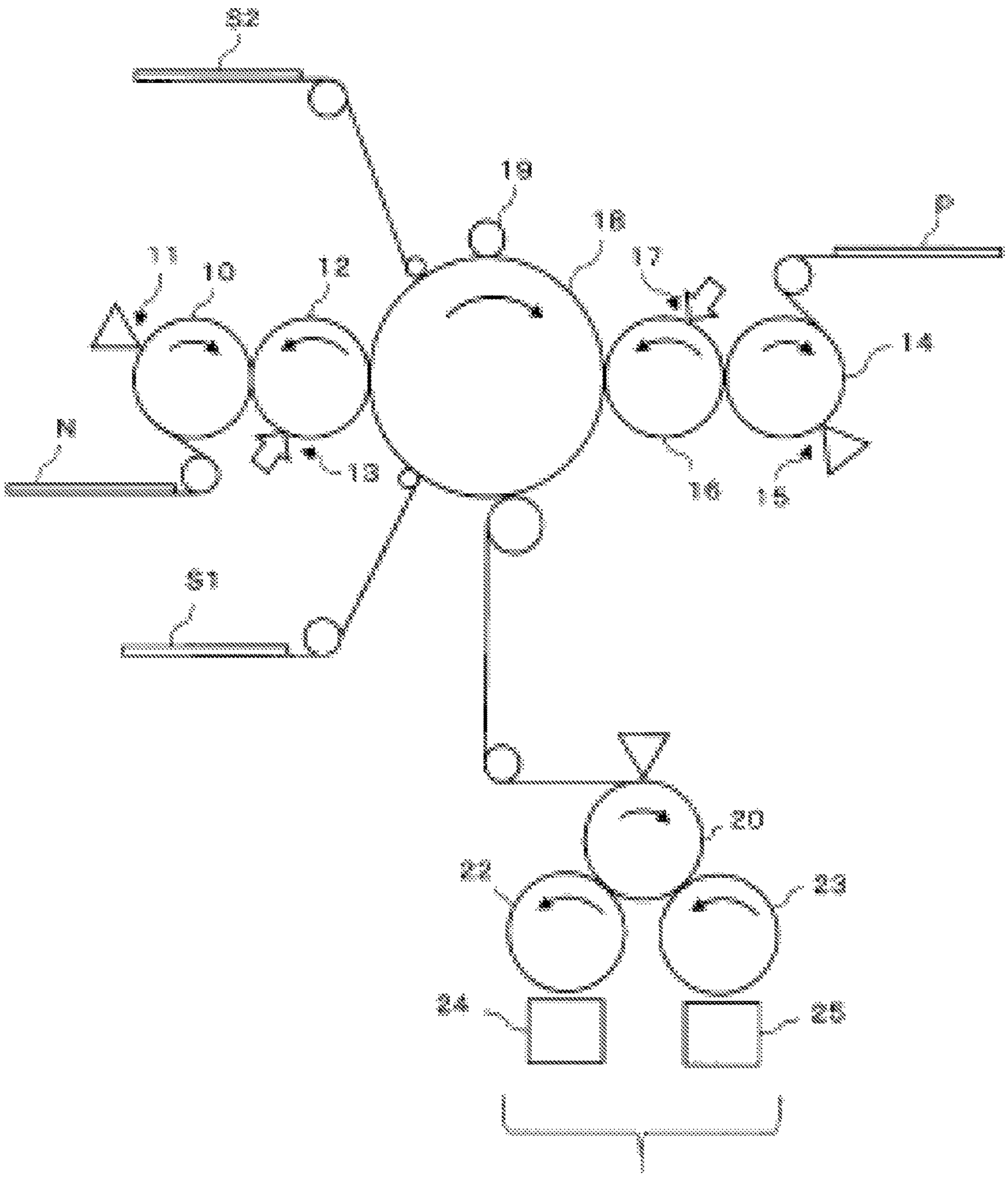
FIG. 45 is a conceptual configuration diagram of a modification 1.

FIG. 45 illustrates a configuration diagram in the case of arranging a laminating drum 23 and a laminating stage 25 in addition to the laminating drum 22 and the laminating stage 24.

The 3-layer laminated body 30 and the 4-layer laminated body 40 generated by being cut at the separator cutting drum 20 are supplied to the laminating drum 22 or the laminating drum 23. The 3-layer laminated body 30 and the 4-layer laminated body 40 supplied to the laminating drum 22 are successively laminated on the laminating stage 24 arranged adjacently to the laminating drum 22. In addition, the 3-layer laminated body 30 and the 4-layer laminated body 40 supplied to the laminating drum 23 are successively laminated on the laminating stage 25 arranged adjacently to the laminating drum 23.

The laminating drum 22 and the laminating drum 23 are each in contact with the separator cutting drum 20, and are mutually rotated in the same direction as the rotation direction of the separator cutting drum 20. The arrangement that the plurality of laminating drums 22 and 23 are rotated in the same direction as a conveyance direction of the 3-layer laminated body 30 and the 4-layer laminated body 40 conveyed from the separator cutting drum 20 in such a manner is referred to as a parallel arrangement. In the parallel arrangement, structures of the laminated bodies laminated on the laminating stages 24 and 25 are identical.

Figure 46:
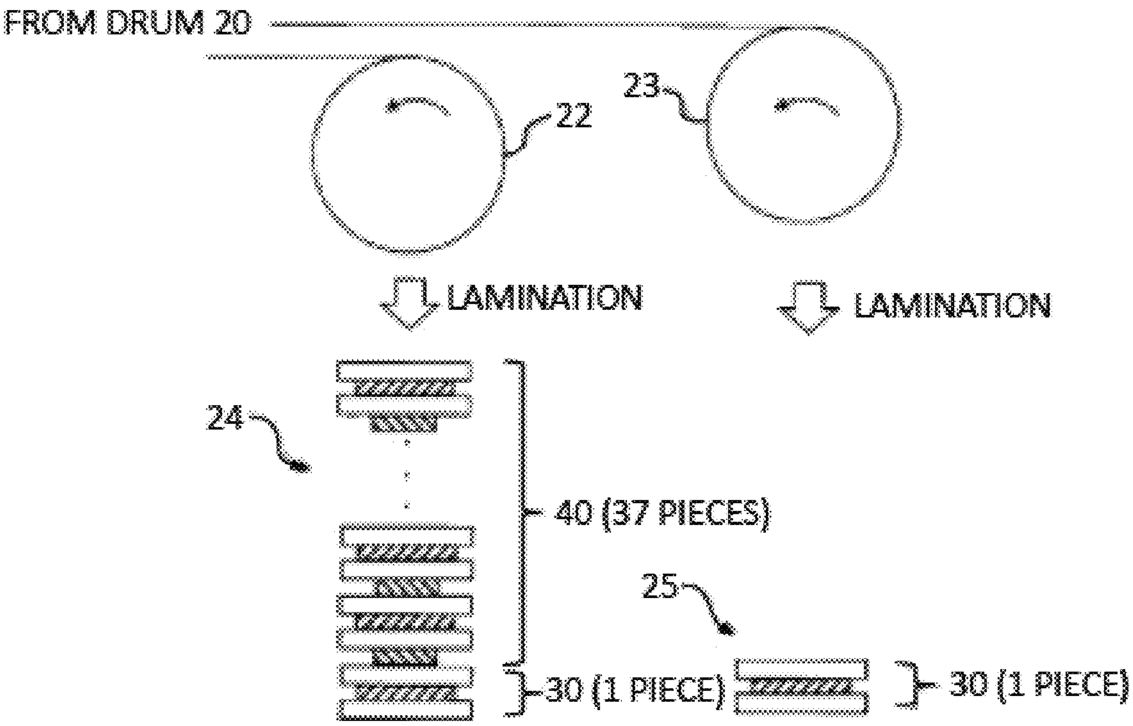
FIG. 46 is a lamination explanatory diagram of the modification 1.

FIG. 46 illustrates the situation of the lamination using the set of the laminating drum 22 and the laminating stage 24 and the set of the laminating drum 23 and the laminating stage 25.

The controller which controls the entire manufacturing device selectively supplies the 3-layer laminated body 30 and the 4-layer laminated body 40 generated by being cut at the separator cutting drum 20 to one of the laminating drum 22 and the laminating drum 23. For example, in the case of first manufacturing the laminated electrode assembly by performing the lamination on the laminating stage 24 and then manufacturing the laminated electrode assembly by performing the lamination on the laminating stage 25, the controller supplies the 3-layer laminated body 30 and the 4-layer laminated body 40 from the separator cutting drum 20 to the laminating drum 22 first.

The laminating drum 22 receives the 3-layer laminated body 30 supplied from the separator cutting drum 20 and laminates it on the laminating stage 24. Then, on the 3-layer laminated body 30, the total of 37 pieces of the 4-layer laminated bodies 40 for example are laminated and one laminated electrode assembly is manufactured. When the last 37th 4-layer laminated body 40 is supplied to the laminating drum 22, the controller switches an output destination of the separator cutting drum 20 from the laminating drum 22 to the laminating drum 23.

The laminating drum 23 receives the 3-layer laminated body 30 supplied from the separator cutting drum 20 and laminates it on the laminating stage 25. Then, on the 3-layer laminated body 30, the total of 37 pieces of the 4-layer laminated bodies 40 for example are laminated and another laminated electrode assembly is manufactured. When the last 37th 4-layer laminated body 40 is supplied to the laminating drum 23, the controller switches the output destination of the separator cutting drum 20 from the laminating drum 23 to the laminating drum 22 again.

There is no problem when the 3-layer laminated body 30, the 4-layer laminated body 40, the 4-layer laminated body 40, . . . , the 3-layer laminated body 30, the 4-layer laminated body 40, . . . are normally supplied from the separator cutting drum 20, but there may be a case where abnormality occurs in at least one of the negative electrode cutting drum 10, the negative electrode heating drum 12, the positive electrode cutting drum 14, the positive electrode heating drum 16, the bonding drum 18 and the separator cutting drum 20 and normal 3-layer laminated body 30 and 4-layer laminated body 40 are not generated. In such a case, when the abnormality is detected by a detection sensor provided in each drum, the 3-layer laminated body 30 or the 4-layer laminated body 40 is eliminated as a defect before being supplied to the laminating drums 22 and 23, and a normal flow of the laminated bodies that 37 pieces of the 4-layer laminated bodies 40 follow after one 3-layer laminated body 30 is not maintained. For example, at the time of generating the 37th 4-layer laminated body 40, when a bonding defect of the positive electrode plate PP is generated at the bonding drum 18 and thus the 37th 4-layer laminated body 40 is determined as a defect and eliminated in an inspection process of the bonding drum 18, not the 4-layer laminated body 40 but the next 3-layer laminated body 30 is supplied for the 37th piece from the separator cutting drum 20. When the 3-layer laminated body 30 is laminated on the laminating stage 24 from the laminating drum 22, the normal laminated electrode assembly is not manufactured.

Then, in such a case, it is also possible to supply the 3-layer laminated body 30 supplied instead of the 37th 4-layer laminated body 40 not to the laminating drum 22 but to the laminating drum 23 and make the laminating drum 23 laminate the 3-layer laminated body 30 on the laminating stage 25. By supplying the 4-layer laminated body 40 supplied from the separator cutting drum 20 after the 3-layer laminated body to the laminating drum 22 and laminating it on the laminating stage 24, the laminated body for which the 37 pieces of the 4-layer laminated bodies 40 are laminated on the 3-layer laminated body 30 is formed on the laminating stage 24.

Note that the laminated body for which the predetermined number of the 4-layer laminated bodies 40 are laminated on the 3-layer laminated body 30 is pressurized and/or heated, bonded to each other and turned to the laminated electrode assembly.

Figure 47:
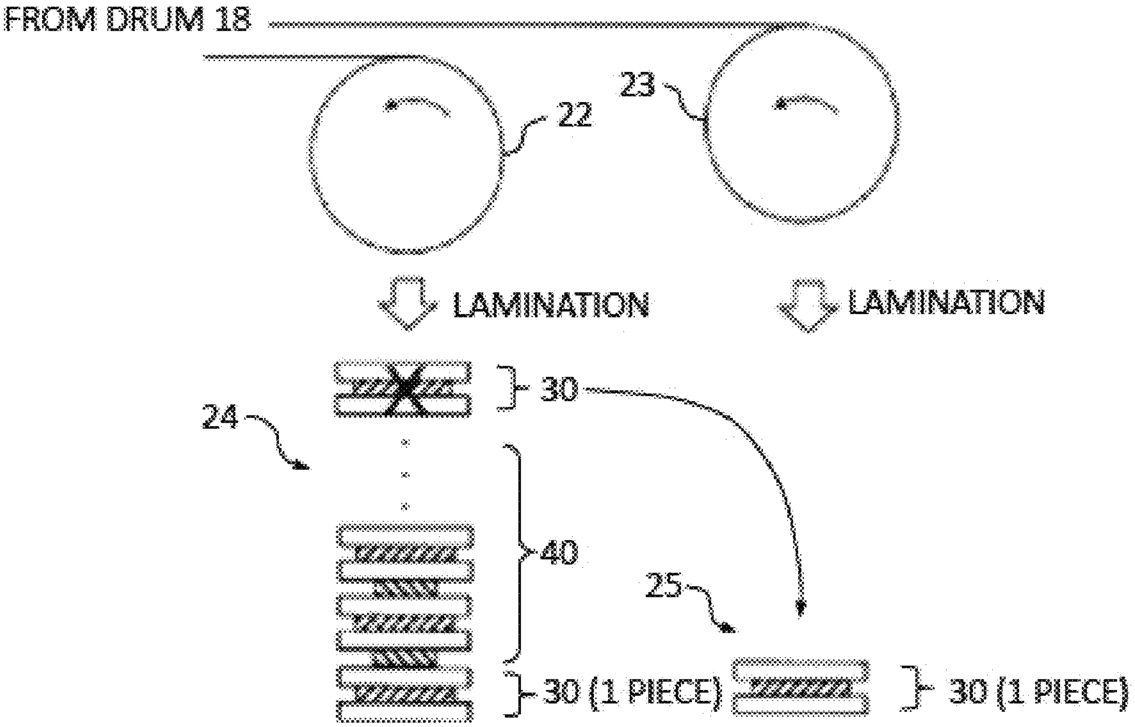
FIG. 47 is another lamination explanatory diagram of the modification 1.

FIG. 47 schematically illustrates the lamination method in this case.

The controller monitors the laminated body generated by being cut at the separator cutting drum 20, identifies whether it is the 3-layer laminated body 30 or the 4-layer laminated body 40 and also successively counts the number of pieces. When the abnormality occurs in the 37th 4-layer laminated body 40 and it is eliminated as a defect, the 37th piece becomes not the 4-layer laminated body 40 but the 3-layer laminated body 30.

When the 37th laminated body is the 4-layer laminated body 40, the controller supplies it to the laminating drum 22, however, when it is detected that the 37th laminated body is not the 4-layer laminated body 40 but the 3-layer laminated body 30, changes the output destination of the separator cutting drum 20 from the laminating drum 22 to the laminating drum 23 and laminates the 3-layer laminated body 30 not on the laminating stage 24 but on the laminating stage 25. In the figure, an X mark attached to the 3-layer laminated body 30 indicates that it is not to be laminated on the laminating stage 24 and is to be laminated on the laminating stage 25. Thereafter, since the 4-layer laminated bodies 40 are successively supplied, the controller maintains the output destination of the separator cutting drum 20 as the laminating drum 23, and successively laminates the 37 pieces of the 4-layer laminated bodies 40 on the laminating stage 25. For the laminating stage 24, by laminating one 4-layer laminated body 40 in need at an appropriate timing, the laminated electrode assembly is completed.

By arranging the plurality of sets of the laminating drum and the laminating stage and appropriately distributing the laminated bodies, even when a defect occurs in the laminated body, the laminated electrode assembly can be efficiently manufactured without stopping the manufacturing process.

While the defect of the laminated body can be detected at any drum, in order to detect the defect of the negative electrode plate NP and the defect of the positive electrode plate PP in particular, the detection sensor such as a camera is arranged at the negative electrode heating drum 12 and the positive electrode heating drum 16 and the defect detected at the drums can be eliminated. In this case, the negative electrode heating drum 12 comprises a normal/defect determination function and a defect elimination function together with a function of heating the negative electrode plate NP. Similarly, the positive electrode heating drum 16 comprises the normal/defect determination function and the defect elimination function together with a function of heating the positive electrode plate PP.

In the case of detecting the defect on the negative electrode cutting drum 10 and the positive electrode cutting drum 14, after the negative electrode single plate or the positive electrode single plate is cut, the normal/defect determination function and the defect elimination function are provided. The negative electrode cutting drum 10 and the positive electrode cutting drum 14 may comprise the normal/defect determination function and the negative electrode heating drum 12 and the positive electrode heating drum 16 may comprise the defect elimination function.

In the case of detecting the defect on the separator cutting drum 20, after the separator is cut and before the cut laminated body is supplied to the laminating drum, the normal/defect determination function and the defect elimination function are provided. That is, the separator cutting drum 20 comprises the normal/defect determination function and the defect elimination function together with a function of cutting the separator.

<Modification 2>

While the laminating drums 22 and 23 are arranged in parallel in FIG. 45, the laminating drums 22 and 23 may be arranged in series to the separator cutting drum 20.

Figure 48:
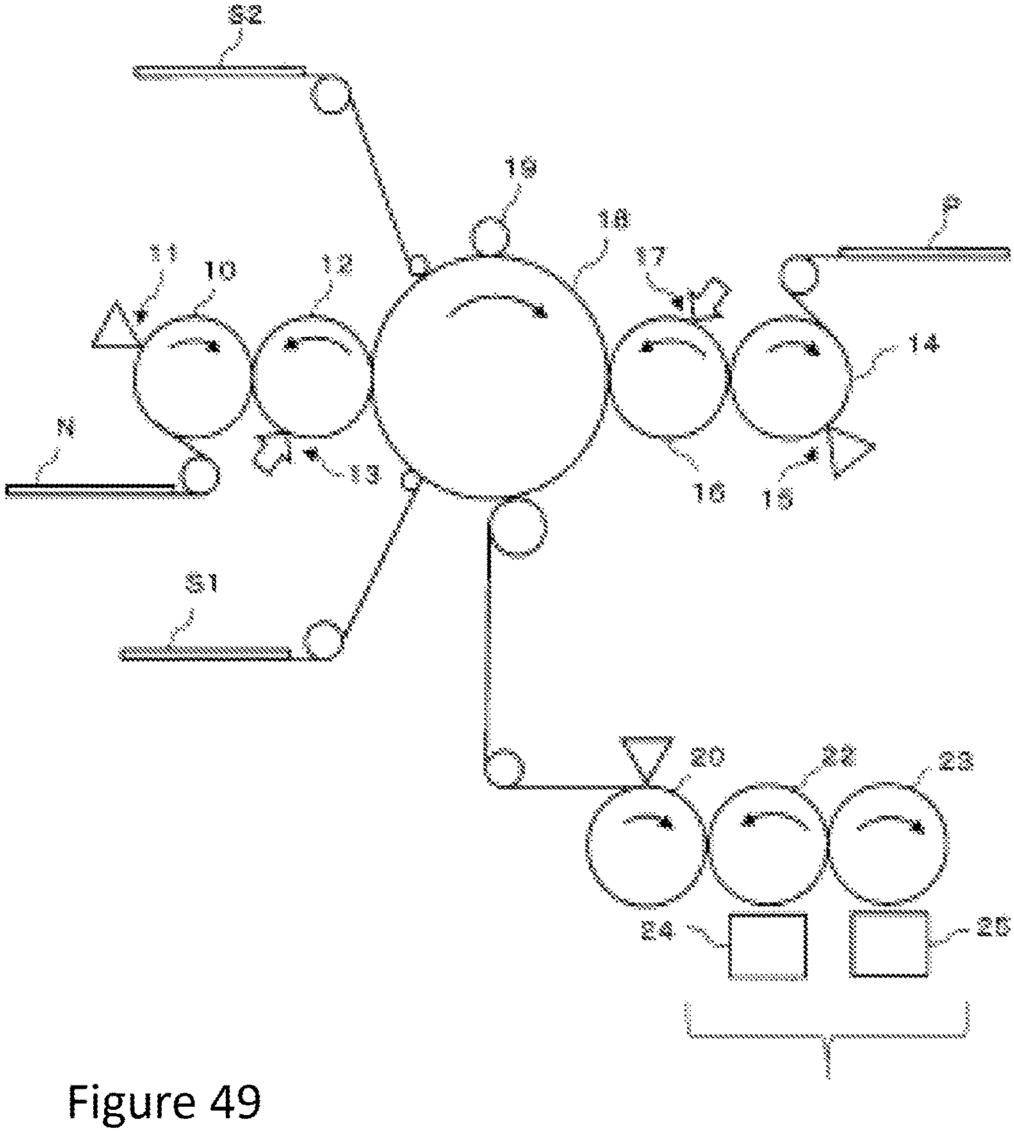
FIG. 48 is a conceptual configuration diagram of a modification 2.

FIG. 48 illustrates the configuration of this case. The 3-layer laminated body 30 and the 4-layer laminated body 40 generated by being cut at the separator cutting drum 20 are supplied to the laminating drum 22. The laminating drum 23 is arranged in contact with not the separator cutting drum 20 but the laminating drum 22. To the laminating drum 23, the 3-layer laminated body 30 and the 4-layer laminated body 40 are supplied via the laminating drum 22. The 3-layer laminated body 30 and the 4-layer laminated body 40 supplied to the laminating drum 22 are successively laminated on the laminating stage 24 arranged adjacently to the laminating drum 22. In addition, the 3-layer laminated body 30 and the 4-layer laminated body 40 supplied to the laminating drum 23 are successively laminated on the laminating stage 25 arranged adjacently to the laminating drum 23.

The laminating drum 22 and the laminating drum 23 are rotated in the mutually different directions. The arrangement that the laminating drums 22 and 23 in contact are rotated in the mutually different directions in such a manner is referred to as a series arrangement. The rotation in the mutually different directions means the case where one drum is rotated clockwise and the other drum is rotated counter-clockwise. In the series arrangement, the structures of the laminated bodies laminated on the laminating stages 24 and 25 may be different.

That is, the laminating drum 23 is supplied with the 3-layer laminated body 30 and the 4-layer laminated body 40 via the laminating drum 22 in contact, but the rotation direction of the laminating drum 23 is opposite to the rotation direction of the laminating drum 22. The 3-layer laminated body 30 and the 4-layer laminated body 40 supplied from the laminating drum 23 to the laminating stage 25 are inverted in regard to the arrangement of the 3-layer laminated body 30 and the 4-layer laminated body 40 supplied from the laminating drum 22 to the laminating stage 24. Then, for example, while the 3-layer laminated body is laminated first and the 4-layer laminated bodies are successively laminated on the 3-layer laminated body on the laminating stage 24, the 4-layer laminated bodies are successively laminated and the 3-layer laminated body is laminated on the 4-layer laminated body on the laminating stage 25. Accordingly, in the series arrangement, the structures of the laminated bodies laminated on the laminating stages 24 and 25 may be different.

Figure 49:
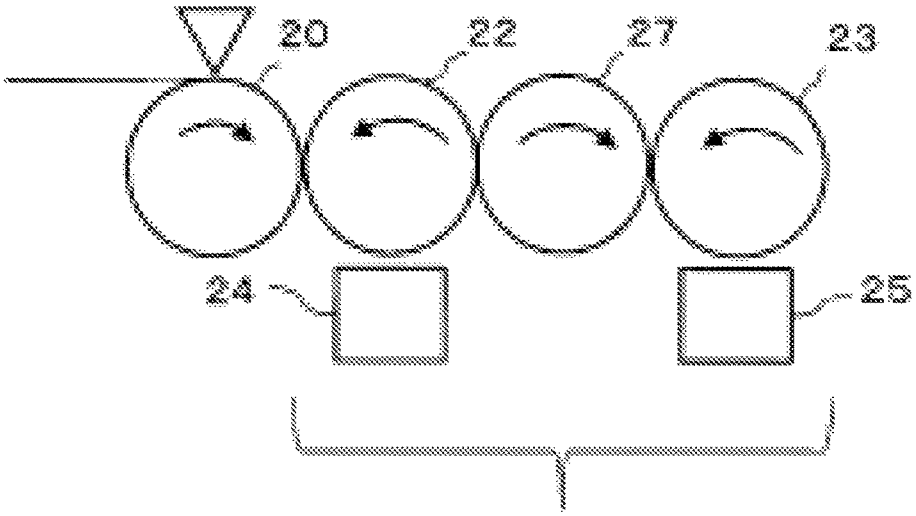
FIG. 49 is another conceptual configuration diagram of the modification 2.

Note that, when the configuration is such that the laminating drum 23 is not brought into contact with the laminating drum 22 but an intermediate drum 27 is interposed to the laminating drum 22 and the laminating drum 23 is brought into contact with the intermediate drum 27 as illustrated in FIG. 49, the laminating drum 22 and the laminating drum 23 are rotated in the same direction to the separator cutting drum 20 so that it is the parallel arrangement.

<Modification 3>

While the present embodiment is the configuration of the negative electrode cutting drum 10, the negative electrode heating drum 12, the positive electrode cutting drum 14, the positive electrode heating drum 16, the bonding drum 18, the separator cutting drum 20 and the laminating drum 22, the negative electrode heating drum 12 may be omitted to adjacently arrange the negative electrode cutting drum 10 and the bonding drum 18 and the positive electrode heating drum 16 may be omitted to adjacently arrange the positive electrode cutting drum 14 and the bonding drum 18.

Figure 50:
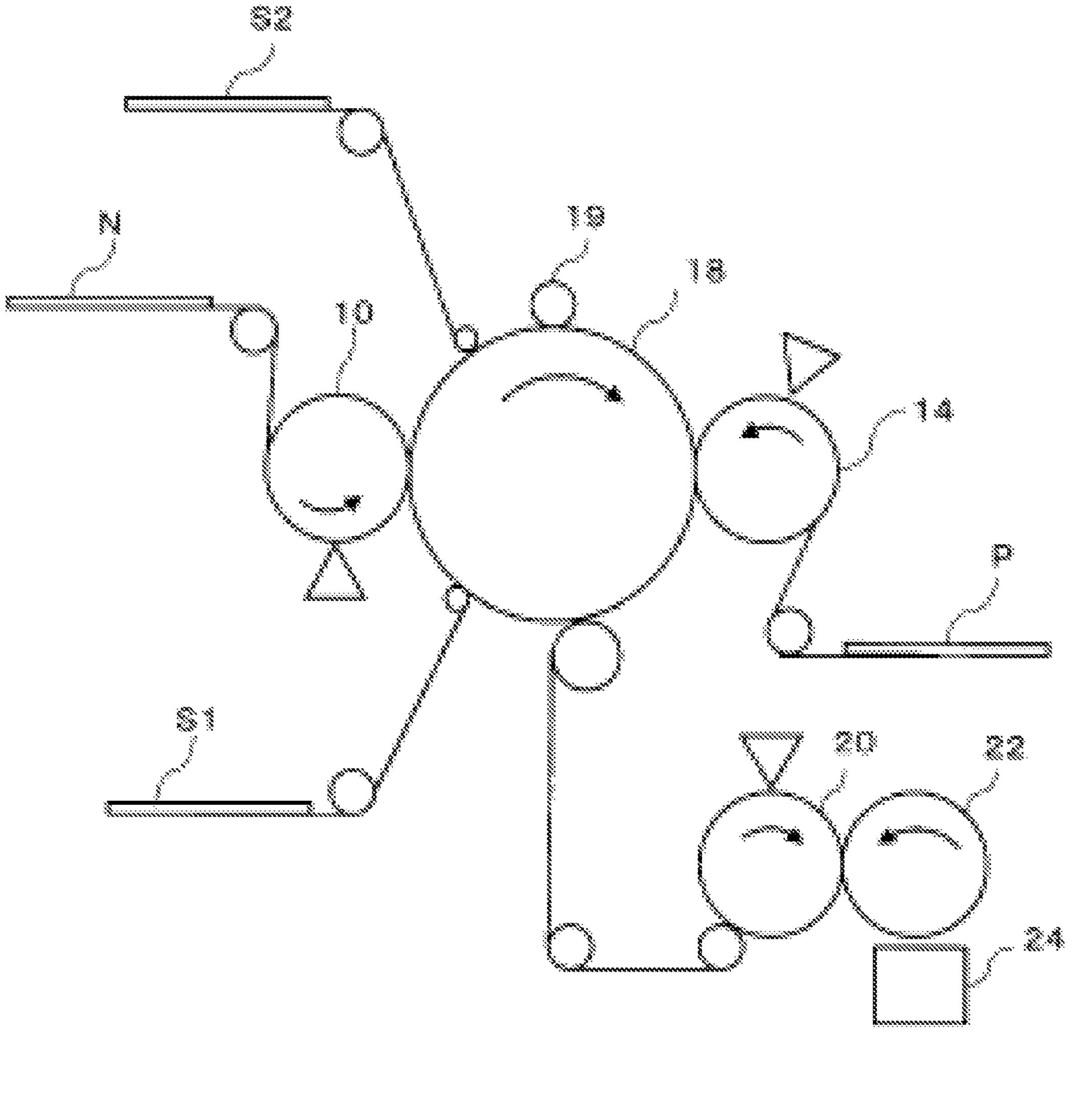
FIG. 50 is a conceptual configuration diagram of a modification 3.

FIG. 50 illustrates the configuration of this case. Differently from FIG. 1, the negative electrode heating drum 12 and the positive electrode heating drum 16 are not provided, the negative electrode cutting drum 10 and the bonding drum 18 are adjacent and the positive electrode cutting drum 14 and the bonding drum 18 are adjacent.

The negative electrode cutting drum 10 generates the negative electrode plate NP by cutting the belt-like negative electrode single plate N, heats the negative electrode plate NP and then supplies it to the bonding drum 18. It can be said that the negative electrode cutting drum 10 also has the function of the negative electrode heating drum 12 in FIG. 1.

In addition, the positive electrode cutting drum 14 generates the positive electrode plate PP by cutting the belt-like positive electrode single plate P, heats the positive electrode plate PP and then supplies it to the bonding drum 18. It can be said that the positive electrode cutting drum 14 also has the function of the positive electrode heating drum 16 in FIG. 1.

The negative electrode cutting drum 10 and the bonding drum 18 are adjacent in FIG. 50, however, the negative electrode cutting drum 10 and the bonding drum 18 may be separated and the heated negative electrode plate NP from the negative electrode cutting drum 10 may be conveyed to the bonding drum 18 by a conveyance mechanism such as a belt conveyor. Similarly, the positive electrode cutting drum 14 and the bonding drum 18 may be separated and the heated positive electrode plate PP from the positive electrode cutting drum 14 may be conveyed to the bonding drum 18 by a conveyance mechanism such as a belt conveyor.

<Modification 4>

While the belt-like separators S1 and S2 are cut at the separator cutting drum 20 in the present embodiment, the separator cutting drum 20 may be omitted and the belt-like separators S1 and S2 may be cut at the bonding drum 18.

Figure 51:
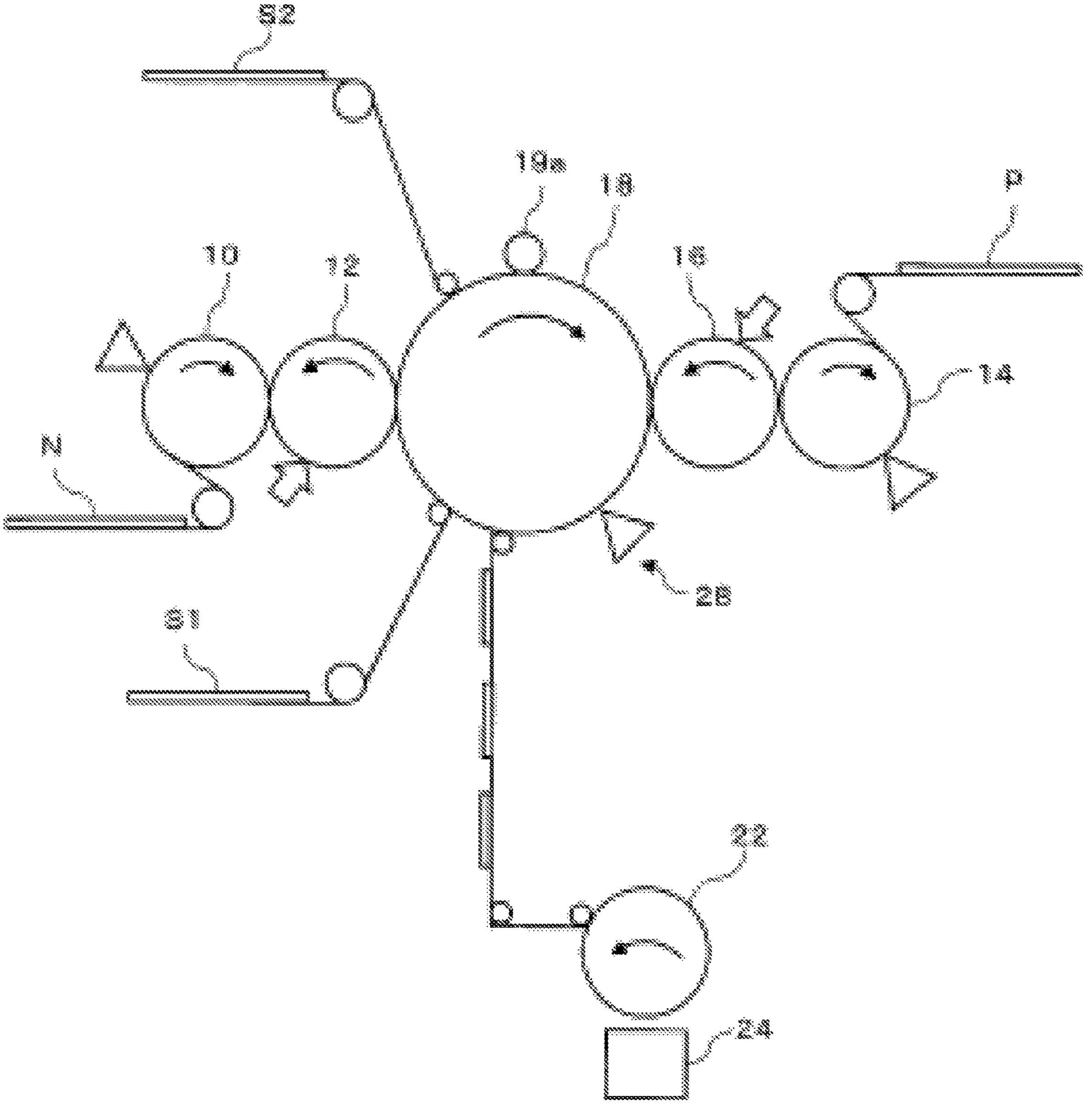
FIG. 51 is a conceptual configuration diagram of a modification 4.

FIG. 51 illustrates the configuration of this case. Differently from FIG. 1, the separator cutting drum 20 is not provided and the 3-layer laminated body 30 and the 4-layer laminated body 40 generated by being cut at the bonding drum 18 are supplied to the laminating drum 22 via the conveyance mechanism.

The bonding drum 18 comprises a bonding head comprising a round blade, and cuts the belt-like separators S1 and S2 at a predetermined cutting position 28. The bonding head may comprise the round blade and a cutting function for example.

<Modification 5>

The 3-layer laminated body and the 4-layer laminated body are created in the present embodiment, however, without being limited thereto, a 2-layer laminated body or the laminated body with the number of laminations equal to or larger than four can be also created. For example, the positive electrode cutting drum 14 and the positive electrode heating drum 16 may be eliminated or stopped in FIG. 1 and the negative electrode plate NP may be supplied onto the separator S1, bonded at the bonding drum 18 and supplied to the separator cutting drum 20 as the 2-layer laminated body. The separator S2 may be supplied onto the negative electrode plate NP, bonded at the bonding drum 18 and supplied to the separator cutting drum 20 as the 2-layer laminated body. The separator S2 may be supplied onto the negative electrode plate NP and bonded at the bonding drum 18 and the positive electrode plate PP may be supplied further onto the separator S2, bonded at the bonding drum 18 and supplied to the separator cutting drum 20 as the 3-layer laminated body. Or, the laminated body with the number of laminations equal to or larger than four may be created and supplied to the separator cutting drum 20 by repeatedly executing the bonding at the bonding drum 18.

<Modification 6>

The separator cutting drum 20 and the laminating drum 22 do not need to be arranged closely to the bonding drum 18. The laminated body may be created by laminating the belt-like separator, the positive electrode and the negative electrode by the method and the device different from the bonding drum 18, the belt-like separator may be cut and it may be laminated at the laminating drum 22. On the other hand, the laminated body for which the belt-like separator, the positive electrode and the negative electrode are laminated may be created at the bonding drum 18 and the laminated electrode assembly may be created by the method and the device different from the separator cutting drum 20 and the laminating drum 22.

REFERENCE SIGNS LIST

10 negative electrode cutting drum
12 negative electrode heating drum
14 positive electrode cutting drum
16 positive electrode heating drum
18 bonding drum
20 separator cutting drum
22 laminating drum
24 laminating stage
N negative electrode single plate
P positive electrode single plate
NP negative electrode plate
PP positive electrode plate

The invention claimed is:

1. A laminated electrode assembly manufacturing device, comprising:

a first laminating drum configured to laminate a first laminated body by supplying the first laminated body to a first laminating stage disposed downstream of the first laminating drum; and a second laminating drum which is different from the first laminating drum and configured to laminate a second laminated body by supplying the second laminated body to a second laminating stage disposed downstream of the second laminating drum that is different from the first laminating stage, wherein:

the first laminated body becomes a first cut laminated body formed by cutting a first laminate of a first separator single plate and a first electrode to a predetermined width, the second laminated body becomes a second cut laminated body formed by cutting a second laminate of a second separator single plate and a second electrode to the predetermined width the first laminating drum includes a first circumferential surface to convey the first cut laminated body thereon, the second laminating drum includes a second circumferential surface to convey the second cut laminated body thereon, and the first laminating drum and the second laminating drum are aligned with each other, with the first circumferential surface and the second circumferential surface facing each other.

2. The laminated electrode assembly manufacturing device according to claim 1, wherein the first laminating drum and the second laminating drum are arranged so as to be rotated in a mutually same direction as a conveyance direction of the first cut laminated body and the second cut laminated body.

3. The laminated electrode assembly manufacturing device according to claim 1, wherein the first laminating drum and the second laminating drum are arranged so as to be rotated in mutually different directions.

4. The laminated electrode assembly manufacturing device according to claim 3, wherein the first cut laminated body is carried into the second laminating drum via the first laminating drum.

5. The laminated electrode assembly manufacturing device according to claim 1, further comprising a cutting drum configured to cut the first and second separator single plates of the first and second laminated bodies in the predetermined width to produce the first and second cut laminated bodies respectively, wherein a combined laminated body is a 4-layer laminated body formed from the first and second cut laminated bodies.

6. The laminated electrode assembly manufacturing device according to claim 1, further comprising a cutting drum configured to cut the first and second separator single plates of the first and second laminated bodies in the predetermined width to produce the first and second cut laminated bodies respectively, wherein a combined laminated body is a 3-layer laminated body formed by arranging a first electrode plate on the first separator single plate and arranging the second separator single plate thereon, and the cutting drum cuts the first separator single plate and the second separator single plate of the 3-layer laminated body in the predetermined width.

7. The laminated electrode assembly manufacturing device according to claim 1, further comprising a cutting drum configured to cut the first and second separator single plates of the first and second laminated bodies in the predetermined width to produce the first and second cut laminated bodies respectively, wherein a combined laminated body is a 4-layer laminated body formed by arranging a first electrode plate on the first separator single plate, arranging the second separator single plate thereon and arranging a second electrode plate thereon and a 3-layer laminated body formed by arranging the first electrode plate on the first separator single plate and arranging the second separator single plate thereon, and the cutting drum cuts the first separator single plate and the second separator single plate of the 4-layer laminated body and the 3-layer laminated body in the predetermined width.

8. The laminated electrode assembly manufacturing device according to claim 7, wherein the first laminating drum laminates one 3-layer laminated body on the first laminating stage and laminates a predetermined number of the 4-layer laminated bodies on the first laminating stage, and the second laminating drum laminates one 3-layer laminated body on the second laminating stage and laminates the predetermined number of the 4-layer laminated bodies on the second laminating stage.

9. The laminated electrode assembly manufacturing device according to claim 7, wherein the first laminating drum laminates one 3-layer laminated body on the first laminating stage, and in a case where the 3-layer laminated body is supplied from the cutting drum before laminating the predetermined number of the 4-layer laminated bodies on the first laminating stage, does not laminate the supplied 3-layer laminated body on the first laminating stage, and the second laminating drum laminates the supplied 3-layer laminated body on the second laminating stage.

10. The laminated electrode assembly manufacturing device according to claim 1, wherein the first laminating drum comprises a plurality of first laminating heads configured to hold the first laminated body on an outer peripheral surface, the plurality of first laminating heads are rotated in a drum circumferential direction and laminate the first laminated body on the first laminating stage, the second laminating drum comprises a plurality of second laminating heads configured to hold the second laminated body on the outer peripheral surface, and the plurality of second laminating heads are rotated in the drum circumferential direction and laminates the second laminated body on the second laminating stage.

11. The laminated electrode assembly manufacturing device according to claim 1, further comprising:

a cutting drum configured to cut the first and second laminated bodies into the first and second cut laminated bodies, wherein the cutting drum is aligned with the first laminating drum and the second laminating drum, with a circumferential surface of the cutting drum facing each of the first circumferential surface and the second circumferential surface.

12. The laminated electrode assembly manufacturing device according to claim 1, further comprising:

an intermediate drum configured to convey the first and second cut laminated bodies between the first laminating drum and the second laminating drum, wherein the intermediate drum is aligned with the first laminating drum and the second laminating drum, with a circumferential surface of the intermediate drum facing each of the first circumferential surface and the second circumferential surface.

13. A laminated electrode assembly manufacturing method comprising:

a step of conveying a first laminated body to a first laminating drum, a step of conveying a second laminated body to a second laminating drum different from the first laminating drum, wherein the first laminated body becomes a first cut laminated body formed by cutting a first laminate of a first separator single plate and a first electrode to a predetermined width, and the second laminated body becomes a second cut laminated body formed by cutting a second laminate of a second separator single plate and a second electrode to the predetermined width;

a step of laminating the first laminated body by supplying the first laminated body to a first laminating stage by the first laminating drum, the first laminating stage disposed downstream of the first laminating drum; and a step of laminating the second laminated body by supplying the second laminated body to a second laminating stage by the second laminating drum, the second laminating stage disposed downstream of the second laminating drum which is different from the first laminating stage, wherein the first laminating drum includes a first circumferential surface to convey the cut laminated body thereon, and the second laminating drum includes a second circumferential surface to convey the cut laminated body thereon, and the first laminating drum and the second laminating drum are aligned with each other, with the first circumferential surface and the second circumferential surface facing each other.

14. The laminated electrode assembly manufacturing method according to claim 13, wherein the first laminating drum and the second laminating drum are rotated in a mutually same direction to perform lamination.

15. The laminated electrode assembly manufacturing method according to claim 13, wherein the first laminating drum and the second laminating drum are rotated in mutually different directions to perform lamination.

16. A laminated electrode assembly manufacturing device, comprising:

a first laminating drum configured to laminate a first laminated body by supplying the first laminated body to a first laminating stage disposed downstream of the first laminating drum; and a second laminating drum which is different from the first laminating drum and configured to laminate a second laminated body by supplying the second laminated body to a second laminating stage, disposed downstream of the second laminating drum, that is different from the first laminating stage, wherein each of the first laminated body and the second laminated body is a cut laminated body formed by cutting a laminate of a separator single plate and an electrode to a predetermined width, wherein the first laminating drum and the second laminating drum are arranged so as to be rotated in mutually different directions, and the second laminated body is carried into the second laminating drum via the first laminating drum.

* * * * *